United States Patent [19]

Maniwa et al.

[11] Patent Number: 4,860,119
[45] Date of Patent: Aug. 22, 1989

[54] IMAGE FORMING SYSTEM WITH MEMORY DUPLEX PRINTING

[75] Inventors: Yoshio Maniwa; Takashi Morita, both of Yokohama, Japan

[73] Assignee: Ricoh Co., Ltd., Tokyo, Japan

[21] Appl. No.: 198,789

[22] Filed: May 25, 1988

[30] Foreign Application Priority Data

May 29, 1987 [JP] Japan ................................ 62-131888

[51] Int. Cl.⁴ .............................................. H04N 1/23
[52] U.S. Cl. .................................................. 358/296
[58] Field of Search ...................... 355/24, 26; 358/296

[56] References Cited

U.S. PATENT DOCUMENTS 4,453,841 6/1984 Bobick ................................ 355/24

Primary Examiner—E. A. Goldberg
Assistant Examiner—Scott A. Rogers
Attorney, Agent, or Firm—Cooper & Dunham

[57] ABSTRACT

An image forming system includes a memory having a page memory for storing data per one page of a sheet of paper to be printed on a sheet of paper; and a video memory for storing video data corresponding to the data stored in the page memory. A controller secures a memory region for the video memory from an entire memory region of the memory region and forms the video data in the video memory from the data stored in the page memory. A detecting circuit (CPU) detects a currently available memory capacity of the memory means which can be presented for the video memory and a size of the sheet of paper. A printing portion prints an image formed by the video data on the sheet in either one of a plurality of predetermined both side print modes which is selected depending on a detected result by the detecting circuit. The both side print modes define different sequences of reading out the video data corresponding to one page from the video data and difference sequence of printing on surfaces of sheets. .

15 Claims, 38 Drawing Sheets

FIG. IA
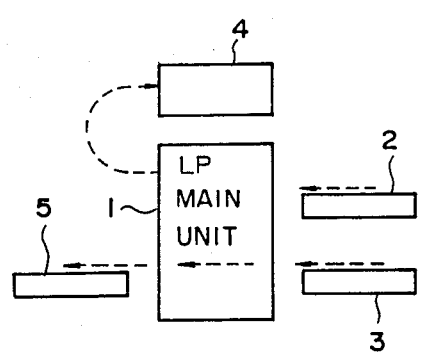
FIG. IB
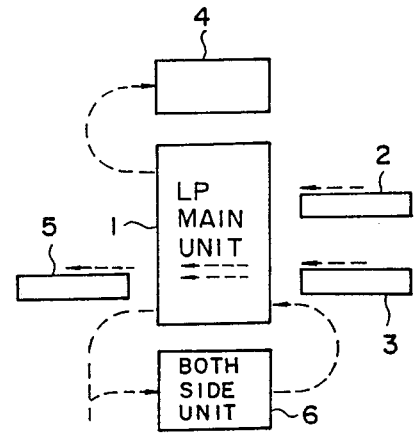
FIG. IC
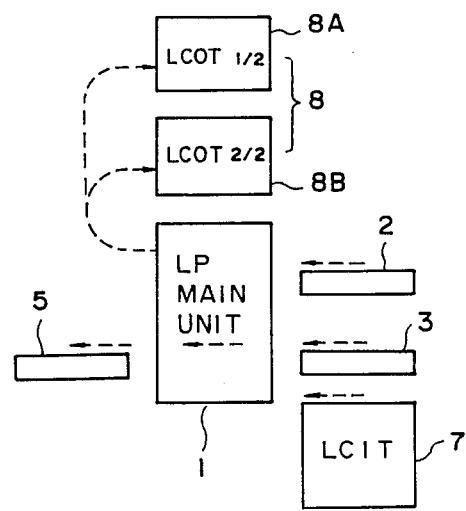
FIG. ID
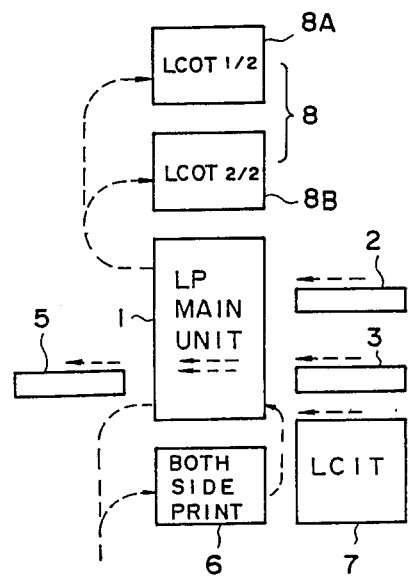

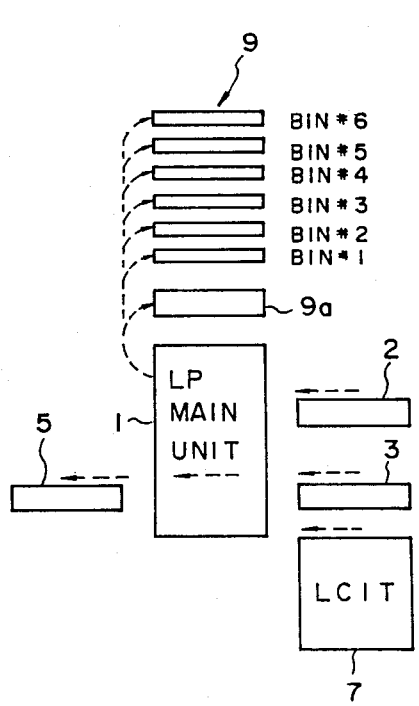
FIG. IE
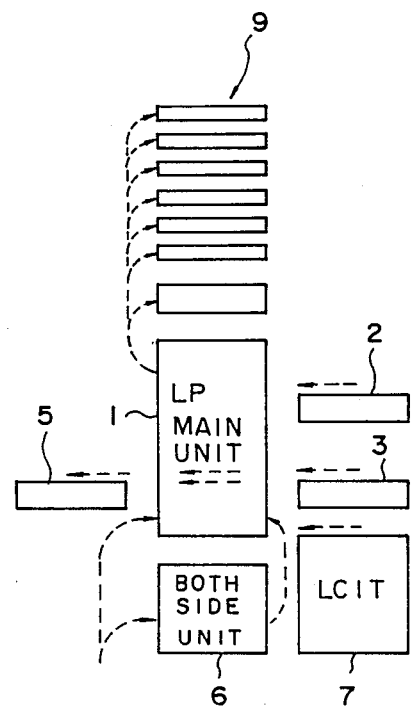
FIG. IF

FIG. 20
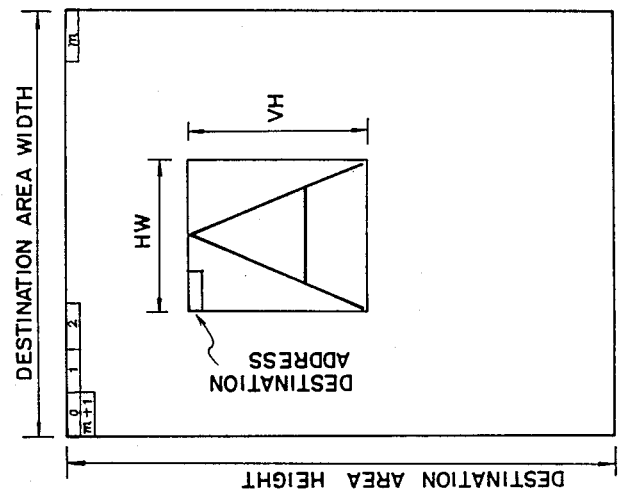
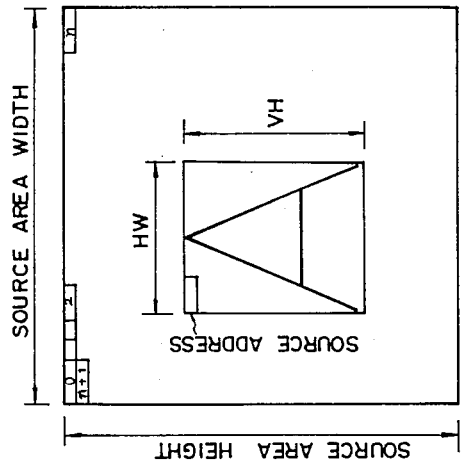

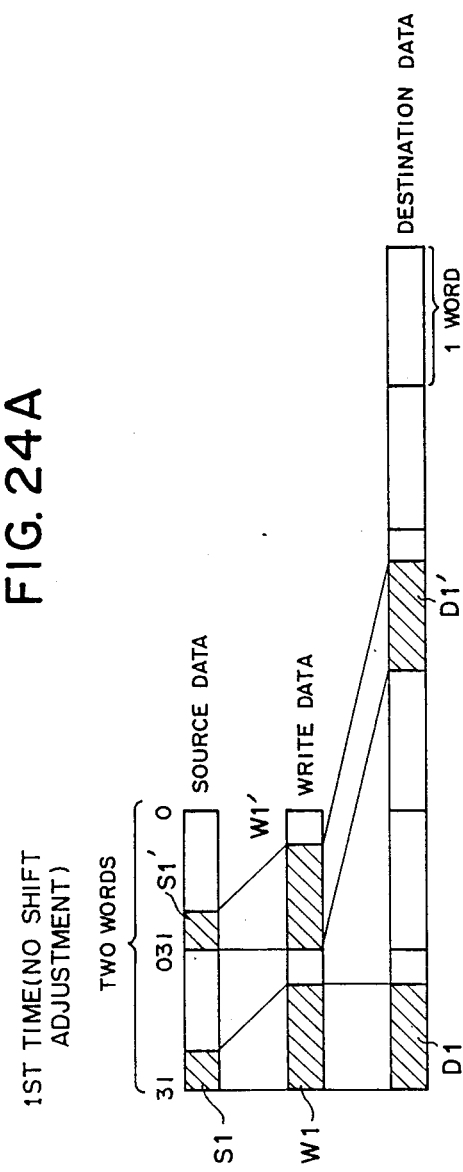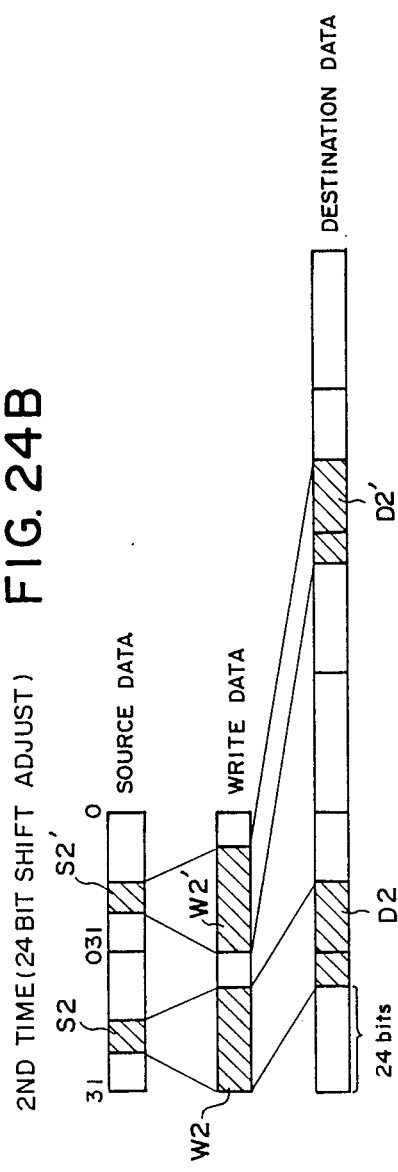

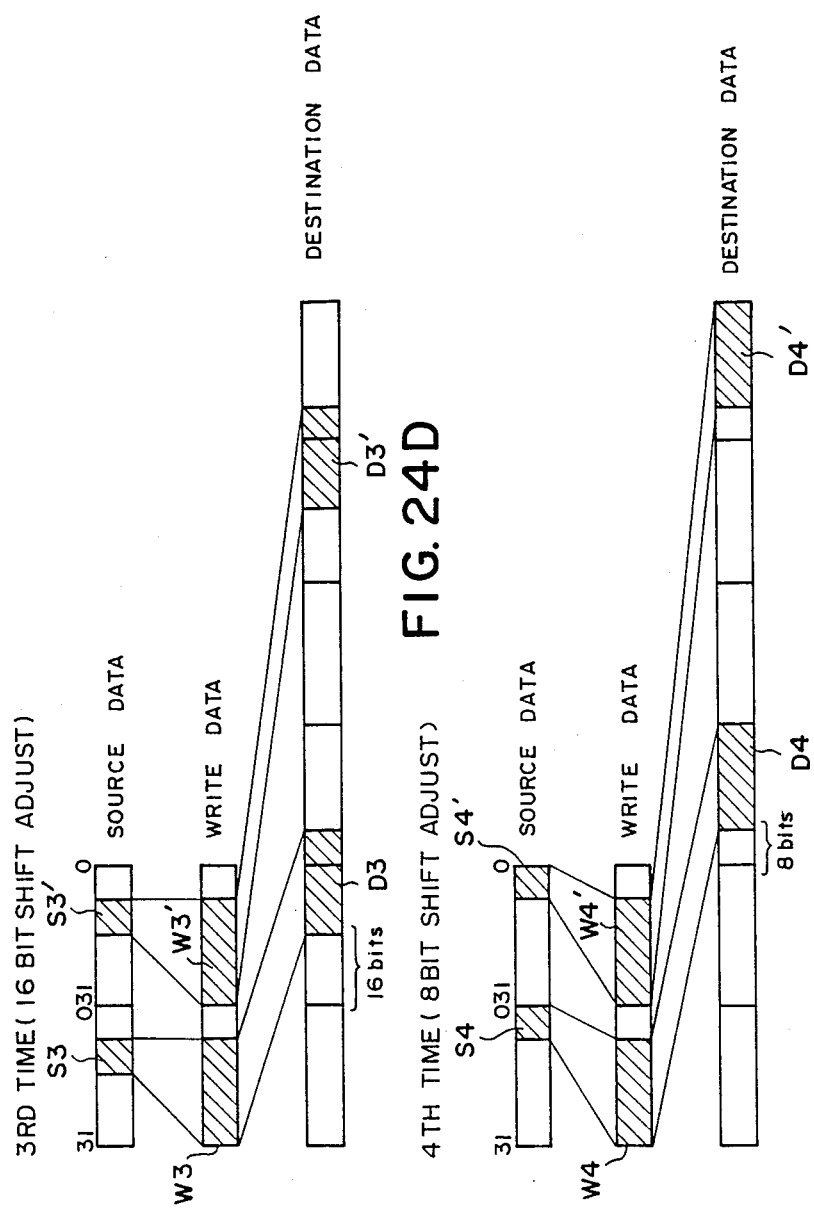

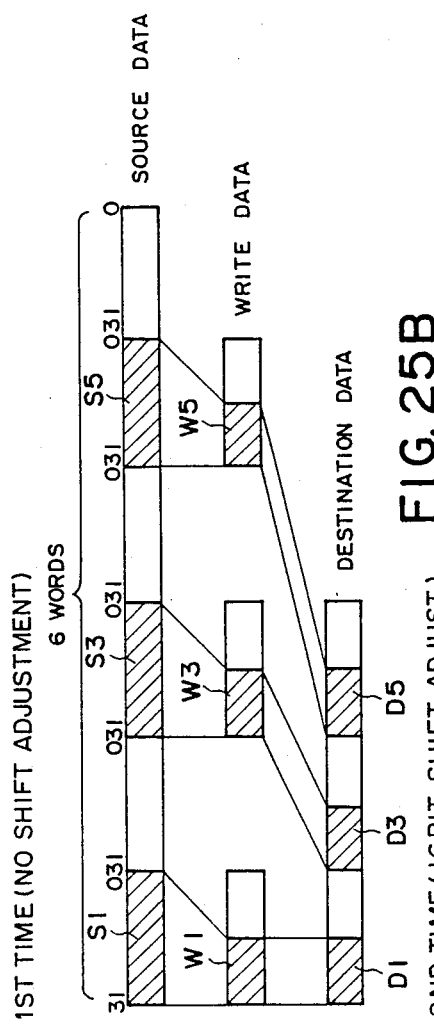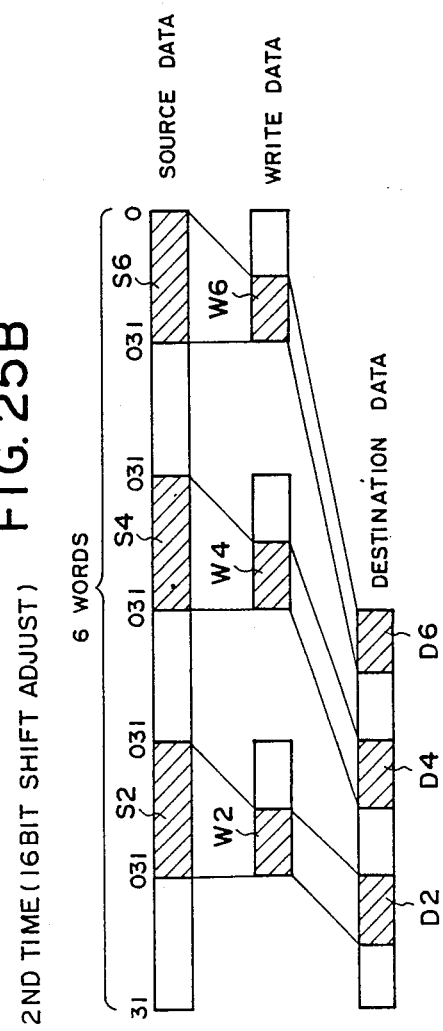

TO PAPER DISCHARGE
TRAY      #1 REAR

IMAGE FORMING SYSTEM WITH MEMORY DUPLEX PRINTING

BACKGROUND OF THE INVENTION

The present invention generally relates to image forming systems, such as printers, copiers and facsimiles, and in particular to both side image forming systems capable of printing images on both the sides of paper or the like.

In a printer employing electrophotography printing, such as a laser printer, video data is formed per page on a memory region by using source data (font data of a character, image data and so on) and page data (data formed per page on the basis of data supplied from a host computer system). Then the video data thus formed is read out from the memory and a corresponding image is printed on a sheet of paper.

Currently, a printer having a both side printing function is available. In a both side printing process which achieves the both side printing function, a front side of paper is subjected to the printing operation and the paper is passed through a path for turning the paper over. Then, a rear side of the paper is subjected to the printing of the next page. In the conventional printer, the path for turning the paper over (paper inversion path) is considerably long. Therefore, it becomes possible to print another paper while the preceding paper is being turned over in the paper inversion path. With this printing process, an increased printing speed can be obtained.

However, in order to attain the above both side printing operation, it is necessary to intermittently skip a page to be printed. It is therefore required to form video data amounting to a few of pages in the memory in advance. For this requirement, a memory having an extremely large capacity must be provided in the printer. In particular, a printer capable of handling a sheet of paper of a large size such as A3 becomes expensive.

The above fact holds true for facsimiles and copiers employing the electronic photograph printing method.

SUMMARY OF THE INVENTION

Accordingly, a general object of the present invention is to provide a novel and useful image forming system in which the above disadvantages of the conventional image forming systems have been eliminated.

A more specific object of the present invention is to provide an image forming system capable of printing on both sides of a sheet by using a memory of a smaller capacity in which video data is formed.

Another object of the present invention is to provide an image forming system capable of printing on both sides of a sheet of paper at an increased speed.

Yet another object of the present invention is to provide an image forming system capable of printing on both sides of a sheet of paper in an optimum mode which can be selected, depending on a size of a sheet of paper subjected to the print and a current usage state a memory provided in the system.

The above objects of the present invention can be achieved by an image forming system comprising a memory for storing video data to be printed on a sheet of paper; and a printing portion for reading out the video data stored in the memory and printing an image formed by the video data on the sheet in either one of a plurality of predetermined both side print modes. The both side print modes defines different sequences of reading out the video data corresponding to one page from the video data and and different sequences of printing on two surfaces of sheets.

According to another aspect of the invention, there is provided the following. A memory having a page memory for storing data per one page of a sheet of paper to be printed on a sheet of paper; and a video memory for storing video data corresponding to the data stored in the page memory. A controller secures a memory region for the video memory from an entire memory region of the memory region and forms the video data in the video memory from the data stored in the page memory. A detecting circuit (CPU) detects a size of the sheet of paper and a currently available memory capacity of the memory means which can be presented for the video memory. A printing portion performs printing in either one of a plurality of predetermined both side print modes which is selected depending on a detected result.

Other objects, features and advantages of the present invention will become apparent from the following description when read in conjunction with the drawings.

BRIEF DESCRIPTION OF THE DRAWINGS

FIGS. 1A through 1F are schematic views showing various possible construction of a laser printer system embodying the present invention;

FIG. 20 is a view for explaining a process of forming a video data in the video buffer;

FIGS. 24A through 24D are views for explaining triple enlargement of the original image;

FIGS. 25A and 25B are views for explaining image reduction by a factor of 2;

FIGS. 30A through 30I are views which are useful for understanding the sequence of steps in a printing process in accordance with second both side print mode MODE 2 of the present invention;

DETAILED DESCRIPTION OF THE PREFERRED EMBODIMENTS

Figure 2:
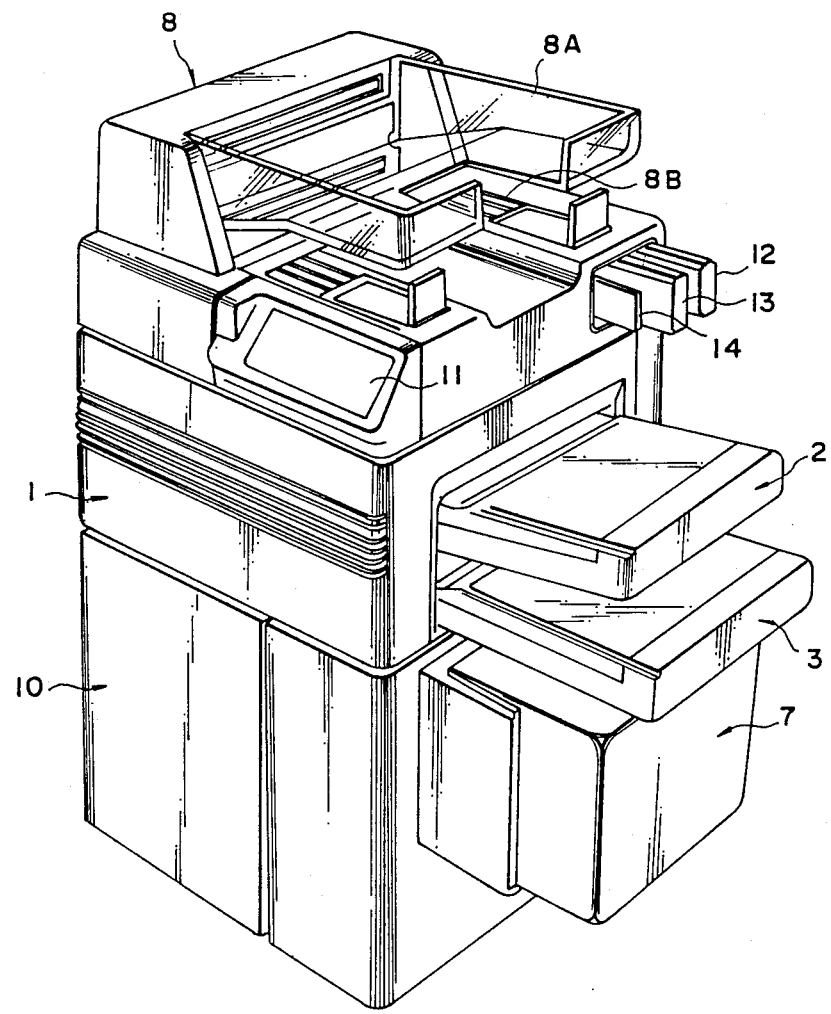
FIG. 2 is a schematic, perspective view showing the overall form of the laser printer system having the architecture illustrated in FIG. 1D.

A description is now given of the preferred embodiments of the present invention, by referring to the attached drawings. To begin with, a system construction is described.

SYSTEM CONSTRUCTION

FIGS. 1A through 1F illustrate several possible system architectures which may be realized by selectively combining a main unit with one or more of optical or auxiliary units different in structure and function in accordance with one embodiment of the present invention. In the illustrated embodiment, the main unit includes a laser printer and thus the overall system is constructed as a modular type laser printer system. It is to be noted that in these drawings the direction of transportation of a sheet of recording paper is indicated by the dotted line with an arrow.

FIG. 1A illustrates the basic structure of the present laser printer system, and it includes a laser printer (LP) main unit, an upper paper cassette 2, a lower paper cassette 3, a standard and upper paper discharge unit 4 and a rear paper discharge tray 5 for receiving paper having a high stiffness, such as envelopes. The upper and lower paper cassettes 2 and 3 can accommodate 250 sheets of paper for each of paper sizes up to A3 size. The standard and upper paper discharge unit 4 is capable of accommodating up to 500 discharged sheets of paper. FIG. 1B illustrates an architecture which is obtained by adding a duplex or both side processing unit 6 for printing images on both sides of a sheet of paper to the structure shown in FIG. 1A. FIG. 1C illustrates another architecture which is obtained by adding a large volume paper feed unit LCIT 7 and replacing the standard paper discharge unit 4 with a large quantity paper discharge unit LCIT 8 having a pair of upper and lower paper discharge sections 8A and 8B. FIG. 1D shows a further architecture which is obtained by adding the both side processing unit 6 to the architecture shown in FIG. 1C. FIG. 1E illustrates a still further architecture which is obtained by replacing the large volume paper discharging unit 8 with a mail box unit (MB) 9 having a base stacker 9a and six bins #1 through #6 in the architecture shown in FIG. 1C. FIG. 1F illustrates a still further architecture which is obtained by further adding the both side processing unit 6 to the architecture shown in FIG. 1E.

In this manner, in accordance with the present laser printer system, various system arrangements can be established by selectively coupling one or more of the optional units, including the both side processing unit 6, the large quantity paper feed unit 7, the large quantity paper discharge unit 8 and the mail box unit 9 to the laser printer main unit 1. The detailed structure of the laser printer main unit 1 and each of the optional units will be described later.

OUTER APPEARANCE AND MECHANICAL STRUCTURE

FIG. 2 is a perspective view showing an example of the outer appearance of the printer system shown in FIG. 1D and corresponding elements are designated by corresponding numerals. As shown, the laser printer system shown in FIG. 2 includes a table which contains therein a part of the large quantity paper feed unit 7 and the both side processing unit 6 shown in FIG. 1D. In FIG. 2, there is also shown a control panel 11 which is disposed at top of the laser printer main unit 1, a structure of which will be described in detail later. Font cartridges 12 and 13 are detachably inserted into the laser printer main unit 1 and they include one or more RAMs and ROMs which store various kinds of font data. An emulation card 14 also shown is detachably inserted into the laser printer main unit 1. when the emulation card 14 is inserted into the laser printer main unit 1 as shown in FIG. 2, an emulation function corresponding to the type of a host system is provided, so that an operation similar to that of dot printer or dezzy wheel printer may be obtained.

Figure 3:
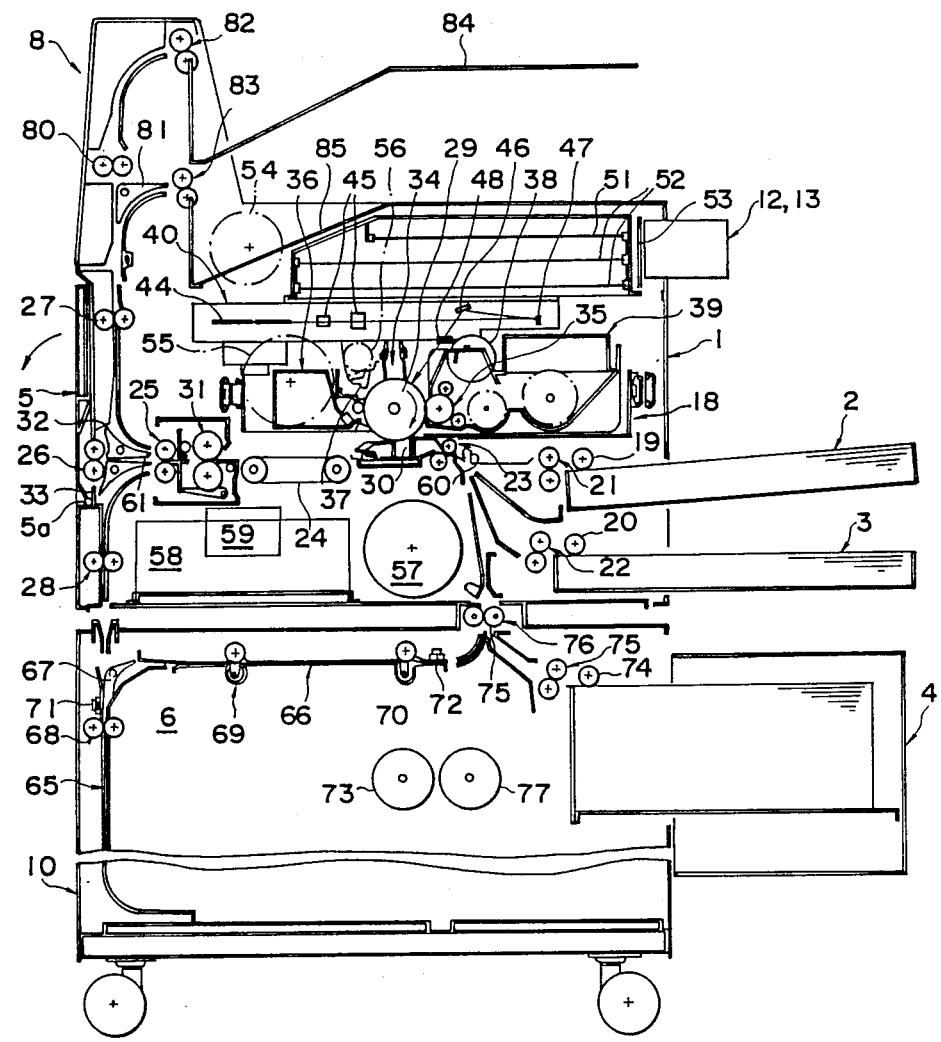
FIG. 3 is a schematic illustration showing in detail the internal structure of the laser printer system of FIG. 2.

Referring now to FIG. 3, the internal mechanical structure of the present laser printer system is described. The laser printer main unit 1 houses therein a pair of pick-up rollers 19 and 20, which are spaced apart from each other vertically, two pairs of paper feed rollers 21 and 22 and a pair of registration rollers 23. A first paper feed path extends from an upper paper feed station where the paper pick-up roller 19 and the pair of the paper feed rollers 21 are positioned, to the pair of registration rollers 23. Similarly, a second paper feed path is defined as extending from a lower paper feed station where the paper pick-up roller 20 and the pair of paper feed rollers 22 are positioned, to the pair of registration rollers 23. Thus, the first and second paper feed paths merge at a location immediately in front of the pair of registration rollers 23. Also in the laser printer main unit 1, there are provided a transportation belt 24, a pair of transportation rollers 25, a pair of paper discharge rollers 26, a pair of upper transportation rollers 27 and a pair of lower transportation rollers 28. A number of guide plates are also provided to define a paper transportation path together with the elements described above.

An OPC photosensitive drum 29 is rotatably provided above a transportation path defined between the registration rollers 23 and the transportation belt 24. An image transfer corona unit 30 is positioned below the drum 29, and an image fixing unit 31 is positioned between the transportation belt 24 and the transportation rollers 25. In addition, a pair of path switching pawls 32 and 33 is positioned between the transportation rollers 25 and the paper discharge rollers 26. Around the drum 29 there are disposed various imaging devices, including a corona charger 34, a developing device 35, a cleaning device 36 and a charge removing light-emitting diode 37. The developing device 35 is mounted on a drawer 18, together with a developing motor 38, a toner cartridge 39 and the cleaning device 36. Above the drum 29 and its associated imaging devices there is arranged a laser write-in unit 40 which includes a polygon mirror 44 for deflecting a laser light beam from a semiconductor laser (not shown in FIG. 3), a f$\theta$ lens 45, a first mirror 47, a second mirror 46 and a dust-proof glass 48. The detailed structure of this laser write-in unit 40 will be described later.

Above the laser write-in unit 40 there is disposed a printed circuit board or PCB rack 53 which encloses therein a printer engine board 51 and a pair of interface controller or IFC boards 52. The laser printer main unit 1 is also provided with a PCB pack fan 54, a main fan 55 and an ozone fan 56. On the other hand, below the paper transportation path described above there are disposed a main motor 57 for rotating the photosensitive drum 29 and various rollers described above, a power supply unit 58, a high voltage power supply unit 59 for applying a high voltage to various corona devices described above, and so on. The upper and lower paper feed cassettes 2 and 3 are detachably mounted in the laser printer main unit 1. The rear paper discharge tray 5 is set in the upright position as shown in FIG. 3 when not in use and is pivotted to its horizontal position around a shaft 5a as indicated by the arrow when in use. A registration sensor 60 and an image fixing station exit sensor 61 are also provided.

The table 10 contains therein the both side processing unit 6 which is composed of an inversion path 65, a standby path 66, a paper path switching pawl 67, three sets of transportation rollers 68, 69 and 70, each provided with a clutch, a both side unit entrance sensor 71, a both side unit exit sensor 72 and a both side drive motor 73. The table 10 is also provided with a paper pick-up roller 74 and paper feed rollers 75 for feeding a sheet of paper supplied from the large quantity paper feed unit (LCIT) 7. In addition, the table 10 is provided with paper feed rollers 76 used in common between the both side processing unit 6 and the large quantity paper feed unit 7, and is also provided with an LCIT drive motor 77. It is to be noted that, although not shown, the large quantity paper feed unit 7 is also provided with a mechanism for moving the paper stored therein upward or downward and width a drive motor therefor.

On the other hand, the large quantity paper discharge unit (LCIT) 8 comprises a transportation rollers 80, a paper path switching pawl 81, an upper stage paper discharge rollers 82, a lower stage paper discharge rollers 83, an upper stage paper discharge tray 84 and a lower stage paper discharge tray 85. In addition, although not shown specifically, the large quantity paper discharge unit (LCIT) 8 also comprises a mechanism for moving two stages of paper discharge trays 84 and 85 in the widthwise direction so as to shift the paper discharging location, its driving motor (job separation motor), and various switches and sensors.

Figure 4:
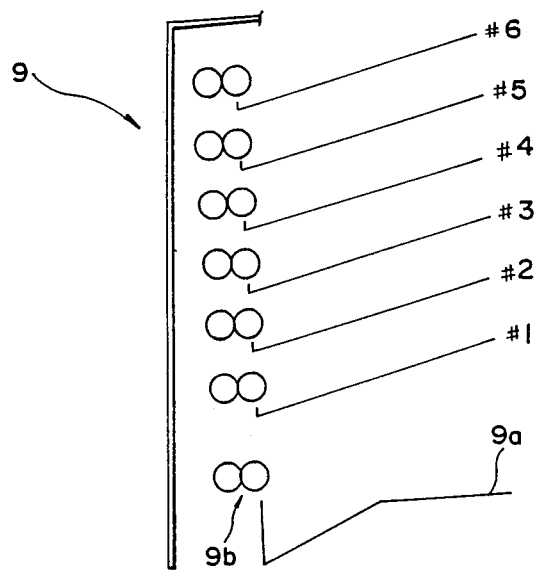
FIG. 4 is a schematic view showing the mail box shown in FIGS. 1E and 1F.

In place of the large quantity paper discharge unit 8, a mail box 9 of a multistage upper discharge unit as shown in FIG. 4 may be mounted on the laser printer unit 1. The mail box 9 comprises one stage of a base stacker 9a capable of discharging approximately 500 sheets of paper, and six stages of stack bins #1 through #6 each capable of discharging 50 sheets of paper. A paper discharging opening of each of the stages is provided with a pair of paper discharge rollers 9b. The pair of paper discharge rollers 9b associated with the base stacker 9a has an offset stack function in which they are made to shift in the axial direction at the time of discharging paper so that a paper discharge position can be set at the left and right-hand sides.

In a control system for this laser printer system which will be described in further detail later, data such as image data supplied from a host system such as a computer, work station or word processor, is inputted into the printer engine board 51 through the IFC board 52, and then the data is processed at the printer engine board 51 to select a desired paper feed path and also a desired paper discharge path. Then, in response to a print start request signal, a print operation is initiated. Upon initiation of a print sequence, any pick-up rollers 19, 20 and 74 are driven to rotate in a predetermined sequence so that feeding of a sheet of paper is initiated by a selected one of the upper paper feed cassette 2, lower paper feed cassette 3 and large volume paper feed cassette (LCIT) 7. The sheet of paper thus fed is then transported by either pair of transportation rollers 21, 22 and 75 until this leading edge comes into abutment against the registration rollers 23, where upon the transportation of the sheet of paper is temporarily halted.

On the other hand, the photosensitive drum 29 is driven to rotate at constant speed in the direction indicated by the arrow. During its rotation, the drum 29 is uniformly charged to a predetermined polarity by the corona charging device 34. The uniform charged drum 29 is then exposed to a laser beam modulated with image data by the laser write-in unit 40, so that the uniform charge is selectively dissipated to thereby form an electrostatic latent image corresponding in pattern to the image data on the drum 29. In this case, the laser beam is scanned repetitively across the width of the drum, i.e., in the main scanning direction, while the drum 29 is in rotating, i.e., moving in the auxiliary scanning direction. The latent image thus formed is then developed by the toner supplied by the developing device 35 to thereby form a toner image. The toner image is then transferred to a sheet of paper which is fed at predetermined timings by the registration rollers 23, by the image transferring device 30 at an image transferring station where the sheet of paper is brought into contact with the drum 29. The sheet of paper having the thus transferred toner image thereon is then separated from the drum 29 and is then transported on the transportation belt 24 to the image fixing device 31, where the transferred image is permanently fixed to sheet of paper. Thereafter, the sheet of paper having the fixed toner image thereon is transported out to an intended paper discharge unit after passing through the paper discharge rollers 25. That is, the sheet of paper is transported through a paper discharge path selectively established by the positions of the paper path switching pawls 32, 33 and 81, and is discharged to a selected one of the upper and lower paper discharge trays 84 and 85 of the large volume paper discharge unit 8 and the rear paper discharge tray 5. It is to be noted that normally one of the trays in the large volume paper discharging unit 8 is selected to discharge paper with its face down; however, in the case where use is made of paper having a relatively large stiffness, such as envelopes and postcards, the rear paper discharge tray 5 is selected for use. However, if the rear paper discharge rollers 26 are not set in there operative position of being pivotted to the horizontal position as indicated by the arrow in FIG. 3, the rear paper discharge tray 5 cannot be selected for use.

In the case where a both side print mode has been selected, a sheet of paper which has been subjected to printing on one surface thereof is transported into the both side processing unit 6 within the table 10 by the lower transportation rollers 28. The sheet of paper is then transported into the inversion path 65 over a predetermined distance. Thereafter, the sheet of paper is held in a motionless sate and is then transported in the reversed direction into the standby path 66 where the sheet of paper is again held in a motionless state in a standby status. Thereafter, the sheet of paper in the standby status is transported into the laser printer main unit 1 at predetermined timings by the paper feed rollers 76. Thus the other surface of the sheet of paper is presented for printing as the sheet of paper moves past the drum 29. Then the sheet of paper which has been subjected to the both side printing is discharged to a selected one of the paper discharging locations.

LASER WRITE-IN UNIT AND ITS CONTROL

Figure 5:
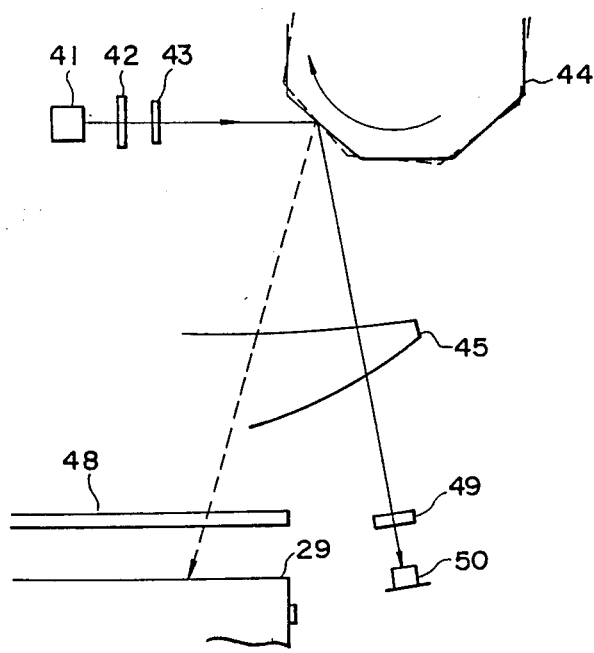
FIG. 5 is a schematic view showing more in detail the laser write-in unit provided in the laser printer system shown in FIG. 2.

The structure of an optical system in the last write-in unit 40 of FIG. 3 is schematically shown in FIG. 5. As shown, a laser beam emitted from a semiconductor laser 41 is collimated by a collimator lens, which is not shown, and the thus collimated laser beam is then passed through a cylindrical lens 42 and a half wavelength plate 43 to impinge upon a rotating multi-facet mirror (polygon mirror) 44. The laser beam is thus deflected by the polygon mirror 44, which is driven to rotate at constant speed in a predetermined direction as indicated by the arrow, over a predetermined angle, and the thus deflected laser beam then passes through an fθ lens 45 and is reflected by first and second mirrors 46 and 47 shown in FIG. 3, respectively. Then, the laser beam passes through a dust-proof glass 48 to impinge on the photosensitive drum 29 where the beam is scanned across the width of the drum 29, i.e., in the main scanning direction, repetitively. As is well known in the art, the fθ lens 45 is provided as a correction lens to keep the scanning speed of the laser beam constant in the main scanning direction on the drum 29. The fθ lens 45 also has a role of correcting the surface inclination of the polygon mirror 44. Also provided as shown in FIG. 5 is a sync position detecting sensor which includes a cylindrical lens 49 and a photodetector 50 disposed in the vicinity of the drum 29. The sync position detecting sensor is positioned so as to receive the laser beam deflected by one facet of the polygon mirror 44. The detection of the sync position is carried out before scanning the drum 29 in the main scanning direction.

Figure 6:
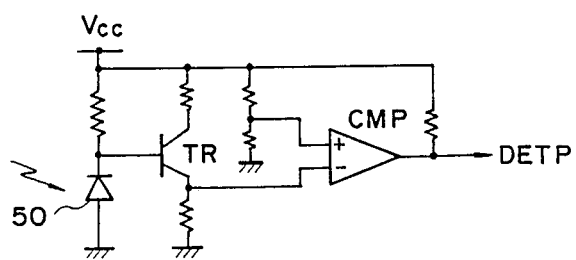
FIG. 6 is a circuit diagram showing an example of a sync signal generating circuit suitable for use with the laser write-in unit shown in FIG. 5.

FIG. 6 shows a circuit for producing a sync signal DETP. An output from the photodetector 50, which is produced when the photodetector 50 has received a laser beam, is amplified by a transistor TR and is supplied to a comparator CMP, which thus outputs a sync signal DETP.

Figure 7:
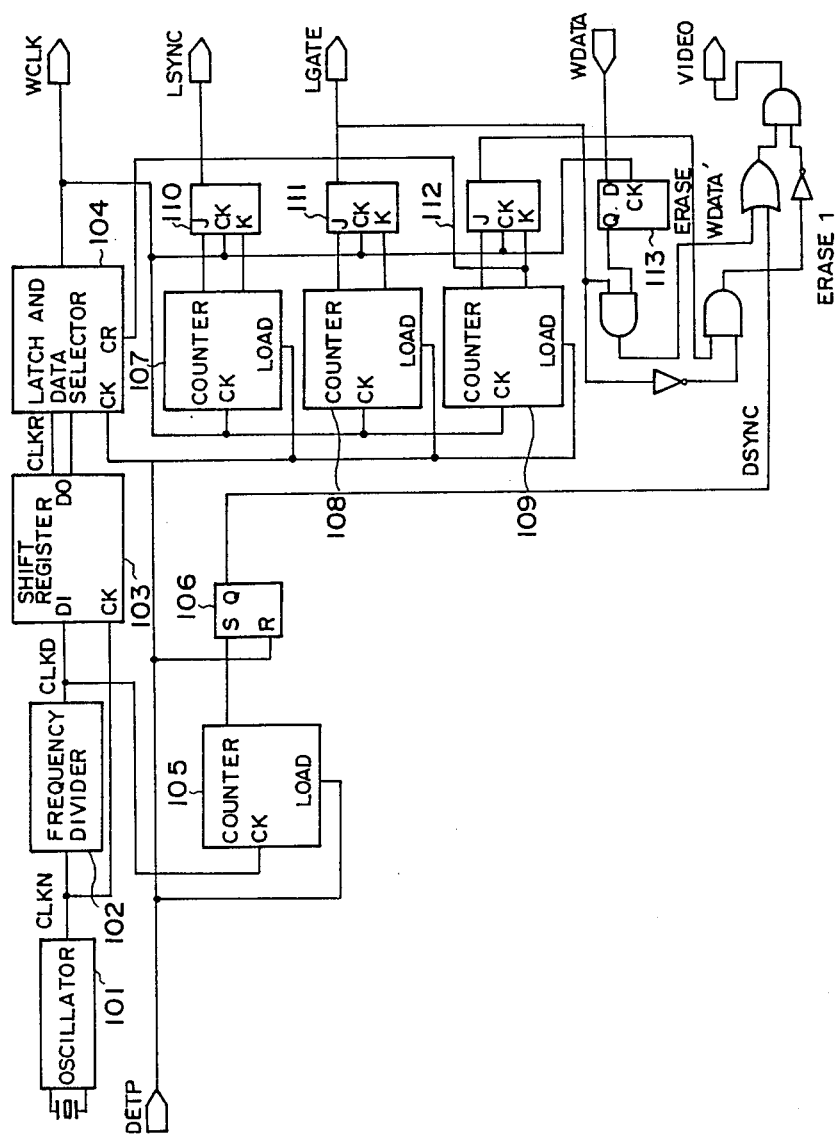
FIG. 7 is a block diagram showing an example of a write control circuit for use in the laser printer system of FIG. 2.
Figure 8:
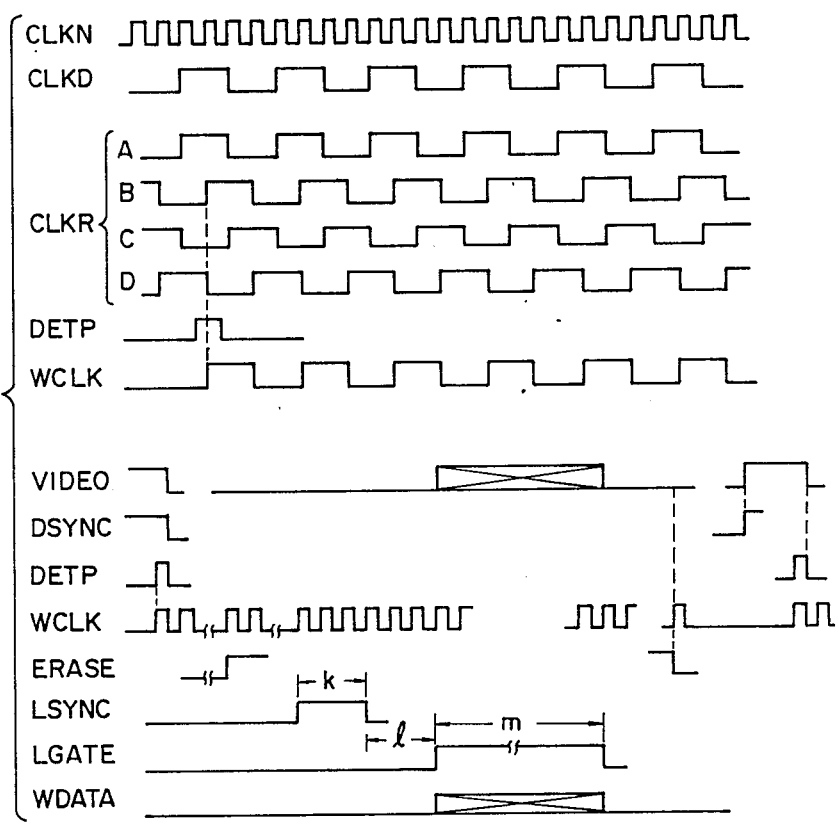
FIG. 8 is a timing chart which is useful for understanding the operation of the structure shown in FIG. 7.

FIG. 7 shows the overall structure of the write control circuit, and FIG. 8 is a timing chart which illustrates the timing relationship of various signals in the write control circuit. As shown in FIG. 7, an oscillator 101 outputs a clock CLKN, which is N times the frequency of a write sync clock WCLK, in response to write sync accuracy of a value corresponding to 1/N dot. The clock CLKN is frequency-divided by 1/N by a frequency divider 102, which outputs a fundamental clock CLKD of the sync clock signal WCLK. This fundamental clock CLKD is inputted into a shift register 103, which then outputs N number of clocks CLKR-A through CLKR-D (FIG. 8) which are shifted in phase from one another by the period of the clock CLKN and which have the same period as that of the fundamental clock CLKD. A latch and data selector 104 selects one of the clocks CLKR-A through CLKR-D in synchronism with the input phase of a sync detection signal DEPT. The sync detection signal DEPT is a signal which has been obtained by wave-shaping the last beam detection signal from the photodetector 10. Then, the selector 104 outputs a signal WCLK which is a write sync clock and is always corrected in phase at a degree of accuracy corresponding to 1/N dot. It should also be noted that this signal WCLK serves as a reference clock for a write region in the main scanning direction.

With respect to a modulation signal VIDEO supplied to the semiconductor laser 41, an output DSYNC of an S-R flip-flop 106 is rendered "true" by an output from a sync detection counter 105 so that the signal VIDEO is also rendered "true", whereby the semiconductor laser 41 is activated to emit light. Under this condition, when the laser beam is detected by the photodetector 50, the signal DETP is rendered "true" and in synchronism therewith the signal WCLK is produced. The signal DETP also causes the initial value to be loaded into the sync detection counter 105 to thereby initiate counting again, and at the same time causes the S-F flip-flop 106 to be reset to thereby render the signal DSYNC "false". Because of this, the signal VIDEO is rendered "false" so that the semiconductor laser 41 is reactivated to cease emission of light. On the other hand, the signal DETP causes counters 107 through 109 for producing write start sync signal LSYNC, a write region signal LGATE and an outside write region laser light setting signal ERASE, respectively, to be initialized. It is to be noted that there are also provided J-K flip-flops 110 through 112 and a D-type flip-flop 113 connected as shown. Counters 107, 108 and 109 each start counting with the signal WCLK as a clock signal.

The signal ERASE is a signal which positively causes the modulate on signal VIDEO to be turned off to thereby prevent undesirable light from being applied to the photosensitive drum 29 outside of the write region. When signal ERASE is rendered "true", the signal LSYNC is rendered "true" for k number of clocks after a while This signal LSYNC is a signal which advises the IFC 52 to initiate transmission of write data. With a delay of l number of clocks after the signal LSYNC has been rendered "false", the signal LGATE is rendered "true". The signal LGATE is a write region signal and it is maintained "true" corresponding to a write area, during which write data from the IFC 52 may be received. For example, if the resolution is 1/300" and the write region is 8", it is maintained "true" for 2,400 WCLK. While the signal LGATE is "true", write data WDATA is rendered valid and the modulation signal VIDEO is varied in accordance with a signal WDATA synchronized by the signal WCLK. Thus, the laser light beam is turned on and off by the write data WDATA itself to thereby allow to a valid image to be obtained.

When the signal LGATE is rendered "false", the signal VIDEO is also rendered "false" by the signal ERASE, so that the semiconductor laser is extinguished. When the signal ERASE is rendered "false", the latch and data selector 104 is cleared so that the signal WCLK is turned off. Thereafter, the output of the counter 105 is rendered "true" and thus the signal DSYNC is rendered "true", so that the signal VIDEO is again rendered "true". Then, the semiconductor laser is again activated to emit light so as to carry out sync detection for the next optical scanning operation. In this manner, the same write-in process as described above will be carried out repetitively.

SYSTEM STRUCTURE OF THE CONTROL SYSTEM

Figure 9:
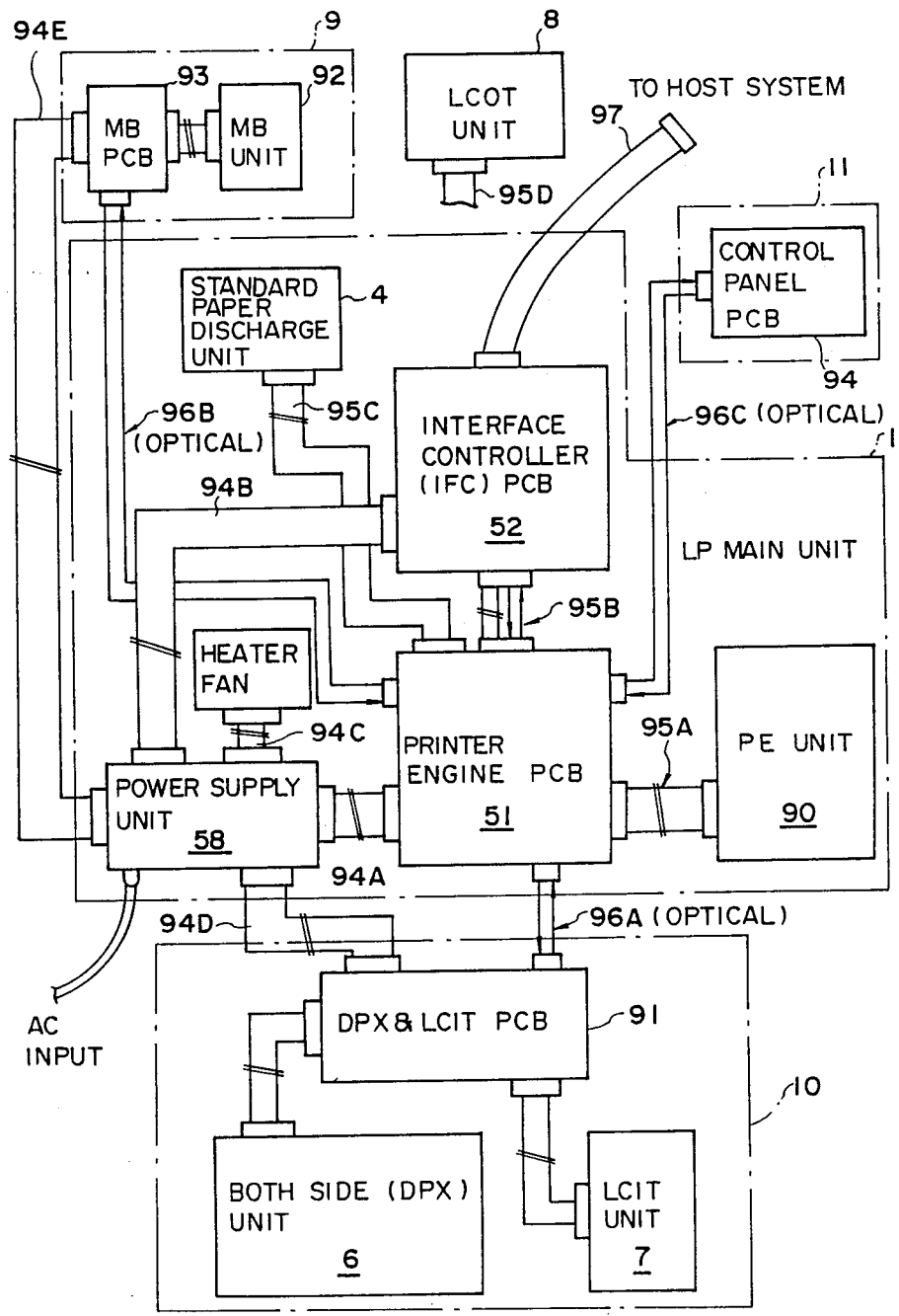
FIG. 9 is a block diagram showing the interconnecting relationship among various units in the laser printer system of FIG. 2 in accordance with one embodiment of the present invention.

FIG. 9 is a system block diagram showing the connection relationship among various units in the control system of the present embodiment. A power supply unit 58 is directly connected to a printer engine PCB 51 through a power supply line 94A. A power supply line 94B connects the interface controller (IFC) PCB 52 to the unit 58. Heaters and fans 54-56 of the image fixing device inside of the laser printer main unit 1 are connected to the unit 58 through a power supply line 94C. A power supply line 94D connects the unit 58 to DPX & LCIT PCB 91 for controlling the both side processing unit 6 and the large volume paper feed unit 7 within the table 10. A power supply line 94E connects the unit 58 to MB PCB 93 for controlling the mail box (MB) unit 92, if the mail box 9 is added. Moreover, the printer engine PCB 51 and the printer engine unit (including the various mechanical structural elements shown in FIG. 3) 90 and also the printer engine PCB 51 and the IFC PCB 52 are connected by connection lines, each including a power supply line and a signal line, 95A and 95B, respectively. When the standard paper discharge unit 4 is provided, it is connected to the printer engine PCB 51 by a connection line 95C including a power supply line and a signal line. Moreover, when the large volume paper discharge unit (LCOT) 8 is provided, it is also connected to the printer engine PCB 51 by a connection line 95D which also includes a power supply line and a signal line.

On the other hand, the printer engine PCB 51 is connected to the DPX & LCIT PCB 91, to the MB PCB 93, and also to the control panel PCB 94 by respective pairs of optical fiber cables 96A, 96B and 96C for transmission and reception of signals by means of an optical communication method. The IFC PCB 52 is connected to a host system, such as a computer or word processor, through a connection cable 97, and data, such as image data, is inputted into the IFC PCB 52 through this connection cable 97. It should also be noted that power is also supplied to the control/display panel PCB 94 from the power supply unit 58, printer engine PCB 51, or IFC PCB 52. It should also be noted that each of the printer engine PCB 51, IFC PCB 52, LCOT 8, DPX & LCIT PCB 91, MB PCB 93 and the control panel PCB 94 is provided with a central processing unit or CPU for controlling the local operation of each of these units.

CONTROL PANEL

Figure 10:
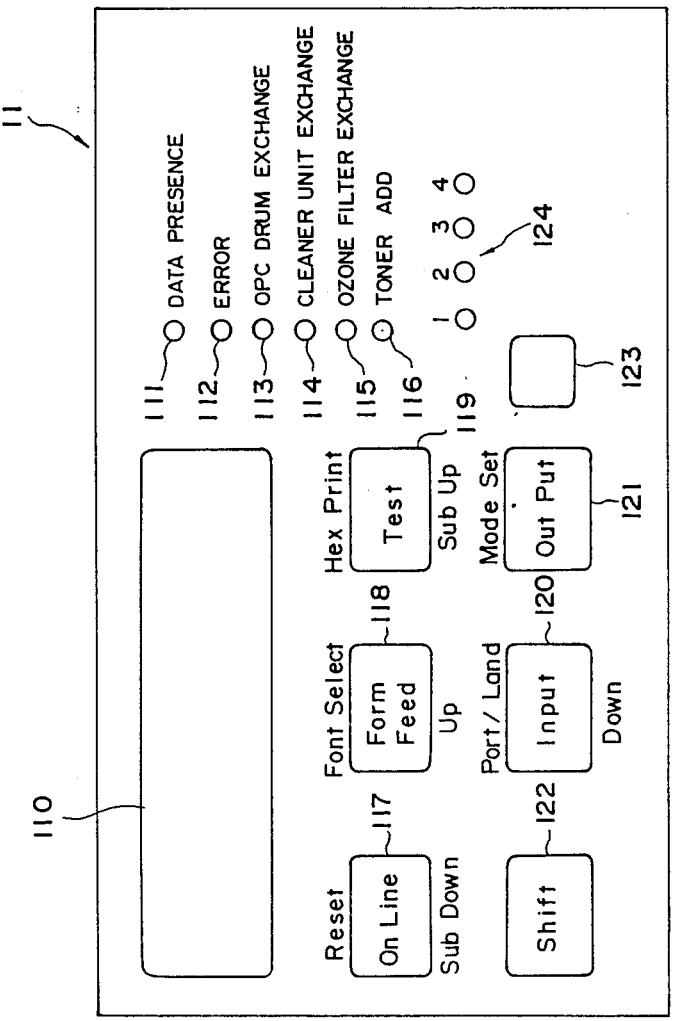
FIG. 10 is a schematic view showing the control panel shown in FIG. 2.

A description is given of a detailed structure of the control panel 11 shown in FIG. 2 with reference to FIG. 10.

The control panel 11 includes a character display unit (LCD) 110 of 24 characters by two lines, six momentary switches 117 through 122, a select switch 123 for selecting either one of a plurality of host interfaces (four host interfaces in the present embodiment), and a group 124 consisting of four LED indicators for indicating respective selected host interfaces. The character display unit 110 displays status display, selection display, error display and so on of the laser printer system in Japanese or another language (which may by selected by default setting as described later). One character may be formed by 5×7 dots for example. The status display of the printer system containing display of printer status, self-test status and selection status with respect to paper. The printer status display is concerned with warming-up, on-line/off-line, and the presence of data to be printed The self-test status display is concerned with diagnosis, loop-back test and test printing. The paper selection status display is concerned with information on the paper feed cassette (or unit), a size of a sheet of paper, paper discharge tray and one-side/both side printing. In the selection display, there may be displayed contents selected by the switches 117 through 121, menus in the mode set status and selection items associated therewith. The error display contains a message of a printer engine error and a message of a printer controller error. When an error regarding the printer engine occurs, the printer ceases all the functions thereof. When an error regarding the printer controller occurs, information on the raised error except for a fatal error is stacked in an error history memory until the error is reset. Then when a summary sheet is requested, the history of the raised error is reported by the summary sheet, and thereafter the error information which is being stacked in the error history memory is cleared.

A description is given of the six LED indicators (hereafter each simply referred to as a LED) 111 through 116. The LED 111 is used for indicating that the printer has data to be printed in the built-in buffer. The LDE 111 is periodically turned on and off when the printer has received data to be printed, and is maintained ON when the printer does not receive any data for approximately one minute. The LED 112 is an error indicator and is turned on when the printer has an error. The content of the error is displayed on the character display unit 110. The LED 113 is turned on when the OPC photosensitive drum requires to be exchanged with a new one. Even in this state, the printing operation may be continued. However the quality of printing reproduction may be degraded. The LED 114 is turned on when the cleaner unit requires to be exchanged. Even in this case, the printing operation may be continued, however the quality of printing reproduction may be degraded. The LED 115 is turned on when the ozone filter requires to be exchanged. The LED 116 is turned on when additional toner is needed. Even in this state, the printing operation may be continued, however the quality of printing reproduction may be degraded.

A description is given on functions of the six momentary switches (hereafter simply referred to as switches) 117 through 122. The switches 117 through 121 have respective standard functions shown inside respective frames thereof when each switch is depressed separately. That is, at this time, the switch 117 functions as an on-line switch, the switch 118 as a form (paper) feed switch, the switch 119 as a test switch, the switch 120 as an input (paper feed) selection switch, and the switch 121 as an output (paper discharge) selection switch. On the other hand, when each of the switches 117 through 121 is depressed while depressing the shift switch 122, the switches 117 through 121 have respective switch functions shown above respective frames thereof. That is, at this time, the switch 117 functions as a reset switch, the switch 118 as a font selection switch, the switch 119 as a hexa-print switch, the switch 120 as a portrait/landscape selection switch, and the switch 121 as a mode set switch.

Further, when the switch 121 is depressed together with the shift switch 122 and thereby the printer is set in the mode set state, the switches 117 through 120 have respective functions shown below the respective frames thereof. That is, the switch 118 functions as an up switch, the switch 120 as a down switch, the switch 119 as a sub-up switch and the switch 117 as a sub-down switch. The up switch 118 and down switch 120 may select one of menus to be set, and the sub-up switch 119 and the sub-down switch 117 may select one of items provided in each of the menus (particulars: set contents).

The switch 123 is a switch for selecting a desired host interface upon selecting a desired paper discharge tray by using the output selection switch 121. Every time the switch 123 is depressed, one of the host interfaces which is presented for selection is sequentially switched, and the corresponding one of the four LEDs forming the group 124 is turned on.

All the switches described above except for the function of on-line switch and reset switch obtained by the switches 117 are not operable in the on-line state.

A more detailed description is given of the standard functions of the switches 117 through 121.

When the switch 117 is depressed, the state of the printer is alternately switched to the on-line and off-line states. The operation of host system is immediately ceased when the printer is switched from the on-line state to the off-line state. However the printer continually processes the data which has already been supplied thereto. When the form feed switch 118 is depressed, if the buffer provided in the printer has any data, the printer prints all the data stored in the buffer. If there is no data to be printed in the buffer, the form feed switch 118 does not operate. When the test switch 119 is depressed, if the buffer in the printer has no data and the test print mode has not been set, the summary sheet and a field service report (described in detail later) are printed. On the other hand, when the test print mode is set, the printer starts the test print. If there remains data to be printed in the buffer, a message, "DEPRESS FORM FEED SWITCH", is displayed on the character display unit 110, and the test printing operation is not performed. When printing of the summary sheet and the field service report is completed, the controller abandon all the error histories which are being stacked in the built-in memory. Then the controller returns to the state just before the test switch 119 is depressed without returning to the default state (a state at the time of turning the power on).

When the input selection switch 120 is depressed, information indicating the paper feed cassette (or unit) being currently selected is initially displayed on the character display unit 110. And thereafter, every time the input selection switch 120 is depressed, information indicating the usable paper feed cassettes, the upper paper feed cassette 2, lower paper feed cassette 3 and LCIT 7 in the example shown in FIGS. 2 and 3, are sequentially displayed, so that the usable paper feed cassettes are sequentially presented for selection.

Then when the printer returns to the on-line state, a code corresponding to the selected paper feed cassette is set in the register. At this time if the size of a sheet of paper which is accommodated in the cassette indicated by the code thus set is different from the size designated previously, the setting status with respect to a paper length, four margins (peripheral blanks) and HMI/VMI returns to those in the default state, depending on the selected size of the sheet of paper. On the other hand, a page orientation (described later) and font selection do not return to those in the default state.

When the output selection switch 121 is depressed, information indicating the paper discharge tray being selected is initially displayed on the character display unit 110. Thereafter every time this switch 121 is depressed, information indicating the usable paper discharge trays is sequentially displayed one by one, so that the usable paper discharge trays are sequentially presented for selection.

The usable paper discharge trays in the example of FIG. 3 are the rear paper discharge tray 5 of the laser printer unit 1, and the upper stage paper discharge tray 84 and lower stage paper discharge tray 85 of the large quantity paper discharge unit 8. As described previously, each of the upper and lower stage paper discharge trays 84 and 85 can take two paper discharging positions (right-hand shift and left-hand shift). In the case where the mail box 9 as shown in FIG. 4 is used, the usable paper discharge trays are the rear paper discharge tray 5, one base stacker 9a (which can shift to the right-hand position and left-hand position) and six stack bins #1 through #6. Upon selecting one or more usable paper discharge trays, it is possible to select either one of the paper discharge trays for each of the host interfaces, which are presented for selection by the selection switch 123. That is, one paper discharge tray is exclusively used for one host system. The above selecting operation results in the following advantages. In the case where the present laser printer system is used in common for the host systems connected to the respective host interfaces, the sheets of paper on which data supplied from the respective host systems have been printed may be discharged to the corresponding paper discharge trays which are selected beforehand in the above manner. Therefore, the operation of assorting the sheets of paper can be eliminated.

A description is given of switch functions serving as the combination switches which are available when the switches 117 through 121 are depressed together with the shift switch 122.

When the switch 117 (reset switch) is depressed, the printer returns to the default state (a predetermined state which can be set by the mode setting operation described later), and the printer controller is immediately deactivated with respect to the host system. At this time, a message "RESET" is displayed on the character display unit 110, and the diagnosis is then effected.

When the switch 118 (font select switch) is depressed, a name of font which is being selected is displayed on the character display unit 110, and every time this switch is depressed, all the other font names which are stored in the laser printing system or the font cartridges 12 and 13 (FIG. 2) are sequentially displayed on the character display unit 110 and thereby the fonts may be selected one by one. Finally, the initial font name is displayed again. Thereafter when the laser printer system is made to return to the on-line state, the font name being displayed at that time is registered in a built-in memory as the font name to be used.

Each time that the switch 119 (hexa-print switch) is depressed, if there is no data to be printed in the laser printer system, the printer mode is alternately switched between the hexa print mode and the normal print mode. When the the laser printer system is made to return to the on-line mode, the selected printer mode is registered in the memory. If there exists data to be printed, a message, "DEPRESS FORM FEED SWITCH" is displayed on the character display unit 110, and the above switching operation is not carried out.

In the hexa-print mode, the laser printer system prints out hexa-data (hexadesimal ASCII codes) supplied from the host system as it is. Therefore, it becomes possible to easily check whether or not the host system is operating normally and confirm an operating status of the host system after changing a program which runs therein. At this time, a message, "HEXA-DUMP MODE", is displayed on the character display unit 110 even in the on-line state, and functions of the font selection, portrait/landscape selection and mode set by the switches 118, 120 and 121 are made to not operate. When the laser printer system is switched to the normal print mode, it returns to the default state as in the case as a result of depressing the reset switch 117.

When the switch 120 (portrait/landscape selection switch) is depressed, if there is no data to be printed in the printer unit 1, the page orientation being set is first displayed on the character display unit 110. Then, in order to allow the selection of a desired page orientation, the four following modes are sequentially displayed one by one on the character display unit 110 every time that the switch 120 is depressed:

Mode a: portrait/WP mode;
Mode b: landscape/DP mode;
Mode c: portrait/WP mode; and
Mode d: landscape/DP mode.

"WP" mode denotes a word processor mode in which the printing is carried out with a line pitch of 6 lpi (a character pitch provided by the default set) irrespective of the size of the sheet of paper. "DP" mode is a data processing mode in which 132 characters are printed per one line and 66 lines are printed for one page.

When the laser printer system returns to the on-line state, the mode being displayed on the character display unit 110 at this time is registered in the memory. When the switch 120 is depressed, if there is data to be printed out, a message, "DEPRESS FORM FEED SWITCH" is displayed on the character display unit 110, and the above operation is not carried out.

Figure 11:
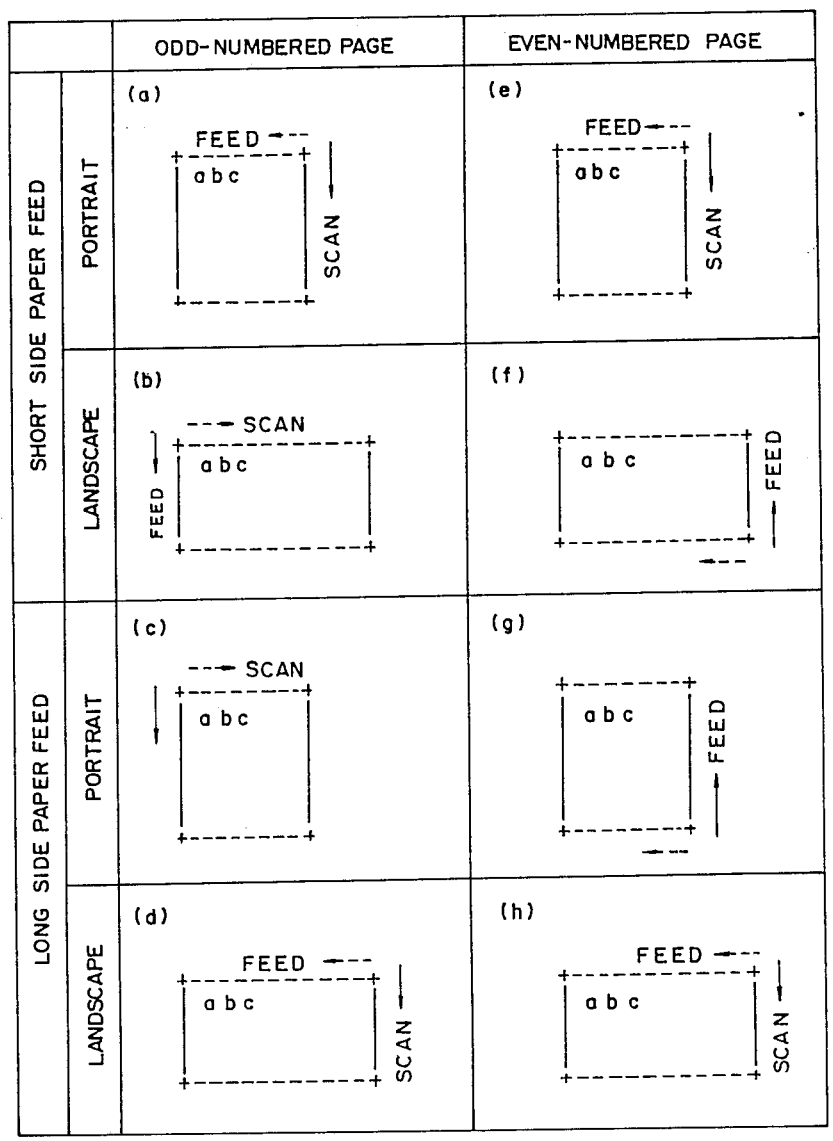
FIG. 11 is a view for explaining a page orientation.

FIG. 11 shows arrangements of characters for each of the above-described modes, directions of feeding the sheet of paper, and scanning directions.

"Portrait" mode is a mode in which characters are arranged in a direction corresponding to relatively short ends of the sheet of paper. "Landscape" mode is a mode in which characters are arranged in a direction corresponding to long sides of the sheet of paper. A sideways paper (short side) feeding mode is a mode in which a sheet of paper is fed in a direction corresponding to the relatively short ends thereof. A lengthways paper (long side) feeding mode is a mode in which a sheet of paper is fed in a direction corresponding to the long sides thereof. When one-side printing mode is set or when an odd-numbered page of the sheet of paper is printed in the both side printing mode, either one of the four modes shown in FIG. 11(a) through 11(d) may be selected. When an even-numbered page of the sheet of paper is printed out in the both side print mode, the mode is automatically switched to one of the modes shown in FIGS. 11(e) through 11(h).

When the shift switch 122 is depressed together with the switch 121, the laser printer system is switched to the mode setting state. In this state, a desired menu can be selected from among the menus by sequentially feeding up and feeding down the menus one by one on the display unit 110 by using the up switch 118 and down switch 120. Further, a desired particular for each of the menus can be selected by sequentially feeding up and down the particulars one by one on the display unit 110 by using the sub-up switch 119 and sub-down switch 117.

The present embodiment has the following menus and particulars. The menus are represented by numerals with parentheses and the particulars are represented by numerals surrounded circles.

---

(1) Hardware Interface
  ① parallel interface/Centronics
  ② serial interface/RS-232C
  ③ serial interface/RS-422
(2) Soft Interface
  ① Dyabro 630
  ② HP laser jet plus
  ③ *** proprinter
  ④ IC cord emulator
(3) Page Orientation in Default
  ① mode 1 (portrait/WP mode)
  ② mode 2 (landscape/DP mode)
  ③ mode 3 (portrait/WP mode)
  ④ mode 4 (landscape/DP mode)
(4) Line Pitch in Default
  ① 6 lpi    ② 8 lpi    ③ 3 lpi
  ④ depending on font
(5) Character Pitch in Default
  ① 10 cpi    ② 12 cpi    ③ 16.7 cpi
  ④ depending on font
(6) Font in Default
  ① Courier 10
  ② Prestage Elite 12
  ③ Letter Gothic 16.7
  ④ Century PS
  ⑤ Font in cartridge -continued (7) Language displayed in Character Display Unit in Default (possible in the initial setting mode)
① Japanese ② English ③ Germany
④ French ⑤ Spanish ⑥ Italy
(8) Paper Feed in Default
① upper paper feed cassette
② lower paper feed cassette
③ large quantity paper feed cassette (LCIT)
(9) Paper Discharge in Default (with LCOT used)
① lower stage paper discharge tray (left-hand shift)
② lower stage paper discharge tray (right-hand shift)
③ upper stage paper discharge tray (left-hand shift)
④ upper stage paper discharge tray (right-hand shift)
(10) Paper Discharge in Default (with the mail box used)
① base tray (left-hand shift)
② base tray (right-hand shift)
③ bin #1  4 bin #2  5 bin #3
④ bin #4  5 bin #5  6 bin #6
(11) Print Paper Mode in Default
① one-side printing mode
② both side printing mode
(12) Automatic Paper Feed Tray Selection Mode
① disable
② enable
(In the enable mode, if all the sheets of paper in the paper feed tray selected during the printing have been exhausted, and if there are sheets of paper of a size in at least one of the other trays (cassette), the controller automatically selects the other tray and the printing is continued)
(13) Test Printing in which Test Pattern #1 is used:
a number of sheets of paper to be printed: 0-4095
(14) Test Printing in which Test Pattern #2 is used:
a number of sheets of paper to be printed: 0-4095
(15) Test Printing in which Test Pattern #3 is used:
a number of sheets of paper to be printed: 0-4095
(16) Test Printing in which Test Pattern #4 is used:
a number of sheets of paper to be printed: 0-4095
(17) Field Service Report in Default
① summary sheet output by depression of by the test switch
② field service sheet output by depression of the test switch
③ test print by the test switch
(18) Jam Backup Mode (possible only in the initial setting mode)
① Image data supplied from the host system is abandoned when paper jamming occurs.
② Image data supplied from the host system is compressed and is then stored as backup data when paper jamming occurs
③ All the image data supplied from the host system are stored for backup when paper jamming occurs
(19) Usable Capacity of Jam Backup Buffer (possible at the initial setting mode)
① 16 Kbytes ② 32 Kbytes
③ 48 Kbytes ④ 64 Kbytes In addition to the above modes, menus regarding communication with host systems and so on may be selected and set, such as a baue rate of a serial interface, a number of data bits, a number of stop bits, a parity bit, a protocol, a timing of a parallel interface and international character sets in the default.

The test print and field service report will be described in detail later.

A non-volatile memory is built in the printer controller described later, and thereby a content set in the above manner are prevented from being lost even when the power is turned off.

HARDWARE STRUCTURE OF PRINTER CONTROLLER

Figure 12:
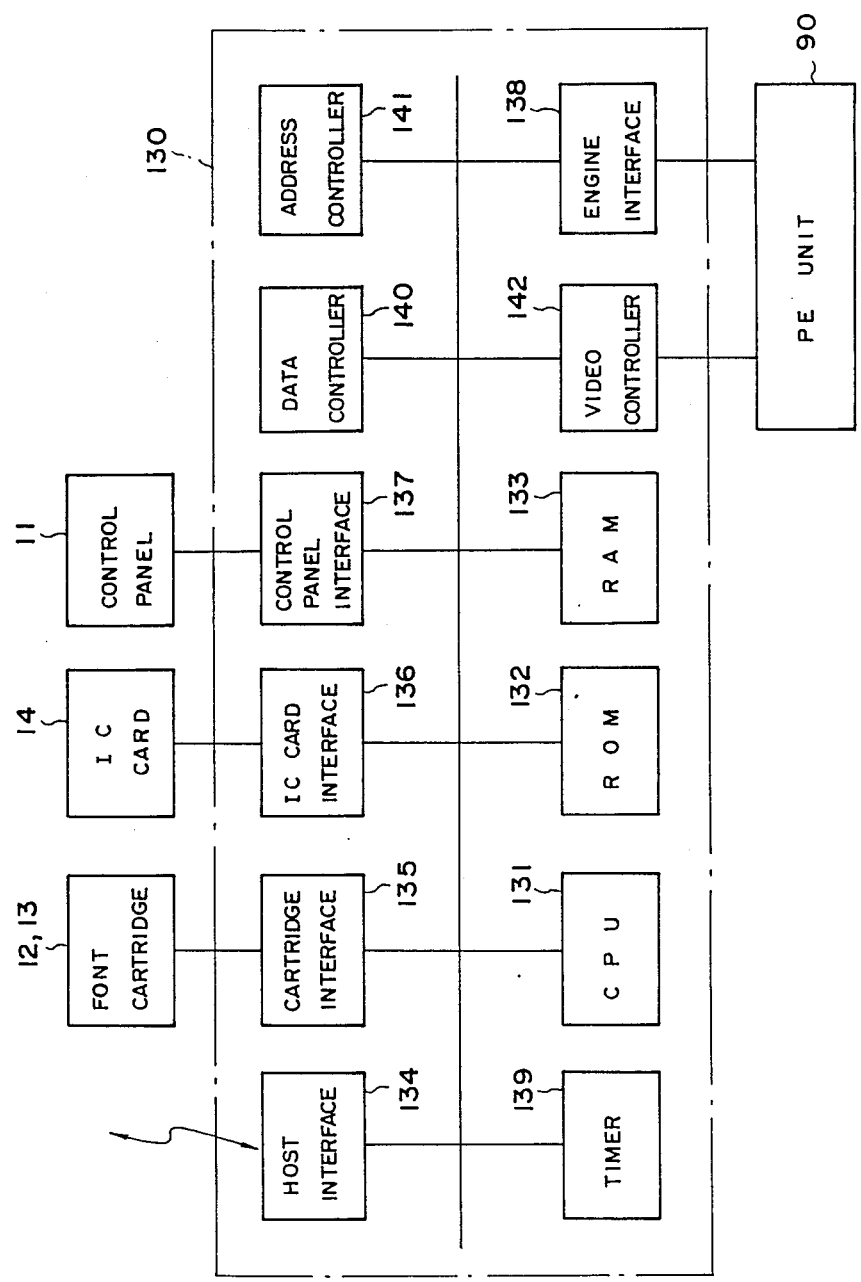
FIG. 12 is a block diagram of a printer controller in the present embodiment.

FIG. 12 is a block diagram of an entire structure of a printer controller consisting of the printer engine PCB 51 and the interface controller PCB 52 shown in FIG. 9.

As shown, the printer controller 130 comprises a central processing unit (CPU) 131, a read only memory (ROM) 132, a random access memory (RAM) 133, a host interface 134, a cartridge interface 135, an IC card interface 136, a control panel interface 137, an engine interface 138, a timer 139, a data controller 140, an address controller 141 and a video controller 142. It is possible to configure a plurality of host interfaces 134, cartridge interfaces 135 and IC cord interfaces 136. The cartridge interface 135 and IC card interface 136 may be omitted if unnecessary. In the present embodiment, there are provided four host interfaces 134, two cartridge interfaces 135 and one IC card interface 136.

The CPU 131 systematically controls the whole of the printer controller 130 and may be constituted by a general 16-bit or 32-bit CPU. The ROM 132 is a program memory and stores microcodes for controlling the CPU 131. Additionally, the ROM 132 stores at least the following softwares (a) through (c) as softwares for directly controlling the hardware:

(a) host interface handler;
(b) printer engine handler; and
(c) control panel handler.

Further, the ROM 132 stores the following softwares (d) through (f) as softwares which can be used in common independent of printer softwares such as a line printer software, a dezzy wheel printer emulation software and a wire dot printer emulation software:

(d) diagnosis program;
(e) test program; and
(f) service program.

The printer softwares are stored in the IC card 14, and are loaded to the RAM 133 when they are required. Alternatively, the printer softwares may be stored beforehand in the ROM 132 as standard printer softwares. The fonts used in the service program is stored in the ROM 132.

The RAM 133 is a random access memory having a large capacity and is used mainly for the following applications:

| (a) input buffer | (b) page buffer |
| (c) video buffer | (d) system memory |
| (d) font file | (f) backup buffer |
| (g) vector file | (h) macrofile |
| (i) image file | (j) print spur file |

Functions of the above applications of the RAM 133 will be described later.

The host interface 134 can select the following interfaces depending on host systems:

(a) parallel interface/Centronics;
(b) parallel interface/SCSI;

(c) serial interface/RS-232C;
(d) serial interface/RS-422; and
(e) LAN (Local Area Network) interface.

Figure 13:
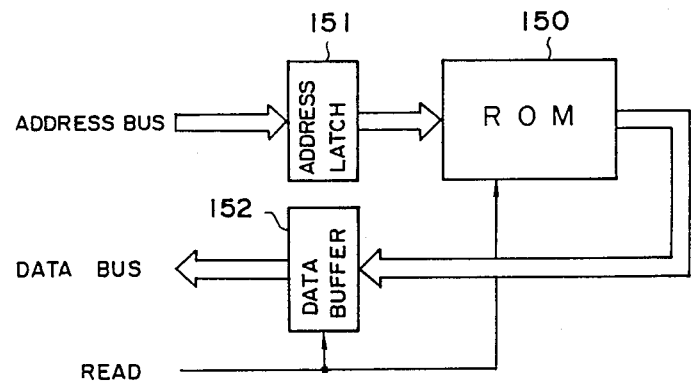
FIG. 13 is a block diagram of a font cartridge shown in FIG. 12.

The cartridge interface 135 is an interface for reading out font data from the font cartridges 12 and 13 which are inserted into the laser printer system. As shown in FIG. 13, each of the font cartridges comprises a ROM 150 for storing font data, an address latch 151 and a data buffer (buffer amplifier) 152.

The cartridge interface 135 is basically an extension bus which uses a bus of the CPU 131. The cartridge interface 135 designates a desired address of the ROM 150 and reads out the data from the font cartridges 12 and 13 in response to the read signal.

Figure 14:
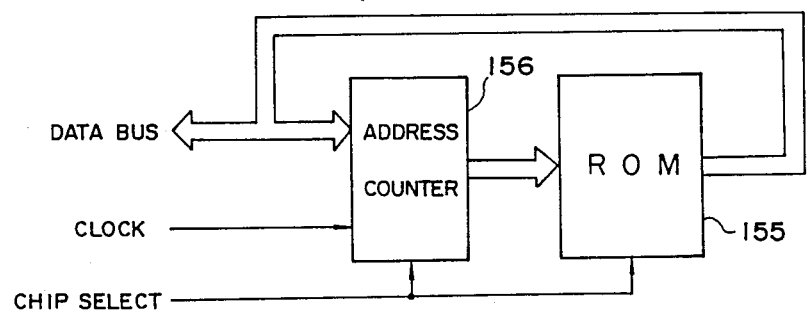
FIG. 14 is a block diagram of an IC card shown in FIG. 12.

The IC card interface 136 is an interface for reading out a desired printer software from the inserted IC card 14. As shown in FIG. 14, the IC card 14 is a sequential memory composed of a ROM 155 for storing therein printer softwares and an address counter 156 for supplying the ROM 155 an address for each of the printer softwares. Therefore, the IC card interface 136 set the address counter 156 to a head address corresponding to a head address of the program to be read out, and causes the address counter 156 to be incremented in response to the clock signal, so that a necessary quantity of the parallel data amounting to one software program can be sequentially read out from the ROM 155.

Figure 15:
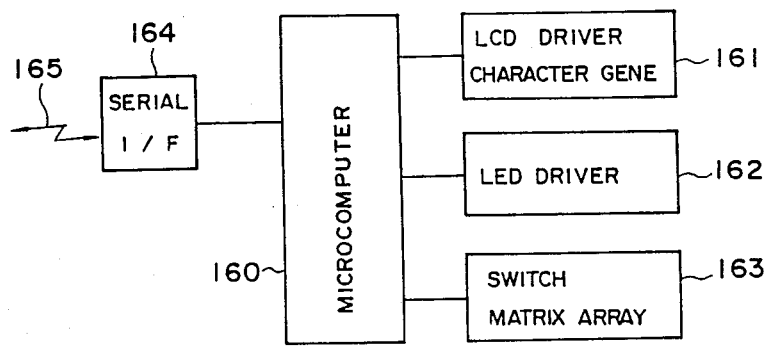
FIG. 15 is a block diagram of the control panel 11 shown in FIG. 10.

The control panel interface 137 is a serial interface for establishing connection with the control panel 11. As shown in FIG. 15, a controlling part of the control panel 11 comprises a one-chip microcomputer 160, a LCD driver and character generator 161 for driving the character display unit 110 shown in FIG. 10, a LED driver 162 for driving the LED indicators 111 through 116 and the group 124 consisting of the four LED indicators, and a switch matrix array 163 for checking ON/OFF states of each of the switches 117 through 123. The controlling part of the control panel 11 is connected to the printer controller 130 with a serial interface 164 and an interface cable 165. When a sequence of character codes is sent from the printer controller 130, the controlling part enables corresponding characters to be displayed on the character display unit 110 in the sequence. Further the controlling part of the control panel 11 can arbitrarily select and turn on and off the LED indicators 111 through 116. Furthermore, when one of the switches 111 through 116 is depressed, a code related to the depressed switch is supplied to the printer controller 130. A power supply line for the control pane 11 is included in the interface cable 165 together with signal lines.

The engine interface 138 is a serial interface for establishing the connection with the printer engine unit 90, and processes a command from the printer controller 130, the response to the command from the printer engine unit 90, an event report from the printer engine unit 90, and acknowledgement of the event report from the printer engine unit 90. The timer 139 is a system timer and is also used for a time-out control for the engine interface 138, the host interface 134 and so on.

The data controller 140 is used when the video data is formed in the video buffer formed in the RAM 133 on the basis of the data stored in the page buffer also formed therein.

Figure 16:
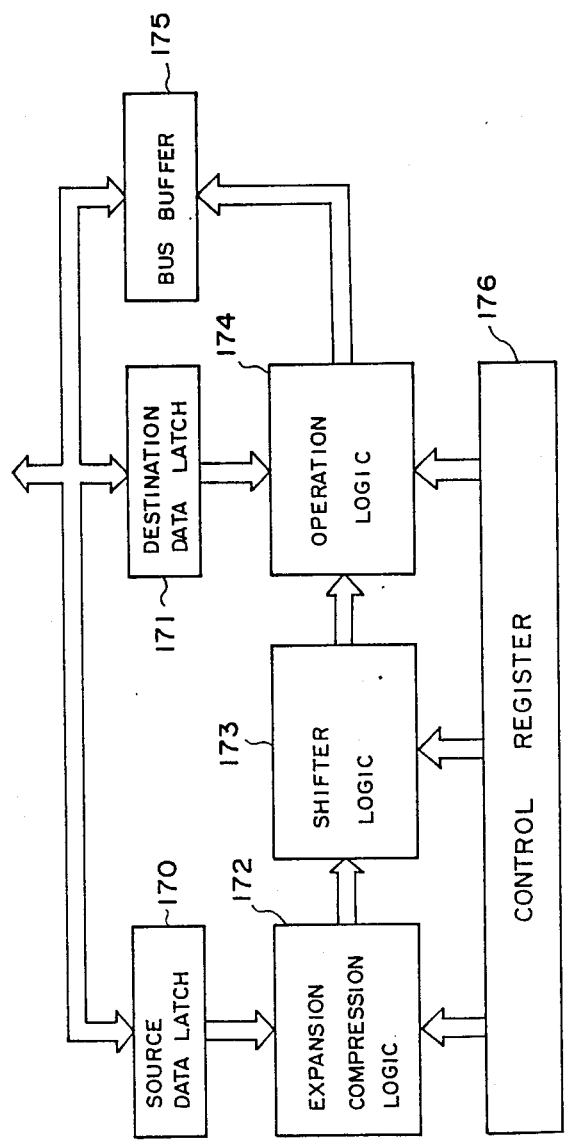
FIG. 16 is a block diagram of a data controller shown in FIG. 12.

As shown in FIG. 16, the data controller 140 comprises a source data latch 170, a destination data latch 171, an expansion and compression logic 172, a shifter logic 173, an operation logic 174, a bus buffer 175 and a control register 176. The source data latch 170 is a data latch for transferring a dot data block of the font data, image data and the like to a position indicated by the page buffer 193 shown in FIG. 19 (described in detail later). The destination data latch 171 is a data latch for reading out the dot data which has already been written in the position indicated by the page buffer and temporarily storing the read-out dot data. The expansion and compression logic 172 is a logic circuit for expanding the source data by two times, three times and four times that of the original data and compressing the image data to $\frac{1}{2}$ times that thereof. The shifter logic 173 has a function in which the 16-bit data or 32-bit data is shifted per one dot unit. The operation logic 174 is a logic circuit for carrying out a predetermined logical operation between the source data which has been expanded, compressed and then shifted and the destination data. For example, the operation logic 174 can execute logical operations such as OR, AND, XOR, NOR, NAND, XNOR, MASK, NOT and the like. The bus buffer 175 is a tri-state bus buffer used for storing the data which has been subjected to the above logical operation in the operation logic 174 into the RAM 133 again.

Figure 17:
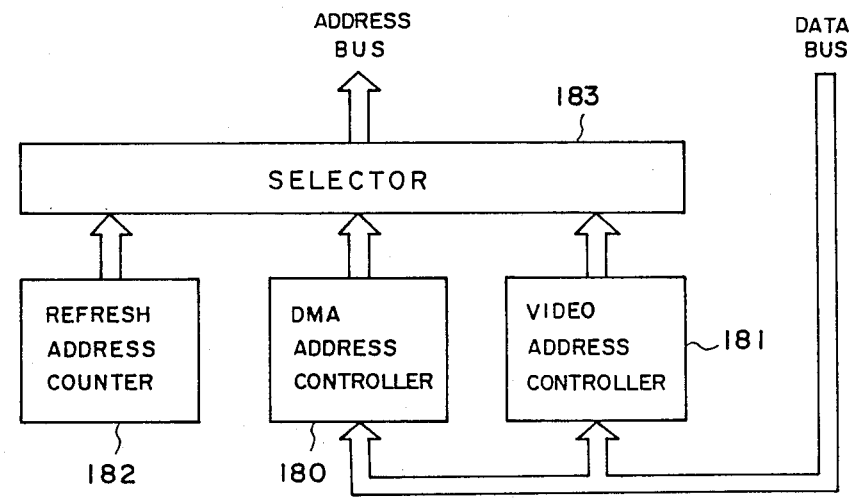
FIG. 17 is a block diagram of an address controller shown in FIG. 12.

As shown in FIG. 17, the address controller 141 comprises a direct memory access (DMA) address controller 180, a video address controller 181, a refresh address counter 182 and a selector 183. The DMA address controller 180 controls a DMA address which is used for forming the video data in the video buffer 194 (FIG. 19) provided in the RAM 133 on the basis of the data stored in the page buffer 193 also provided therein. The video address controller 181 is used for sequentially outputting the video data formed in the video buffer 194 in synchronism with the video clock (WCLK). The refresh address counter 182 controls the refreshing operation for the RAM 133. The selector 183 selects one of the output signals from the DMA address controller 180, video address controller 181 and the refresh address counter 182 at a time when the switching is necessary.

Figure 18:
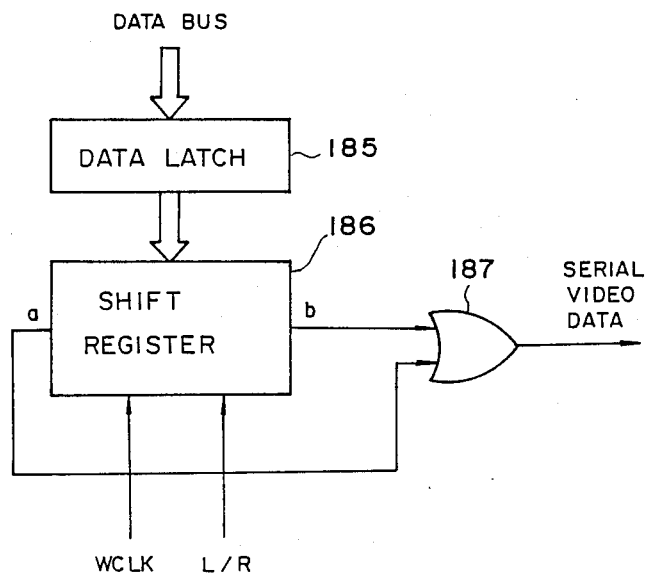
FIG. 18 is a block diagram of a video controller shown in FIG. 12.

As shown in FIG. 18, the video controller 142 comprises a data latch 185, a shift register 186 and an OR circuit 187. When the video data formed in the video buffer 194 provided in the RAM 133 is sequentially read out therefrom for every 32 bits, which corresponds to a data processing unit of the CPU 131, the data latch 185 temporarily stores the read-out data. The shift register 186 subjects the read-out data to the serial-to-parallel conversion. The OR circuit 187 outputs, as the serial video data, a left-hand shift signal or a right-hand shift signal of the video data in the parallel form. The shift register 186 is a bidirectional shift register, and a shift direction thereof can be selected. The shift register 186 sets therein the parallel video data which is latched in the data latch 185 and shifts the same in a direction designated by a shift direction designating signal L/R. When the shift direction designating signal L/R has a value of "1", the video data is shifted in the left-hand direction, and alternatively when the signal L/R has a value of "0", the video data is shifted in the right-hand direction. The data shift is carried out in synchronism with the video clock WCLK and the shifted video data is outputted at a terminal a or b per one bit. The selection of the left-hand shift and right-hand shift depends on the scanning direction for the video data. That is, when the video data is scanned from the left-hand side to the right-hand side, the left-hand shift is selected, and alternatively when the video data is scanned from the right-hand side to the left-hand side, the right-hand shift is selected. In the case where the both side printing mode is selected, as shown in FIG. 11, there are cases where the scanning direction for the odd-numbered page (front surface) is different from that for the even-numbered page (rear surface). In such cases, the serial video data matching with the scanning directions can be easily obtained by changing the sequence of reading out the parallel video data and changing the shift direction.

STRUCTURE AND OPERATION OF SOFTWARES

The softwares used in the present embodiment has a hierarchy structure and are composed of three different levels. A software at level 1 is a software for directly controlling the hardware of the system. A software at level 2 is a software which the printer softwares commonly use. A software at level 3 is a software for executing functions such as the actual printing operation. A description is given of the software at levels 1 to 3.

[Level 1 software]

This is a software for directly controlling the hardware of the system as described above, and is composed of the following described in (a) through (c).

(a) host interface handler

As described previously, a plurality of types of host interfaces (four different host interfaces in the previous example) are provided in the system, and one or more of them can be selected by the control panel 11. The host interface handler (a) causes the data supplied from the selected host system to be handed to the printer software per one byte. In this case, the data transfer can be carried out irrespective of the types of interfaces. Also, in the case where the data is transferred from the printer interface to the host system, the data can be automatically sent thereto irrespective of the interface if the data is handed to the host interface handler (a).

(b) printer interface handler

This handles transmission/reception of a command supplied from the printer controller 130 to the printer engine 90 and its response, and the event report from the printer engine 90 and its acknowledgement. These processings are carried out via the serial interface. The printer software processes the transmission and reception of the command, its response and the content in the event report, by using the printer interface handler.

(c) control panel handler

The control panel handler handles the transmission of the display data for the control panel 11, ON/OFF control of the LEDs and transmission of the information on the switches which are supplied from the control panel 11 to the printer controller. The above communication is carried out via the serial interface.

[Level 2 software]

The software at level 2 is a software which is not directly associated with the functions of the laser printer system itself. Example of programs located at level 2 are listed below and functions thereof will be described later:
 (a) power-on diagnosis program;
 (b) loop-back test program;
 (c) self-test/optional device test program;
 (d) summary sheet and field service report printing program;
 (e) hexa-dump printing program; and
 (f) program for printing a program.

[Level 3 software]

This relates to the laser printing system and includes a program for forming the video data in the video buffer 194 on the basis of the data supplied from the host interface handler and for triggering the printer engine 51. The software at level 3 (printer software) is normally stored in the IC card 14 or the like and is loaded down to the RAM 133 provided in the printer controller 130 at the time when the power is turned on. A plurality of printer softwares may be provided in the ROM 132. In this case, the desired printer software may be selected by the control panel 11. The following programs are typical examples located at level 3.
 (a) line printer software;
 (b) dezzy wheel printer emulation software;
 (c) laser printer emulation software; and
 (d) wire dot printer emulation software.

A description is now given of operations of the softwares described above.

Figure 19:
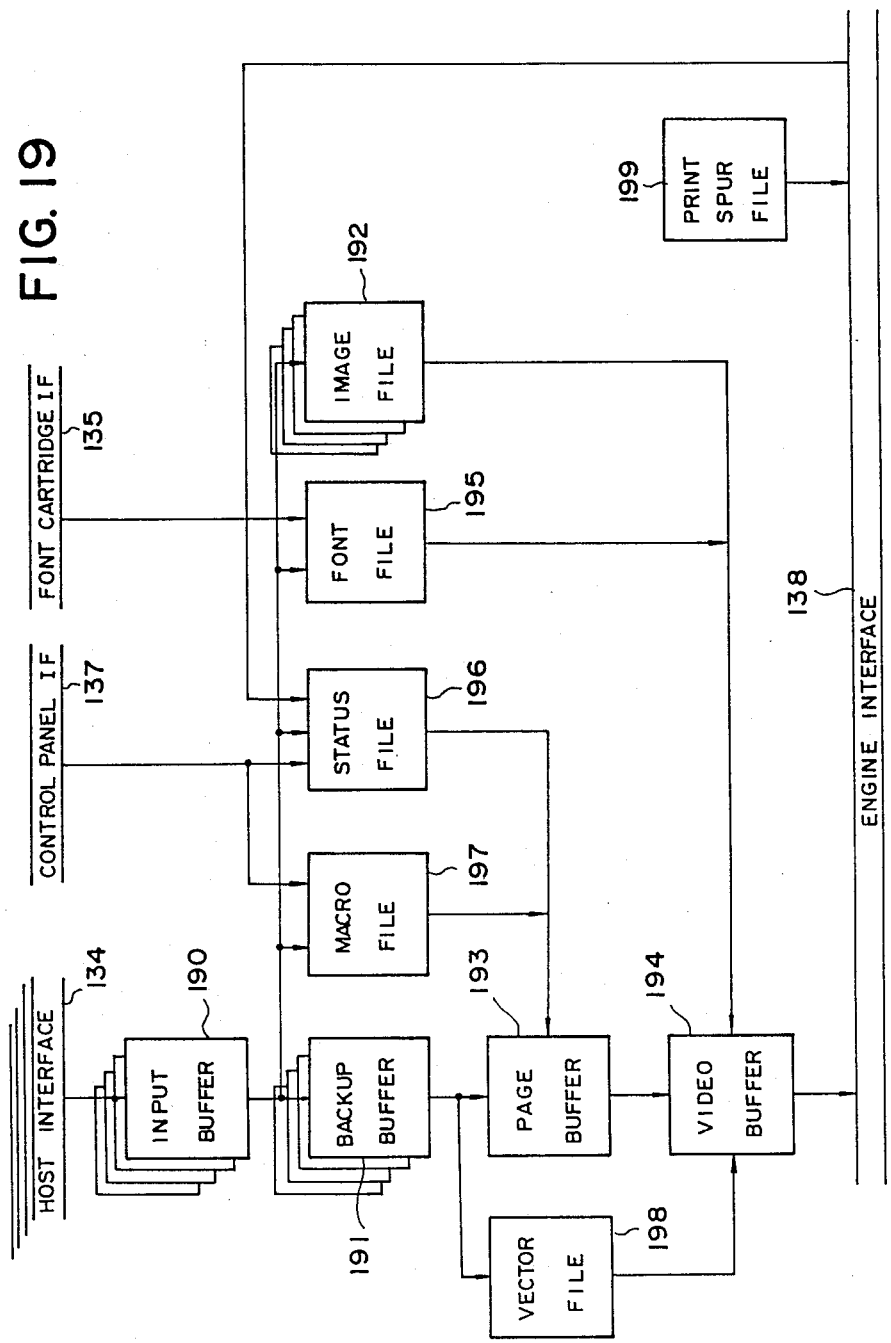
FIG. 19 is a block diagram of various buffers and files formed on a memory region of a RAM.

The RAM 133 shown in FIG. 12 is used as buffer memories and file memories as shown in FIG. 19, in addition to the above-described usage by the system software of the printer controller. In the RAM 133 of the present embodiment, there are formed four input buffers 190, four backup buffers 191 and four image files 192. Further in the RAM 133, there are formed a page buffer 193, a video buffer 194, a font file 195, a status file 196, a macrofile 197, a vector file 198 and a print spur file 199. A region having a necessary capacity for each of the above buffers and files is secured beforehand in a region of the RAM 133 except for a region thereof used for the system softwares. In this case, when the RAM 133 runs short of the capacity, a message indicating the shortage is displayed and the related function is abandoned. In this case, it is necessary to delete some data in order that the RAM 133 can recover the usable state. That is, the RAM 133 is not used in the state where all the memory regions thereof are permanently assigned to respective functions beforehand, but is dynamically used so that a region is secured for one function every time this function is necessary. This is referred to as a dynamic memory management system.

A description is now given of functions of the buffers and files formed in the RAM 133.

[Input buffer 190]

The host interface 134 send data irregularly, independent of the operation in the printer controller 130. Therefore, the data supplied from the host interface 134 are temporarily stored in the respective input buffers 190, and the printer software extracts the data stored in the input buffers 190 and then processes the same. If the data transfer from a host system is faster than the processing by the printer software, the corresponding input buffer 190 would filled with the transferred data in a relatively short time. At this time, the input buffer 190 indicates "busy" to the host system and requests that the data transmission thereto be stopped. In the case where a plurality of host systems are connected to the laser printer system, the data from each of the host interfaces is stored in the corresponding one of the input buffers 190. Thereby, the parallel processing is possible even when data is simultaneously supplied from a plurality of host systems.

[Backup buffer 191]

The length of the path extending from the paper feeding position to the paper discharging position is relatively long. For this reason, a time when the print request is generated does not coincide with a time when the image transfer is actually carried out and the sheet of paper on which images have been transferred is completely discharged, and there is a considerable time difference therebetween. Therefore a measure is required with respect to paper jamming which may occur during the time when the sheet of paper is being discharged after the printing. In order that data identical with the data which is being processed when the jam occurs can be printed out after removing the jam, it is necessary to store data being processed and even data which has already already outputted to the printer engine 51 until the printed paper is completely discharged. If this backup data were stored in the form of the page buffer, an enormous memory capacity would be necessary. In order to avoid this probability, there are provided the backup buffers 191 for storing the character codes supplied from the corresponding host systems as they are. Indications as to whether or not the backup of data should be performed at the time when the paper jamming occurs, and the setting of the memory capacity necessary for the data backup can be designated by the control panel 11. In the case where a plurality of host systems are connected to the laser printer system, one backup buffer 191 is provided for each of the host systems.

[Page buffer 193]

Page data is formed in the page buffer 193 by providing the data supplied from the host system with a source address which indicates a position on the page buffer 193 in which the data is actually stored, and with a destination address which indicates a position on the video buffer 194 where the video data is to be formed, and with information on size of the sheet of paper. Hereafter, a data block amounting to printing data of one page is referred to as a page descripter. An actual page descripter consists of the following information:
  (1) data flag
  (2) data height (8,192 bits at maximum);
  (3) data width (256 words at maximum);
  (4) data source address;
  (5) data destination address;
  (6) data shift;
  (7) descripter link; and
  (8) expansion/compression of data.

The data flag indicates which data to be printed out is concerned with a character (bit map), an image (bit map) or a vector. When the data to be printed out is concerned with a character or an image, the data height and data width represents a height and width of a rectangular image region enclosing that character or image. The width of the rectangular image region is represented by an integer multiple of a bus width (16 bits for example) which is a processing unit of the CPU 131. Alternatively when the data to be printed out is a vector, a length of that data is represented as the data height and data width. The data source address indicates an address of a region (position) in the video buffer 194 in which the data to be printed out should be stored. The data shift indicates a bit position in the bus width of the CPU 131, from which the printing of the data starts. Therefore, the position of data to be printed out can be controlled by dot unit. The descripter link is a pointer for indicating a position in the page buffer 193 in which a page descripter following one page descripter is stored. That is, a number of data included in one page or block can be obtained by tracing the descripter link. The last descripter has an end flag for identification. The expansion/compression of data indicates whether the character or image to be printed out should be enlarged or reduced in size when the data to be printed out is related to the character or image. The expansion/compression is not used when the data to be printed out is the vector.

[Video buffer 194]

The video buffer 194 has a full bit map mode and a partial bit map mode. "A full bit map mode" is a mode in which a memory area corresponding to an entire surface area of a sheet of paper is secured as the video buffer 194 in the RAM 133. For example, a memory capacity of approximately 1 Mbytes ($297 \times 210$ mm/300 dpi) for A4 size is necessary to form the corresponding video buffer 194, and a memory capacity of approximately 2 Mbytes is necessary for the A3 size. As will be described later with reference to FIG. 32, the laser printer system may be automatically shifted to the full bit map mode when the memory capacity corresponding to more than one page of A3 size is allowed to be secured in the RAM 133. In this case, the printer controller 130 forms the video data of the whole of one page in advance of the printing, and is then made to start the printer engine unit 90. Thereafter a memory region related to the video data which has already been supplied to the printer engine unit 90 is gradually released and is presented for forming video data of the following page. The formation of the video data for the following page is not permitted until all the data for the previous page have been outputted. The full bit map mode results in an advantage that no matter how complex the data is, the data can be completely processed, because the printing does not start until the video data corresponding to one page is completed in the video buffer 194. On the other hand, the full bit map mode needs a memory area having a very large memory capacity.

In the partial bit map mode, a memory area corresponding to a part of one page, 256 Kbytes, for example (corresponding to $\frac{1}{8}$ of one page having A3 size) is secured beforehand as the video buffer 194, and two memory areas each having a half of the secured memory area, i.e., 128 Kbytes are alternately used for forming the video data. A memory quantity of 128 Kbytes corresponds to one page block. In the partial bit map mode, at first, the printer controller 130 forms video data corresponding to $\frac{1}{8}$ of one page in accordance with the information stored in the page buffer 193, and then causes the printer engine unit 90 to start. When output of data corresponding to one page block is completed, the formation of video data for the next page block is allowed. In this manner, while one memory area of 128 Kbytes is being subjected to the outputting of the video data, the other memory area of 128 Kbytes is used for forming the video data of the next page block. That is, two 128 Kbyte memory areas are alternately subjected to data forming and outputting. In this case, if the video data which corresponds to one page block is not completed within a time necessary to output one page block, incomplete video data may be printed out. In the partial bit map mode, when data exists over a plurality of page blocks, the data is divided by a boundary between adjacent page blocks.

The partial bit map mode results in an advantageous effect that the video buffer 194 can be formed with a smaller memory capacity. On the other hand, a longer time is required for the partial bit map mode to process complex data. From this viewpoint, even when the partial bit map mode is selected, it is preferable to secure a more memory capacity in the RAM 133 for the video buffer 194. If the RAM 133 has a sufficient capacity, it is possible to form a plurality of page blocks in advance. In this case, consecutive addresses, i.e., consecutive memory areas in the RAM 133 are not necessarily required for forming the video buffer 194. Intermittent memory areas may be linked together by employing a block table for storing information which enables the formed page blocks to be linked together. This block table contains information on a page block address, a block size, a next block address and a preceding block address (each 24 bits). The page block address of the print spur file described later indicates the block table.

In the one-side print mode, the page block is outputted in the forward direction. Therefore, it is possible to follow the page block address by using the next page block address. In the both side print mode, there is a possible case where it is necessary for the outputting operation to start from the last page block, which will be described later. At this time, the page blocks are processed in the reversed direction, the previous addresses are needed. The address of the last page block can be calculated by page block address plus a block size.

[Font data file 195]

A font is handled as a file, and is source data for forming image data in the video buffer 194. Therefore, in the RAM 133, there are provided a list for indicating addresses of memory areas in which respective usable fonts are stored, and a list for indicating addresses of characters for each of the fonts, in the form of a table. There are two types of fonts, i.e., a bit map font and a vector font. The bit map font is a rectangular dot matrix and is therefore usable in the partial bit map mode. On the other hand, the vector font is preferably used in the full bit map mode because an outline (outward shape) of a character is described by a group of functions representing straight lines or circles. The font file 195 may be formed in the ROM 132 or RAM 133. Further when the outline (vector) font is used in the partial bit map mode, it may be extended on the bit map font file in advance of its use.

[Image file 192]

The bit image is stored directly in the video buffer 194 without forming the image files 192 when the printer controller 130 is in the full bit map mode. In the partial bit map mode, the bit image is formed in a memory area in the RAM 133 which can be used as the image files 192. Also, each of the image files 192 is provided with an identification code and is stored in the page buffer 193. When one jam backup mode which indicates abandonment of the image data is set by using the control panel 11, the image files 192 are automatically cancelled. A large memory capacity is necessary to build the image files 192. Therefore, when it is desired to completely carry out the backup, the RAM 133 must have a large memory capacity. In order to efficiently use the RAM 133, it is also possible to compress the backup data so as to obtain a half of the original data quantity, for example. This can be set by the control panel 11.

[Status file 196]

The following information is stored in the status file 196.
(1) status and structure of the printer engine unit 90;
(2) initial setting which is set by the control panel 11; and
(3) status and structure of the printer controller 130.

The status file 196 is used for printing the summary sheet and field service report produced by the diagnosis and test function. A detailed description thereof will be given later.

[Macrofile 197]

Data which is repetitively used in the printer controller 130 is registered beforehand in the macrofile 197. The macrofile 197 is read out from the RAM 133 every time data is required, and is then stored in the page buffer 193. The macrofile 197 may be preformed in the ROM 132 or may be formed by the down-loading from the host system. Therefore, data of the test pattern formed in the laser printer system may be formed beforehand in the form of a file in the macrofile 197. In this case, when the text printing is initiated, the printer controller 130 reads out the test print data from the macrofile 197, and forms the page buffer 193 and then starts printing the test print data.

[Vector file 198]

When the data supplied from the host system is vector data, its vector is formed and its address is stored in the page buffer 193. In the case where the partial bit map mode is being set, when the vector data is located over a plurality of page blocks, the vector data is dissolved per page block unit. Even in the case of the full bit map mode, it is convenient to dissolve the vector data into small units in view of efficiency in memory and processing speed.

[Print spur file 199]

In the present laser printer system, a considerable amount of time elapses until commencement of the paper feeding and the subsequent image transfer after the print request is supplied to the printer engine unit 90. For this reason, the printer engine is activated in the order of a page which has been completed. Therefore, the printing is carried out in the order of the registration of the completed page in the print spur file 199, and the data of one page which has been completely discharged is cancelled from the video buffer 194.

When the printer engine unit 90 receives the print request from the printer controller 130, the printer engine unit 90 sends an identification data (ID) with respect to the print request back to the printer controller 130. Thereafter when the print has been completed and the paper has been completely discharged, the printer engine unit 90 sends the same identification data back to the printer controller 130.

The print spur file 199 comprises the following items:
(1) page block address;
(2) page ID;
(3) print status;
(4) paper size (video buffer width);

(5) paper feed tray;
(6) paper discharge tray;
(7) one-side/both side print mode;
(8) number of sheets of paper to be printed; and
(9) page orientation.

A page block address indicates a block table indicating a start address of video data to be outputted. A print status indicates present status of the paper such that a sheet of page in question is waiting for the completion of the paper discharge, or is being printed, or is waiting for the printing, or is forming the video data. In MODE 2 and MODE 3 of the both side print mode which will be described in detail later, a sequence of page of video data to be outputted to the printer engine unit 90 does not correspond to the page sequence of video data formed in the video buffer 194. Therefore, management of the order of output of the video data (page data) which is implemented by the printer spur file 199 is important. In the stack mode and the sort mode, the printing of the same page must be effected until the number of sheets which is designated by the control panel 11 is obtained. The management of the video data which is necessary for the above printing operation may be carried out by the print spur file 199.

OPERATION OF PRINTER CONTROLLER

The hardware structure of the printer controller 130 has been described with reference to FIG. 12. It is to be noted that the data controller 140, the address controller 141 and the video controller 142 in the printer controller 130 are essential parts of the present embodiment.

The present embodiment has two features regarding the printer controller 130; one of which is concerned with a case where the video data is formed in the video buffer 194 by using the data stored in the page buffer 193, and the other is concerned with a case where the video data formed in the video buffer 194 is outputted to the printer engine unit 90. Therefore, a further description is now given of forming the video data in the video buffer 194 and outputting of the video data to the printer engine unit 90.

FORMING OF VIDEO DATA

The video controller 142 can transfer the source data formed in an arbitrary rectangular dot matrix to an arbitrary rectangular region in the video buffer 194 in a group in accordance with the direct memory address (DMA) transfer. That is, two-dimensional data of an arbitrary size can be transferred in a group to a two-dimensional region of an arbitrary size without using the CPU 131.

The present DMA transfer is described below, by referring to FIG. 20. In FIG. 20, it is assumed that source data of "A" exists in a source area having a width corresponding to n words (one word is composed of 16 dots, for example), and has a width HW (an integer multiple of a word) and a height VH (the number of lines). The head address of the source data is a source address. It is further assumed that the above source data is transferred to a region having a width HW (an integer multiple of a word) and a height VH (the number of lines) which is formed in a destination area (having a width corresponding to m words), starting from a destination address as shown in FIG. 20. The source area is assigned in the ROM 132 or RAM 133, and the destination area is secured in the RAM 133. In the following explanation, it is secured that HW=a (words), VH=b (lines) and the enlargement factor is represented by c.

The DMA address controller 180 shown in FIG. 17 has the following registers:
source address register (SAR);
source width register (SAWR);
destination address register (DAR);
destination area width register (DAWR);
horizontal width register (HWR);
vertical height register (VHR); and
expansion register (EXPR).

The following registers are provided in the control register 176 shown in FIG. 16:
expansion/compression register (EXPR);
bit shift register (BSR); and
arithmetic register (ATHR).

Figure 21:
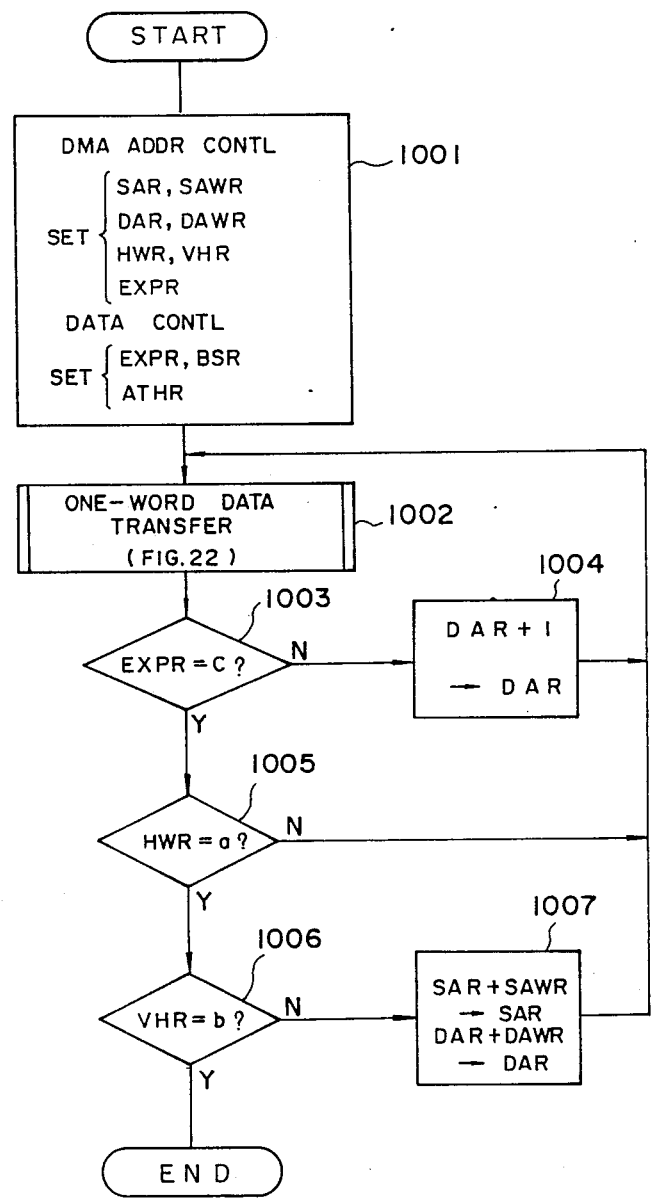
FIG. 21 is a flowchart of a DMA operation which is executed at the time of forming the video data in the video buffer.

A flowchart of the DMA transfer in which the above registers are used is shown in FIG. 21. Referring to FIG. 21, the registers SAR, SAWR, DAR, DAWR, HWR, VHR and EXPR installed in the DMA address controller 180 are set to respective values (step 1001). And, the registers EXPR, BSR and ATHR of the control register 176 are set to respective initial values (step 1001). Then, data amounting to one word is transferred from the source area to the destination area (step 1002). Subsequently, the contents of the registers EXPR, HWR and VHR are checked (steps 1003, 1005 and 1006). That is, it is checked whether or not EXPR=c (enlargement factor), HWR=a (the number of words corresponding to the horizontal width), and VHR=b (the number of lines corresponding to the vertical height). When a discrimination result at step 1003 is NO, the value of the destination address register DAR is incremented by 1 (step 1004) and the process returns to the step 1002. When a discrimination result at step 1006 is NO, SAR is set to SAR+SAWR, and DAR is set to DAR+DAWR (step 1007) and the process returns to step 1002. In this manner, the one-word data transfer is carried out until all the conditions at steps 1003, 1005 and 1006 are satisfied.

Figure 22:
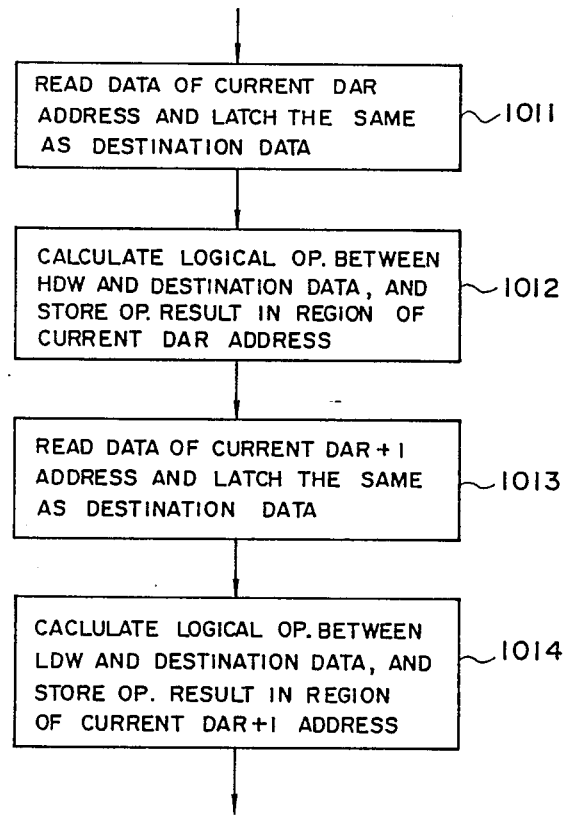
FIG. 22 is a flowchart of step 1002 of FIG. 21.
Figure 23:
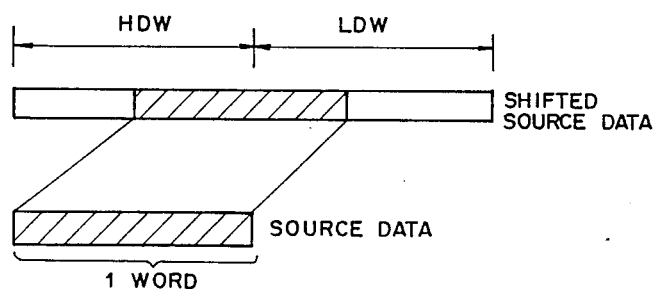
FIG. 23 is a view for explaining a source data process.

The one-word data transfer at step 1002 is effected in a sequence of steps 1011 through 1014 shown in FIG. 22. FIG. 23 is a view for explaining a high-data word (HDW) and a low-data word (LDW) after shifting of the source data. At step 1011 of FIG. 22, data designated by the current content of the destination address register DAR is read out as the destination data, and is latched. At step 1012, an arithmetic operation between the high-data word (HDW) of the current source data and the destination data is carried out, and a result of the operation is written into an area indicated by the current content of the destination address register DAR. At step 1013, the data indicated by the current DAR+1 is read out as the destination data, and is latched. At step 1014, an arithmetic operation between the low-data word (LDW) of the current source data and the destination data is executed, and a result of the operation is written into an area indicated by the current DAR+1.

The enlargement and reduction of the image can be accomplished by effecting the DMA transfer a plurality of times. That is, the enlargement and reduction cannot be obtained by the DMA transfer only one time. In the image enlargement and reduction process, a bit shift adjustment is unnecessary for the enlargement by factors of 2 and 4, whereas the bit shift adjustment in the horizontal direction is necessary for the enlargement by a factor of 3 and the reduction by a factor of 2.

FIGS. 24A through 24D are views for explaining the triple enlargement, in which the CPU 131 has a bus having a width of 32 bits. When the image is enlarged to three times the original size, the data of 8 bits is expanded so as to obtain expanded video data of 24 bits by carrying out the DMA transfer four times as shown in FIGS. 24A through 24D. In FIG. 24A, 8-bit data S1 and S1' from the head of each of the two words are expanded so as to obtain write data W1 and W1' of 24 bits, respectively. Then the write data W1 and W1' are written into the destination area as destination data D1 and D1', respectively. The destination data D1' is places so as to be spaced away from the destination data D1 by three words. It is to be noted that the destination data D1 and D1' start from the beginning of the respective one-words of the destination data. That is, the bit shift adjustment is not performed. In the second DMA transfer of FIG. 24B following to the first DMA transfer of FIG. 24A, 8-bit source data S2 and S2' following the 8-bit source data S1 and S1' are expanded so as to obtain 24-bit write data W2 and W2', respectively. Then the write data W2 and W2' are written into the destination area as destination data D2 and D2', respectively. The destination data D2 and D2' following the destination data D1 and D1' have been shifted by 24 bits from the beginning of the respective one-words of the destination data. In the third EMA transfer of FIG. 24C, 8-bit source data S3 and S3' are expanded so as to obtain 24-bit write data W3 and W3', respectively. Then, the write data W3 and W3' are written into the destination area so as to follow the destination data D2 and D2', respectively. Destination data D3 and D3' which are the write data W3 and W3' have been shifted by 16 bits from the beginning of the respective one-words of the destination data. In the fourth DMA transfer shown in FIG. 24D, 8-bit source data S4 and S4' following the source data S3 and S3' are expanded so as to obtain write data W4 and W4'. Then the write data W4 and W4' are written into the destination area as destination data D4 and D4' which follow the destination data D3 and D3', respectively. The destination data D4 and D4' have been shifted by 8 bits from the beginning of the respective one-words of the destination data.

Figure 32:
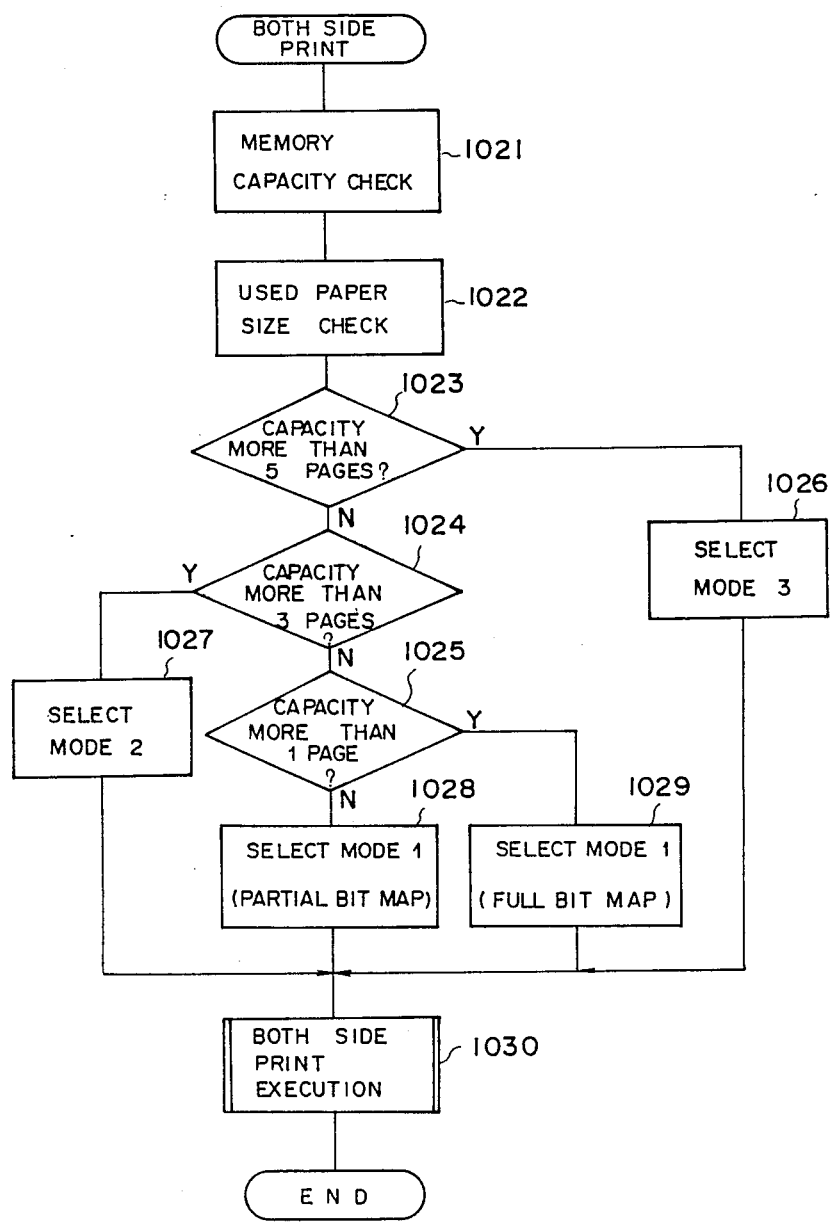
FIG. 32 is a flowchart showing a mode decision process in the case where the both side print mode is set.

FIGS. 25A and 25B are views for explaining the case where the image is reduced to a half of the original size. In this case, 32-bit data is extracted from the source data for every other word. In FIG. 25A, 32-bit data S1, S3 and S5 are extracted. The data S1, S3 and S5 are then compressed so as to obtain 16-bit write data W1, W3 and W5, respectively. The write data W1, W3 and W5 are written into the destination area as destination data D1, D3 and D5, respectively. As shown, the bit shift adjustment is not carried out in the first DMA transfer. In the second DMA transfer of FIG. 25B, 32-bit source data S2, S4 and S6 are compressed so as to obtain 16-bit write data W2, W4 and W6, respectively. The write data W2, W4 and W6 are then written into the destination area as destination data D2, D4 and D6, respectively. In this case, the destination data D2, D4 and D6 are positioned so as to be shifted by 16 bits from the beginning of the respective one-words of the destination data. In this manner, 6 words of the source data are compressed to thereby obtain 3 words of the destination data.

The above description is with respect to the enlargement and reduction in the horizontal direction. On the other hand, the enlargement and reduction in the vertical direction is automatically controlled by the DMA address controller 180 shown in FIG. 17.

A relationship between the enlargement factor and the number of times the DMA transfer is carried out is shown below.
Equal enlargement: one time;
Double enlargement: two times;
Triple enlargement: three times;
Quadruple enlargement: four times; and
Half enlargement: two times.

In the reduction by a factor of 2, a logical OR operation between 2 adjacent dots arranged in the horizontal direction are calculated. In the horizontal direction, in the case where data is written into an area designated by one destination address two times, an OR operation implemented by the operation logic 174 shown in FIG. 16 is performed.

A function of a shifter provided by the shifter logic 173 shown in FIG. 16 is used for adjusting a bit position of the destination address, as shown in FIG. 23. The one-word of source data is shifted so that two words consisting of the high data word (HDW) and low data word (LDW) are automatically written into areas designated by one destination address and following destination address, respectively. This shift control is carried out by the DMA address controller 180 shown in FIG. 17. Therefore, it becomes possible to obtain two words in which one-word data is contained and the other bits are all zeros.

The operation logic 174 carries out a logical operation between the video data which has been written into the video buffer 194 and video data which is written into the video buffer 194 from now on. This logical operation is OR logic, for example. That is, when the OR logic is employed, even if data is overwritten into the same destination address position a plurality of times, the previous data is not destroyed. As a result, overwriting printing operation is obtainable. In addition to the OR logic, the operation logic 174 comprises logics of AND, XOR, NAND, XNOR, MASK and NOT.

OUTPUTTING OF VIDEO DATA

The present laser printer system can handle paper sizes from A5 to A3. In the case where a memory region of the video buffer 194 corresponding to the paper size of A3 has been secured in the RAM 133, if a paper size other than A3 is processed, a large area within the memory region of the video buffer 194 is not used and is therefore wasteful. In order to avoid this disadvantage, the printer controller 130 is designed to secure, per page, a region of the video buffer 194 corresponding to the size of the sheet of paper to be printed in the RAM 133. That is, a minimum memory region necessary for forming the video buffer 194 corresponding to the size of paper to be processed can be secured in the RAM 133.

Figure 26:
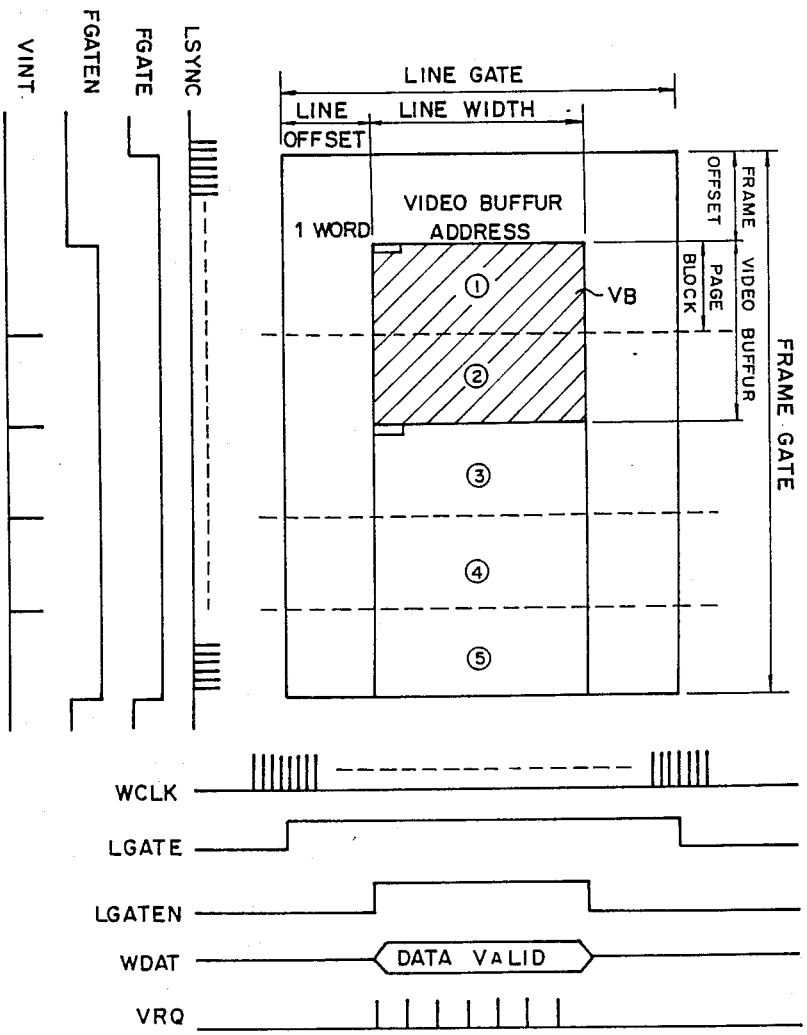
FIG. 26 is a view showing a relationship between the structure of the video buffer and various signals.

A description is given of a structure of the video buffer 194 with reference to FIG. 26. In FIG. 26, a maximum print region within which the printing is possible is represented by a line gate (LGATE) and a frame gate (FGATE). A region which is intended to be actually used is represented by a line width (LINE WIDTH) and an integer multiple of a page block (PAGE BLOCK). An offset between the line gate LGATE and line width LWIDTH is represented as a line offset, and an offset between the frame gate FGATE and video buffer 194 is represented as a frame offset. The line offset and frame offset are set in the video address controller 181 shown in FIG. 17. A line gate enable signal LGATEN which indicates the line gate LGATE and a frame gate enable signal FGATEN which indicates the frame gate FGATE are produced by using the line offset and frame offset which are set in the video address controller 181. When both the FGATEN and LGATEN signals become equal to "1", the video data is read out from the video buffer 194 per one word (unit data), and is then subjected to serial-to-parallel conversion in the video controller 142. Then the video data in the parallel form is outputted to the printer engine 90. During this operation, a video request signal VRQ is generated for every one word, and thereby the address of the video buffer 194 is incremented. And, a pulse signal VINT is generated for every one page block, and the CPU 131 updates the page block address in response to the signal VINT.

In the partial bit map mode, when the formation of data to be outputted to a video buffer region (two page blocks ① and ② indicated by hatchings) is completed, the printer engine unit 90 is started. Thereafter, from the time when the FGATEN signal and LGATEN signal are switched to a high level, the output of the video data is started. Then the video data is outputted as synchronized by the video clock WCLK and the line sync signal LSYNC. When the output of the first page block data has been completed, the VINT signal is generated. The CPU 131 denotes the next page block 2 in response to the VINT signal and causes data of the page block ② to be outputted. During this operation, the CPU 131 forms the video data of the page block ③ in the region of the page block 1. The above operation is repetitively carried out until the processing of one page is completed. When all the data of the page block have been outputted, that page block is released. In the above operation, if there is a sufficient margin in the RAM 133, the page blocks ③, ④, ⑤, ... may be formed beforehand.

In the full bit map mode, the video data corresponding to one page is produced in the video buffer 194. When one page is completed, the printer engine unit 90 is started. The operation after the printer engine unit 90 is started, is the same as that for the partial bit map mode.

As described before, the preset laser printer system can handle the paper size up to A3, and has eight types of print modes shown in FIG. 11. In order to obtain the eight types of the print modes, there are prepared two types of rotations of a character, i.e., 90° rotation and 0 rotation, and two directions of outputting the video data, i.e., a forward direction and a reverse direction. It is necessary to rotate the video data of characters on the RAM 133 in advance of outputting the video data. In the reverse direction of outputting the video data, the video buffer address is updated in the reverse address sequence, and the line scanning is carried out in the reverse scanning direction.

The reverse address outputting operation with respect to the video buffer 194 is controlled by the video address controller 181 shown in FIG. 17, and a desired line scanning direction may be set by sending the corresponding information to the shift register 186 shown in FIG. 18.

Figure 27:
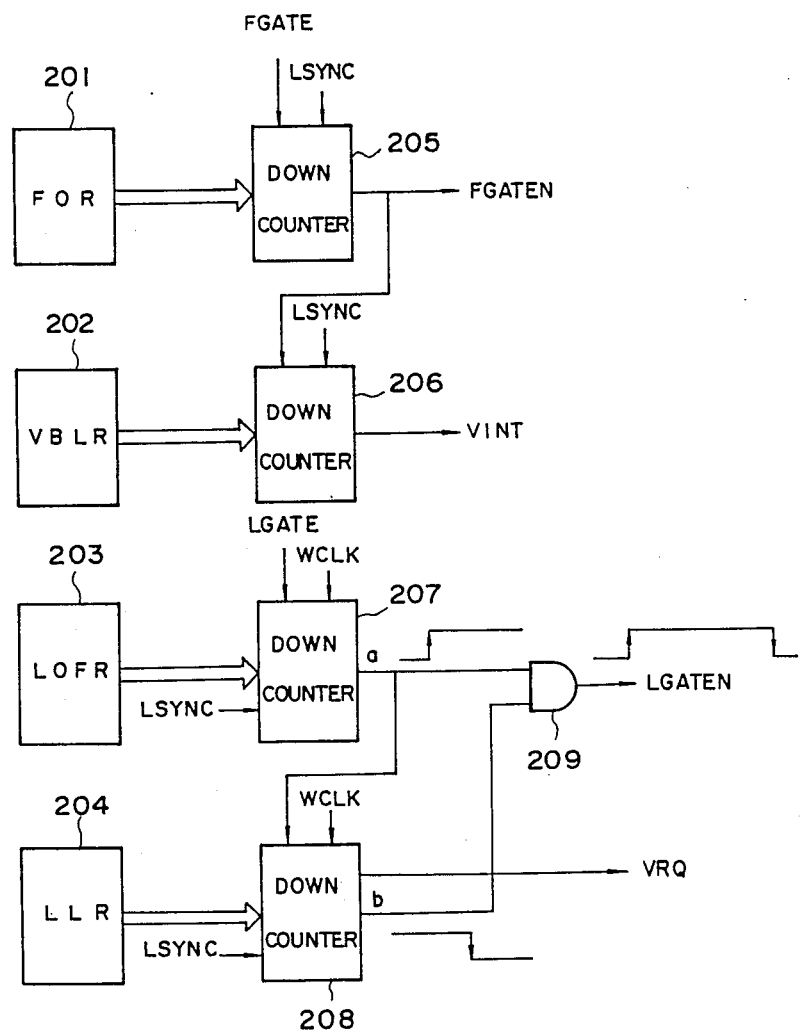
FIG. 27 is a block diagram of a signal processing circuit provided in the video address controller shown in FIG. 17.

A description is now given, with reference to FIG. 27, of a circuit for generating the FGATEN signal and LGATEN signal from the FGATE signal and the LGATE signal and for generating the VINT signal and the VRQ signal. This circuit is provided in the video address controller 181. The video address controller 181 comprises four registers, i.e., a form offset register (FOR) 201, a video buffer length register (VBLR) 202, a line offset register (LORF) 203 and a line length register (LLR) 204. The form offset register 201 registers a margin in the paper feed direction in the form of the number of lines. The video buffer length register 202 registers the length of the video buffer 194 in a direction corresponding to the paper feed direction (the length of the page block when the partial bit map mode is set) in the form of the number of lines. The line offset register 203 registers a margin in the width direction (corresponding to the main scanning direction of the laser beam) in the form of the number of dots. The line length register 204 registers an effective width (which is determined, depending on the paper size and the type of paper feed (long side paper feed or short side paper feed)) in the form of the number of dots.

Further the video address controller 181 comprises four down counters 205 through 208 for presetting registered values of the registers 201 through 204 and then performing down counting, and an AND circuit 209. The down counter 205 presets the value of the form offset register (FOR) 201 (the number of lines corresponding to the margin in the feed direction), and is then activated when the FGATE signal becomes 1. Then the down counter 205 counts down the line sync signal LSYNC as a clock signal. Thereafter when the counted value of the down counter 205 becomes equal to "0", the down counter 205 sets the FGATEN signal to 1, and sets it to "0" when the FGATE signal is switched to "0". The down counter 206 presets the value of the video buffer length register (VBLR) 202 (the number of lines corresponding to the page block length), and is activated in response to the FGATEN signal supplied from the down counter 205. Then the down counter 206 counts down the line sync signal LSYNC as a clock signal. Thereafter when the counted value becomes "0", the down counter 206 sets the VINT signal "1", and at the same time presets the value of the VBLR 202 again by using the the VINT signal of a value of "1" as an inner preset pulse. Thereby, the VINT signal is switched to "0", and the above operation is repetitively carried out. The down counter 207 presets the value of the line offset register (LOFR) 203 and uses the LGATE, WCLK and LSYNC signals as the enable, clock and clear signals, respectively. When the down counter 207 starts counting down the video clock WCLK when the LGATE signal becomes "1". The down counter 207 sets the output a to "1" when the counted value becomes "0". Thereafter, the down counter 207 resets the output a to "0" when the LSYNC signal (pulse signal) is applied to its clear terminal, and presets the value of the LOFR 203 again. Then the above operation is repetitively carried out. The down counter 208 presets the value of the line length register (LLR) 204 (the number of dots included in the effective width), and uses the output a of the down counter 207, video clock WCLK and the LSNC signal as the enable signal, clock signal and the load signal, respectively. In the normal state, the down counter 208 produces an output b of "1". When the output a of down counter 207 is switched to "1", the down counter 208 is made to count down the video clock WCLK. Thereafter, when the counted value of the down counter 208 becomes "0", the down counter 208 produces the output b of "0". Thereafter when the LSYNC signal is applied to the load terminal of the down counter 208, it produces the output b of "1" and presets the value of the line length register (LLR) 204.

The AND circuit 209 performs the AND operation between the output a of the down counter 207 and the output b of the down counter 208, and produces the LGATEN signal. As shown in FIG. 26, the down counter 208 outputs the VRQ signal by one pulse when it is switched to the enabled state, and then produces the VRQ signal by one pulse every time it counts a value of "16", for example, corresponding to the number of dots included in one word (unit data). This operation is repetitively carried out until the counted value of the down counter 208 becomes "0".

With the circuit configuration shown in FIG. 27, the effective width of the video buffer 194 can be set, depending on the effective print width of the sheet of paper in the main scanning direction. Further, it is possible to determine the number of the unit data (the number of one-words) for each one of the main scans which is synchronized with the line sync signal LSYNC, depending on the effective width of the unit data. Therefore, there is no need for forming video data of white for a region other than the margins on the sheet of paper and a region which exceeds the width of the sheet of paper. Consequently, the memory capacity which is to be used as the video buffer 194 can be minimized.

MEMORY MANAGEMENT

Figure 28:
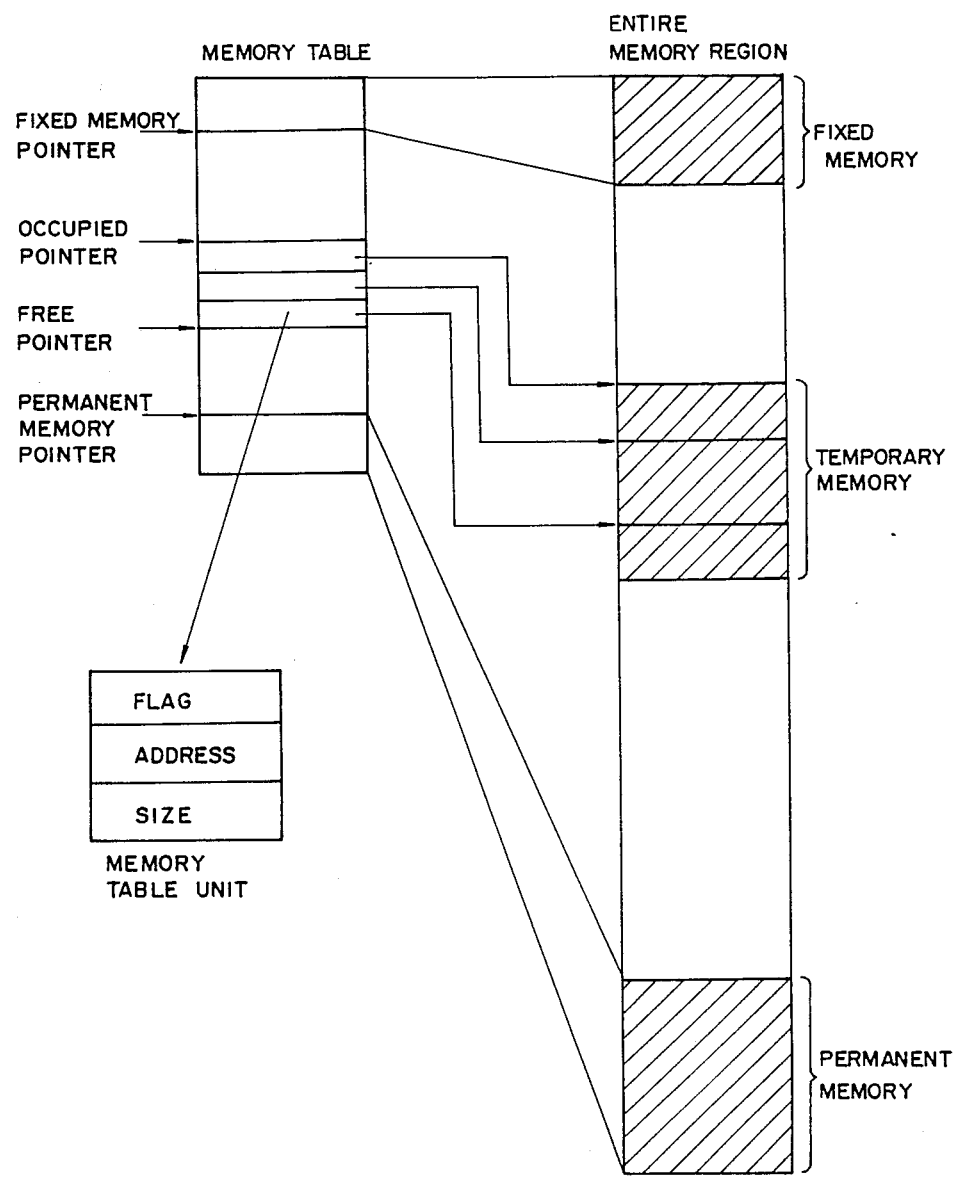
FIG. 28 is a view for explaining a memory structure and its management table provided in the printer controller.

In order to efficiently utilize memories (the RAM 133) provided in the printer controller 130, memory management is employed in the present embodiment. As shown in FIG. 28(A), the memories which are used in the printer controller 130, which are formed in one memory region (space), are classified into the following three groups.

(1) Fixed memory; system memory, input buffer, backup memory, status file, print spur file.
(2) Temporary memory; page buffer, vector file, video buffer, image file.
(3) Permanent memory; macrofile, font file.

The fixed memory is formed by securing a fixed quantity which starts from the lowermost address of the memory region. However, the size of only the backup memory is variable, and may be set through the control panel 11 at the time of power-ON or reset of the laser printer system. Memories other than the fixed memory are memories which are set free to users and can be freely used by the printer controller 130. Such memories are called user's memories.

The temporary memory is formed by securing a desired region starting from the lowermost address of the user's memory region. When the usage of the temporary memory is completed, the region of the temporary memory is released.

The permanent memory is formed by securing a desired region starting from the uppermost address of the user's memory region. However, if the temporary memory is formed so as to be positioned close to the permanent memory and it is therefore impossible to ensure a further region for the permanent memory, the lowermost address of the user's memory region is used for forming the permanent memory. In this case, when the permanent memory has been released and thereby a usable region is obtained, a flag is set to indicate the release of the permanent memory to the CPU 131. The entire memory region within which the above memories are formed is divided into small units (2 Kbyte, for example). The memory management for the small units is carried out by using a memory table shown in FIG. 28. For example, when the memory capacity of the entire memory region is 4 Mbytes, 2048 memory table units (4M/2K) are used. Each of the memory table units are composed of a flag (2 bits), an address (24 bits) and a size (12 bits). With respect to the temporary memory, there are provided a free pointer and an occupied pointer in the memory table. The CPU 131 secures a necessary memory quantity from the free pointer and uses the same as the temporary memory. When the temporary memory becomes unnecessary, the CPU 131 advances the value of the occupied pointer thereof. In this manner, the memory region for the temporary memory is cyclically used. When the value of the free pointer is identical to the value of the occupied pointer, the temporary memory has not been formed in the memory region.

The video buffer 194 which is the temporary memory occupies a large amount of the memory region. However, as described before, a necessary quantity for the video buffer 194 is variably secured in the memory region, depending on the size of the sheet of paper to be used. Therefore, the printer controller 130 can use an increased memory region, compared to the case where the video buffer 194 having a capacity corresponding to A3 size, for example, is permanently formed in the memory region. For this region, it is possible to form video data of more pages in advance and to successively print on pages without the printer engine being temporarily stopped. As a result, the printing of an increased speed can be obtained. Further it becomes possible to obtain an increased memory region for font data and so on.

BOTH SIDE PRINT MODE

The dot side print mode for printing on both sides of a sheet of paper by using the both side processing unit 6, has three different modes, i.e., MODE 1, MODE 2 and MODE 3, and each of these modes may be selected as desired. One of the both side print modes is determined depending on the maximum number of sheets of paper which can be stored in the printer main unit 1 and the both side processing unit 6. In the present embodiment, three both side print modes are provided; however, if the entire length of the paper transportation path is lengthened, an increased number of both side printing modes may be set. The three modes have differences in the sequence of page to be printed by reading out corresponding video data from the video buffer 194 formed in the RAM 133 and in the sequence of printing on the front and rear surfaces of a sheet of paper. The differences in the sequence of page to be printed on the front or rear surface according to the three different both side printing modes MODE 1, MODE 2 and MODE 3 may be illustrated by assigning the number indicating the order of feeding a sheet of paper, i.e., #1, #2, #3.

[MODE 1]
    (a) 1st page print (#1F)    paper feed
    (b) 2nd page print (#1R)
    (c) 3rd page print (#2F)    paper feed
    (d) 4th page print (#2R)

[MODE 2]
    (a) 1st page print (#1F)    paper feed
    (b) 3rd page print (#2F)    paper feed
    (c) 2nd page print (#1R)
    (d) 5th page print (#3F)    paper feed
    (e) 4th page print (#2R)
    (f) 7th page print (#4F)    paper feed -continued

|   |   |   |
|---|---|---|
| (g) 6th page print (#3R) | | |
| [MODE 3] | | |
| (a) 1st page print (#1F) | paper feed | |
| (b) 3rd page print (#2F) | paper feed | |
| (c) 5nd page print (#3R) | paper feed | |
| (d) 2nd page print (#1R) | | |
| (e) 7th page print (#4F) | paper feed | |
| (f) 4th page print (#2R) | | |
| (g) 9th page print (#5F) | paper feed | |
| (h) 6th page print (#3R) | | |
| Here, F: front surface, and | | |
| R: rear surface | | |

The print process of each of the three modes MODE 1, MODE 2 AND mode 3 is illustrated in FIGS. 29A through 29F, 30A through 30H, and 31A through 31L, respectively, It should be noted that these illustrations shown in FIGS. 29A through 31L illustrate the paper transportation path in the both side print mode schematically, and the location of odd-numbered sheets of paper are indicated by the fat solid lines with the locations of even-numbered sheets of paper being indicated by the fat dotted lines. It should also be noted that those elements shown in FIG. 29A which correspond to the elements shown in FIG. 3 are designated by the corresponding numerals, and the same holds true for the rest of FIGS. 29A through 31L.

Figure 29A:
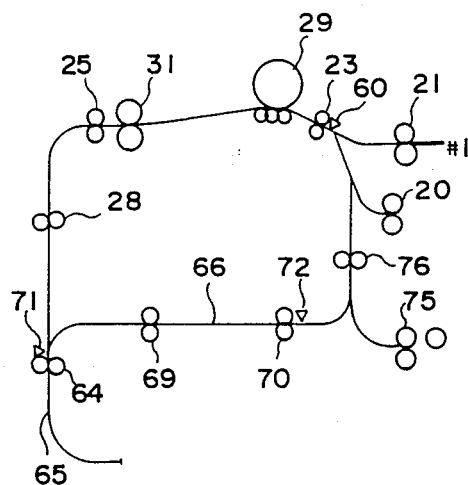
FIGS. 29A through 29F are views which are useful for understanding the sequence of steps in printing process in accordance with first both side print mode MODE 1 of the present embodiment.
Figure 29B:
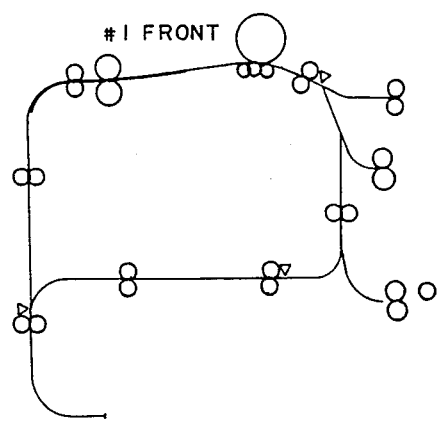
Figure 29C:
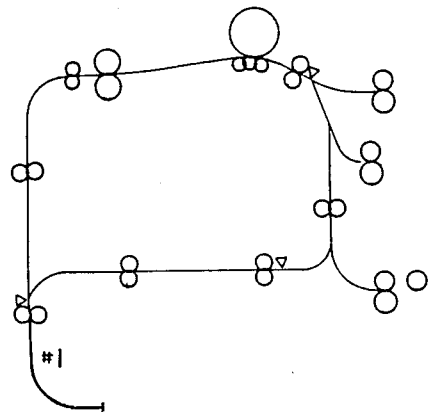
Figure 29D:
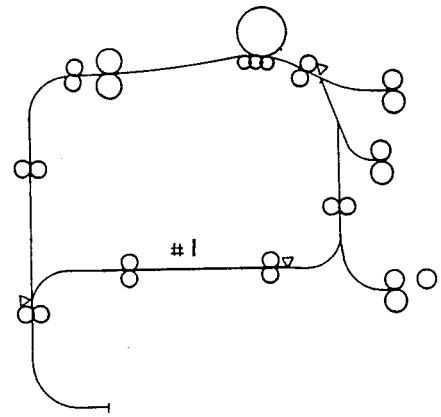
Figure 29E:
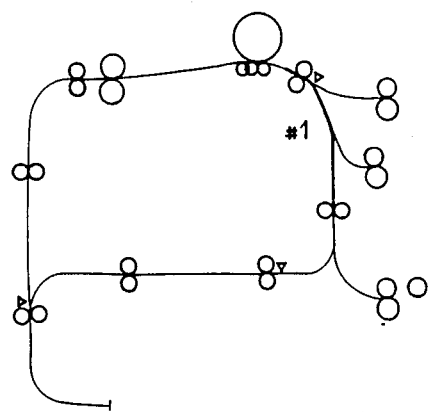
Figure 29F:
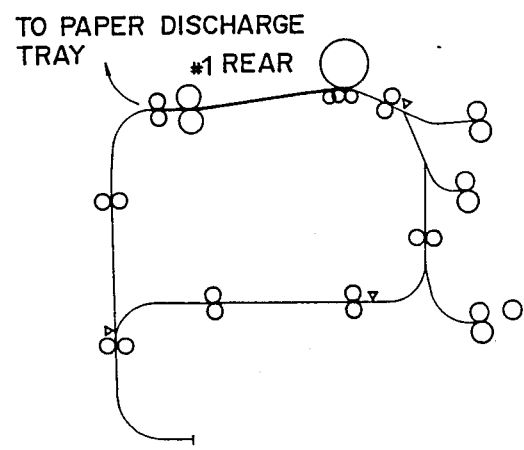

In the first place, the print process of MODE 1 is described with reference to FIGS. 29A through 29F. Although any one of the paper feed units may be selected, the selection will be made here for the upper paper feed cassette 2 mounted on the laser printer main unit 1. FIG. 29A illustrates the condition when the supply of the first sheet of paper #1 from the paper feed unit has been initiated. The first sheet #1 is fed into the loop-shaped paper transportation path and the first page is printed on its front surface as it is moved past a printing station (or image transfer station) as shown in FIG. 29B. Then, the paper #1 is transported into the inversion path 65 of the both side processing unit 6 over a predetermined length as shown in FIG. 29C. Then, the paper #1 is transported in the opposite direction, i.e., with its leading edge becoming the trailing edge, and is transported into the standby path 66 as shown in FIG. 29D. Then, the paper #1 is again transported along the loop path toward the printing station as shown in FIG. 29E and thus the second page is printed on the rear surface of paper #1 as it moves past the printing station as shown in FIG. 29F. Then the paper #1 which has been printed on both sides is then discharged into the selected paper discharge tray. The similar both side processing operation is carried out for the subsequent sheets of paper one after another until all of the required number of sheets of paper have been completed.

Figure 30A:
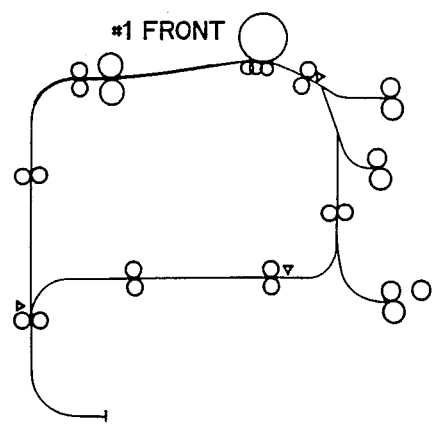
Figure 30B:
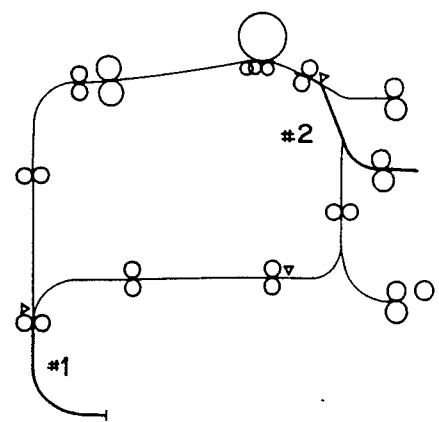
Figure 30C:
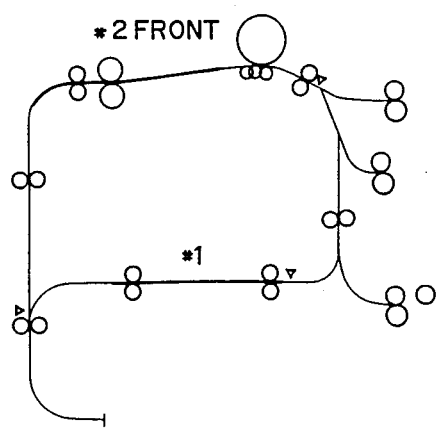
Figure 30D:
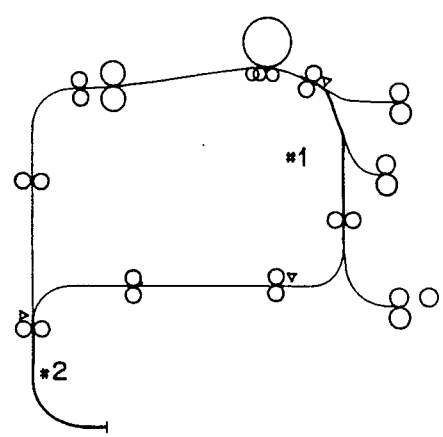
Figure 30E:
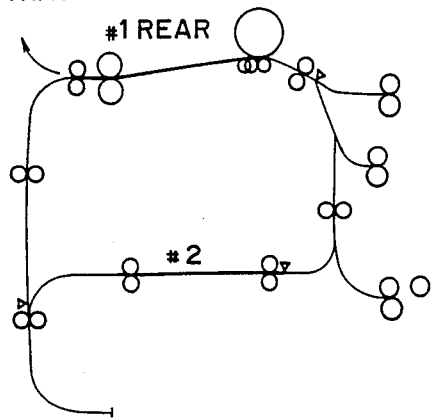

Next, with reference to FIG. 30A through 30H, the both side printing process of MODE 2 is described. It is now assumed that the lower paper feed cassette has been selected as a paper feed unit so that the paper feed operation is initiated from the lower paper feed cassette 3 and the first page is printed on the front surface of a first sheet #1 of paper as it is moved past a printing station as shown in FIG. 30A. The paper #1 is then transported into the paper inversion path of the both side processing unit, and at the same time the next sheet of paper #2 starts to be fed into the transportation path as shown in FIG. 30B. As the paper #1 is transported in the reversed direction out of the paper inversion path into the standby path, the third page is printed on the front surface of paper #2 as shown in FIG. 30C. Thereafter, the paper #1 is again transported toward the printing station, while the paper #2 is transported into the paper inversion path as shown in FIG. 30D. Then, at the same time as the paper #2 is transported out of the paper inversion path in the reversed direction toward the standby path, the second page is printed on the rear surface of paper #1 as it is moved past the printing station as shown in FIG. 30E.

Figure 30F:
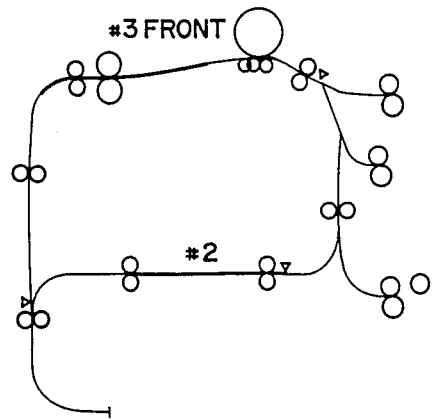
Figure 30G:
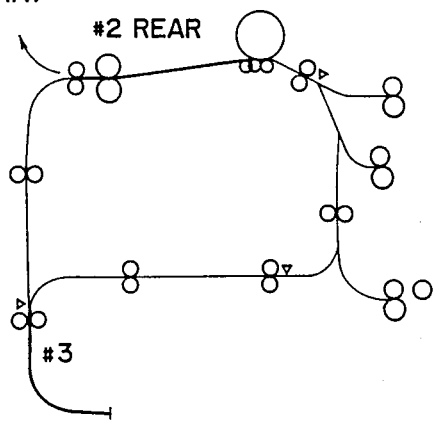
Figure 30H:
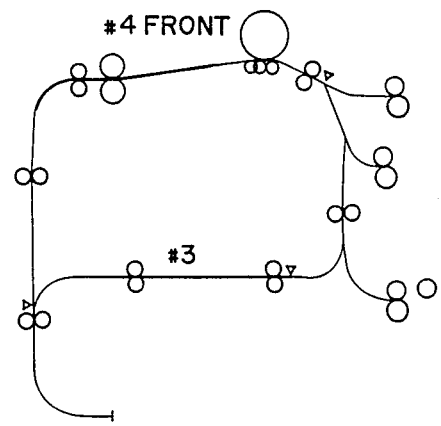

The paper #1 which has been printed on both sides is then discharged to the selected paper discharge tray, and at the same time the following paper #3 is fed into the transportation path, as shown in FIG. 30F. Then the fifth page is printed on its front surface as the paper #3 is moved past the printing station. Thereafter, at the time when the paper #3 is transported into the paper inversion path, the paper #2 is again transported toward the printing station so that the fourth page is printed on the rear surface of he paper #2 as it is moved past the printing station as shown in FIG. 30G. Then, the paper #2 which has been printed on both sides printed is discharged to the selected paper discharge tray. Then, the fourth paper #4 is fed into the transportation path. And, when the paper #4 is transported past the printing section so that the seventh page is printed on its front surface, and the paper #3 in the paper inversion path is transported in the reversed direction into the paper standby path, as shown in FIG. 30H. Thereafter printing is alternatively carried out on the front and rear surfaces at the printing station.

Figure 31A:
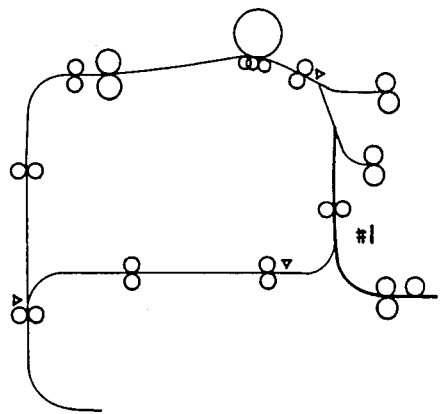
FIGS. 31A rough 31L are views which are useful for understanding the sequence of steps in a printing process in accordance with third both side print mode MODE 3 of the present invention.
Figure 31B:
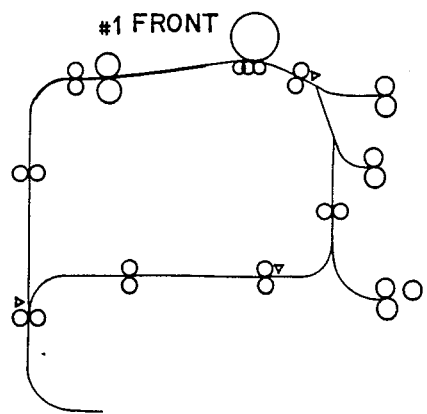
Figure 31C:
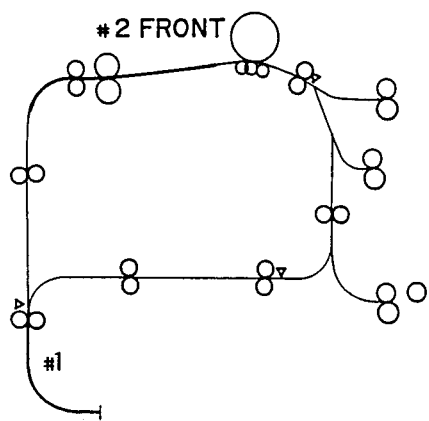
Figure 31D:
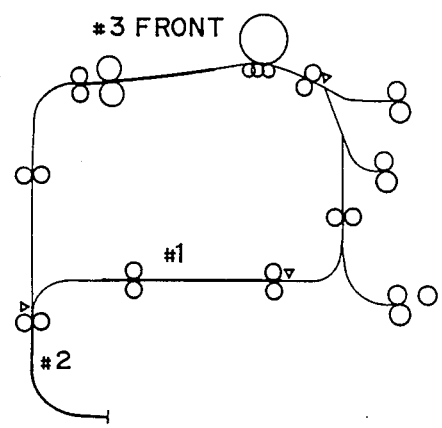
Figure 31E:
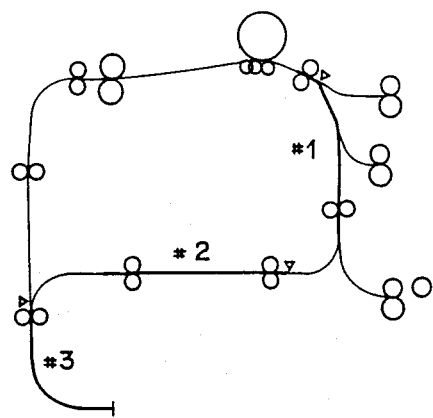

Referring now to FIGS. 31A through 31L, the printing process of the third both side print mode MODE 3 is described. It is assumed that the large quantity paper feed (LCIT) 7 is selected as a paper feed unit. The first sheet of paper #1 is fed as shown in FIG. 31A into the transportation path from the LCIT, and the first page is printed on its front surface as shown in FIG. 31B as the paper #1 is transported past the printing station. As the paper #1 is transported into the paper inversion path, the paper #2 is transported past the printing station as shown in FIG. 31C so that the third page is printed on the front surface of paper #2. Then, at the time when the paper #1 is transported into the paper standby path, the second paper #2 is transported into the paper inversion path. And, also the paper #3 is transported past the printing station, and the fifth page is printed on its front surface as shown in FIG. 31D. Thereafter, when the paper #1 is again transported toward the printing station, the paper #2 is transported into the standby path and the paper #3 is transported into the paper inversion path as shown in FIG. 31E.

Figure 31F:
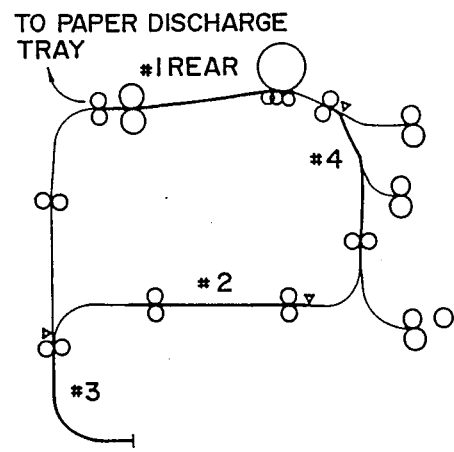
Figure 31G:
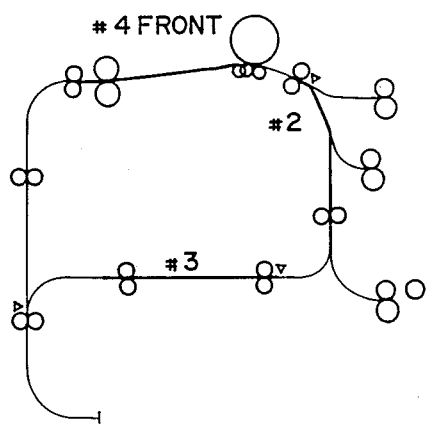
Figure 31H:
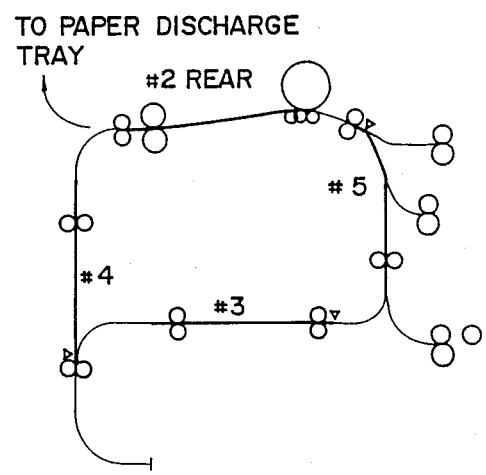
Figure 31:
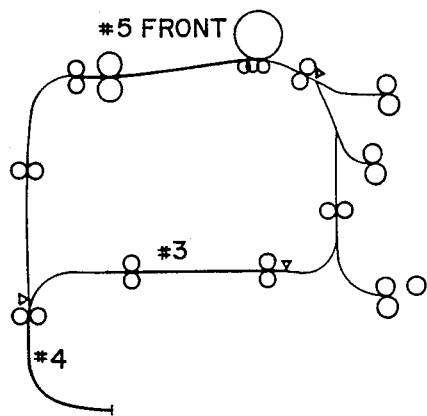
Figure 31J:
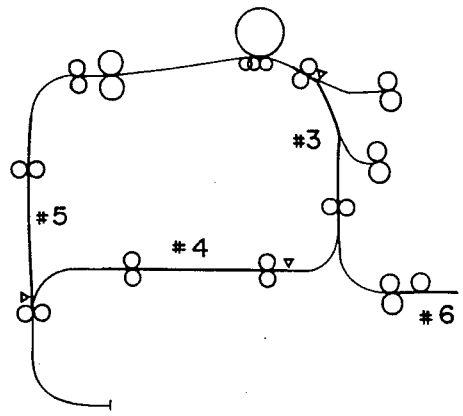

Then, as the paper #1 is transported past the printing station, the second page is printed on the rear surface thereof and at the same time paper #4 is fed into the transportation path from the LCIT as shown in FIG. 31F. Then, the paper #1 is discharged to the selected paper discharge tray, and simultaneously the seventh page is printed on the front surface of the paper #4 with the paper #2 transported toward the printing station and the paper #3 transported into the standby path as shown in FIG. 31G. Then, when the paper #4 is transported into the both side processing unit 6, the paper #2 is transported past the printing station and the fourth page is printed on the rear surface thereof. At the same time the fifth sheet of paper #5 is fed into the transportation path as shown in FIG. 31H. As the paper #5 is moved past the printing station, the ninth page is printed on the front surface of paper #5. At the same time the paper #4 is transported into the paper inversion path as shown in FIG. 31I. Then, the paper #3 is transported again toward the printing station and the paper #4 is transported into the standby path as shown in FIG. 31J.

Figure 31K:
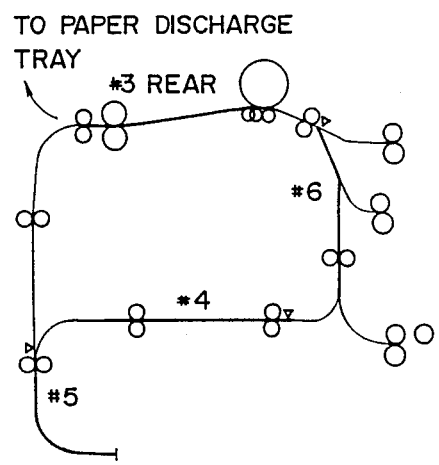
Figure 31L:
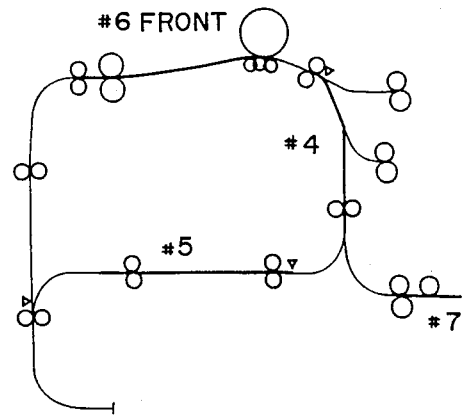

Thereafter, as shown in FIG. 31K, when the paper #5 is transported into the paper inversion path, the paper #3 is moved past the printing station and the sixth page is printed on the rear surface thereof. And the sixth sheet of paper #6 is fed into the transportation path. As shown in FIG. 31L, when the paper #6 is transported past the printing station, the tenth page is printed on the rear surface thereof and the paper #4 is transported again toward the printing station and the paper #5 is transported into the standby location. In this manner, printing is effected to the front and rear surfaces alternately at the printing station in the subsequent printing operations. The above sequence of each of MODE 1, MODE 2 and MODE 3 is stored in the ROM 132 as a firmware.

As may have already been understood, among these three duplex printing modes, MODE 1-MODE 3, MODE 3 has the fastest printing speed, followed by MODE 2, and MODE 1 has the slowest. More specifically, the overall printing speed of MODE 2 is approximately 1.5 times of that of MODE 1, and the over all printing speed of MODE 3 is more than twice of that of MODE 1. Thus, in the case of carrying out a large quantity of both side printing operations, MODE 3 is preferably selected, if possible.

However it should be noted that a memory capacity which permits video data corresponding to 5 pages at least to be formed therein is necessary to perform MODE 3. For this reason, MODE 3 is possible only when a sufficient memory capacity with respect to the size of the sheet of paper to be processed is available. On the other hand, MODE 1 is effective when a usable memory capacity is small. However, the speed of the printing is decreased. MODE 2 is intermittent between MODE 1 and MODE 3.

The printer controller 130 dynamically manages the entire memory region provided therein, and can find a usable memory area, i.e., an memory area which is currently available. When the size of the sheet of paper is determined, the CPU 131 of the printer controller 130 can then know a necessary memory capacity corresponding to the number of pages. Therefore, the printer controller 130 can automatically select one of the MODE 1, MODE 2 and MODE 3 by knowing the usable memory capacity which is currently available and the size of the sheet of paper to be used, in accordance with a flowchart shown in FIG. 32.

Referring to FIG. 32, a currently usable (available) memory capacity is investigated at step 1021. Subsequently a size of the sheet of paper to be used is checked at step 1022. Then at step 1023, it is checked whether or not the detected memory capacity exceeds a memory capacity corresponding to 5 pages of the sheet of paper having the size detected at step 1022. When a discriminated result is YES, the process proceeds to step 1026, at which MODE 3 is selected. Adversely when the result at step 1023 is NO, it is checked at step 1024 as to whether or not a currently available memory capacity exceeds a memory capacity corresponding to three pages. When a result at step 1024 is YES, the process proceeds to step 1027 where MODE 2 is selected. Alternatively when the result at step 1024 is NO, it is checked at step 1025 as to whether or not a currently available memory capacity exceeds a memory capacity corresponding to one page. When a result at step 1025 is YES, the full bit map mode under MODE 1 is selected. On the other hand, when a result at step 1025 is NO, the partial bit map mode under MODE 1 is selected. Then the both side printing process is executed at step 1030.

The absolute capacity of the RAM 133 is fixed (although extensible), whereas the memory capacity usable for the page buffer 193 and the video buffer 194 which are necessary to form the video data, is varied, depending on a size of the memory area which has been assigned to the fixed memory and permanent memory as well as a size of the sheet of paper. According to the present embodiment, one of the three both side print modes MODE 1, MODE 2 and MODE 3 can be automatically selected by looking up the current printing condition. As a result, the optimum print mode can be selectively obtained and thereby an increased printing speed can be obtained. For example, even when the currently available memory capacity is considerably small, a sheet of paper of a relatively small size may be printed by selecting MODE 3.

JAM BACKUP

As described previously, in the present printer controller 130, the backup buffers 191 are formed in the RAM 133 in order to recover data which would be lost if the paper is jammed. The memory capacity for the backup buffers 191 can be set at the time of power-ON or reset, by the control panel 11 shown in FIG. 10. The memory capacity set for the data backup is stored in the non-volatile memory provided in the printer controller 130. For example, an average number of 350 of characters is printed on a sheet of paper of A4 size, and 8 pages are necessary for the data backup in the worst case which may occur when MODE 2 is being set. Therefore, in this case, a memory capacity of approximately 28 Kbytes is necessary for the backup. From this viewpoint, it is advantageous to set intermittent or discrete values of the memory capacity used for the backup buffer, such as 16 Kbytes, 32 Kbytes, 48 Kbytes and 64 Kbytes, depending on the used print mode and the paper size to thereby improve the efficiency in use of the RAM 133.

Figure 33:
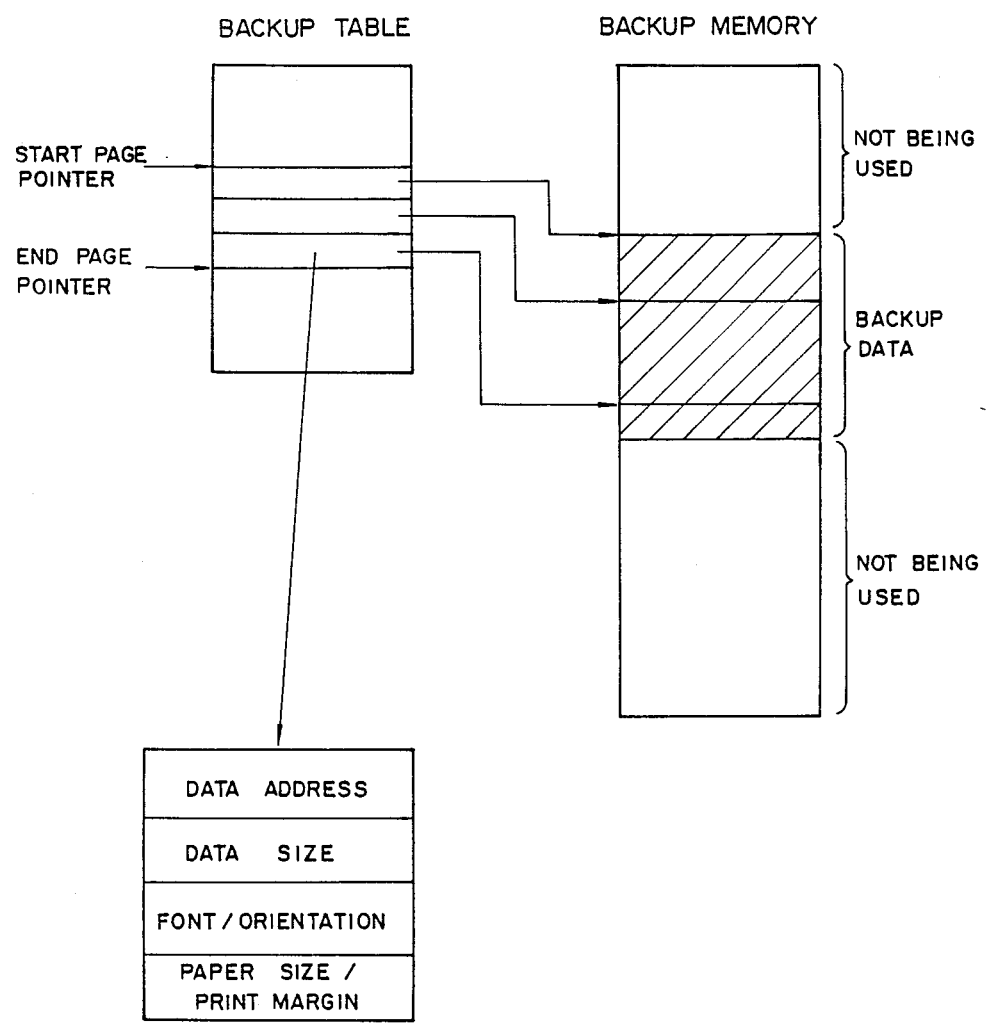
FIG. 33 is a view for explaining a structure of a backup buffer memory and its management table.

A structure of a backup buffer region of one backup buffer 191 is illustrated in FIG. 33. In the backup buffer region, backup data is stored into an area indicated by hatchings per page unit in the time sequence. That is, the backup buffer 191 is used as a cyclic memory. Data to be stored in the backup buffer is data itself supplied from the host system (ASCII). It is not desirable to store data supplied from the page buffer 193 into the backup buffer 191 as it is, because the print data corresponding to one page exceeds 14 Kbytes. The management of the backup buffer region is carried out by using a backup table as in the case of the memory management explained before with reference to FIG. 28. That is, the entire backup buffer region is divided into small units and backup table units are provided corresponding to the small units. Each of the backup table units stores the data address, data size, type of font, orientation (portrait or landscape), paper size and print margin. When data regarding a page which has been completely discharged is cancelled from the backup buffer region. Additionally, the backup for other data such as dot image data (hereafter simply referred to as image data) supplied from the host system may be employed. In this case, the data itself from the host system or compressed data may be stored into the corresponding backup buffer 191.

Information for the above backup may be supplied to the printer controller 130 through the control panel 11 shown in FIG. 10.

Figure 34:
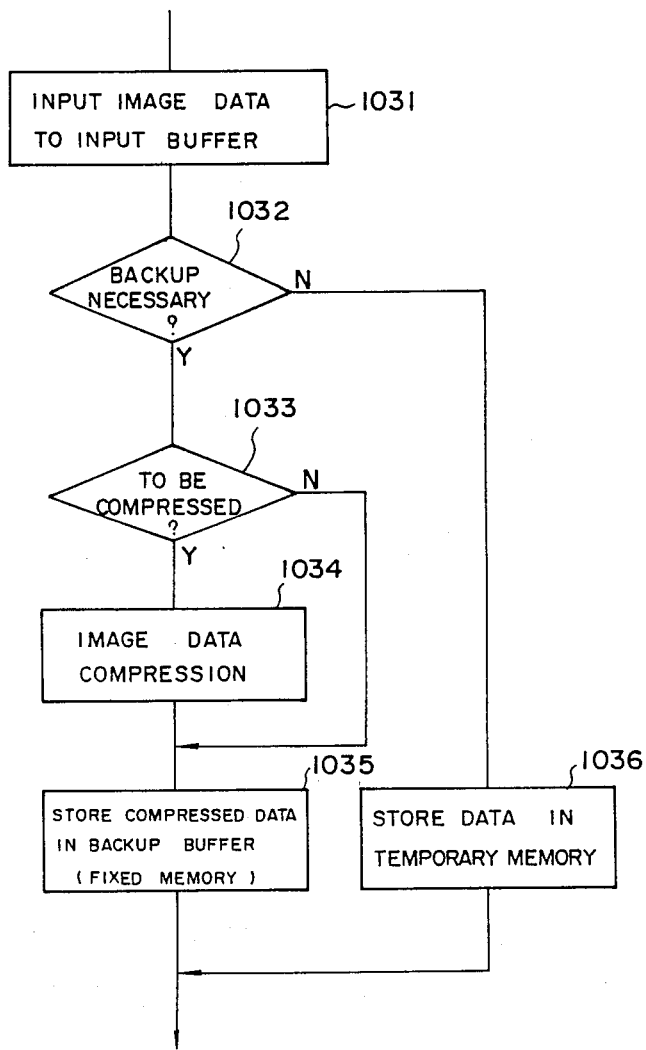
FIG. 34 is a flowchart of a backup process upon input of image data.

The CPU 131 in the printer controller 130 looks up the designated information on the backup at the time of inputting the image data at step 1031 of FIG. 34. When the backup is unnecessary, the process proceeds to step 1036 where the image data is stored into the temporary memory. Alternatively when it is detected at step 1032 that the backup is necessary, it is checked at step 1033 as to whether or not the image data should be compressed. When the data compression is instructed at step 1033, the image data is compressed at step 1034 and the process proceeds to step 1035. Also, when the result at step 1033 is NO, the process proceeds to step 1035. At step 1035, the image data or the compressed image data is stored into the backup buffer 191. The compression of the image data may be carried out as described before with reference to FIG. 25. In this case, it is possible to perform the OR operation between neighboring dots to thereby obtain ¼ of the quantity of the original data. It is also possible to compress the image data by using the conventional run length code. In the case where the image data is stored into the temporary memory, when outputting of the video data has been completed, the image data stored therein is immediately cancelled. On the other hand, in the case where the image data is stored in the backup buffer which is the fixed memory, when the image data becomes completely unnecessary, it is deleted.

It is seen from the above description that the backup can be flexibly carried out. For example, when the data to be printed is relatively important to an operator or user, it is preferable to assign a relatively large memory capacity may be assigned for the backup buffer 191. In this case, the printing speed may be somewhat decreased. Alternatively when the data to be printed is not relatively important, a relatively small memory capacity may be assigned for the backup buffer. In this case, an increased printing speed is obtainable.

In the present embodiment, as shown in FIG. 19, four host system are connectable to the laser printer system, so that a parallel data processing can be obtained. In order to accomplish the parallel processing, there are four host interfaces 134, four input buffers 190, four backup buffers 191 and four image files 192 which is provided as necessary. In addition, either one of the discharge trays or either one of the bins of the mail box 9 can be selected for each of the host systems. Therefore, sheets of paper each having been subjected to the printing operation by using respective data supplied from the corresponding host systems may be discharged to the corresponding paper discharge trays or bins which have been individually designated by the control panel 11. The parallel processing according to the present embodiment enables the laser printer system to be commonly used for a plurality of the host systems. In particular the parallel processing is very useful in the case where a plurality of low-speed computers such as personal computers are connected to the laser printer system of the present embodiment. The combination of one laser printer system and the plurality of the host systems is more economic than a printer exclusively provided for one computer.

Figure 35:
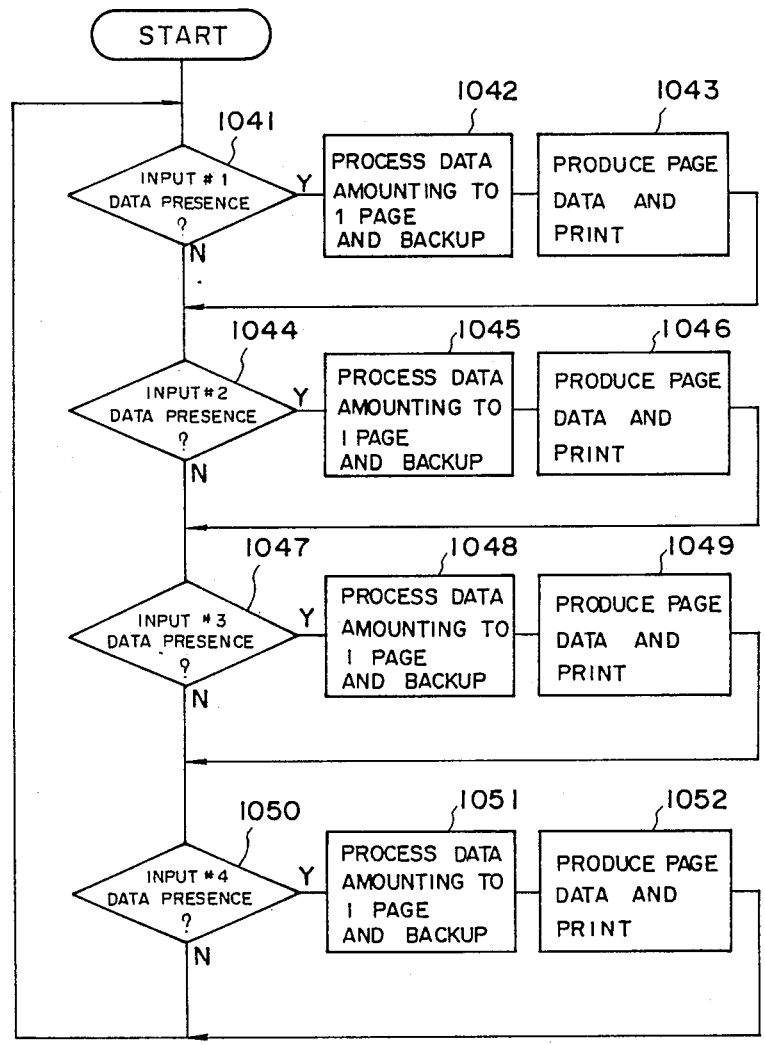
FIG. 35 is a flowchart of another backup process in which a plurality of input buffers are provided in the laser printer system.

In the parallel processing, data derived from the host systems are supplied to and temporarily stored in respective input buffers 190 shown in FIG. 19. Then, as shown by a flowchart of FIG. 35, the CPU 131 of the printer controller 130 sequentially checks whether or not data exist in the input buffers 190. At first, one input buffer #1 is checked at step 1041. When the input buffer #1 has data supplied from the corresponding host system, the process proceeds to step 1042, where the CPU 131 processes data amounting to one page and stores the processed data into the corresponding backup buffer 191. At stp 1043, the page data is formed, and then video data from the page data is produced and is printed out. The above operation is carried out for each of input buffers #2, #3 and #4 in accordance with steps 1044 through 1052.

Figure 36:
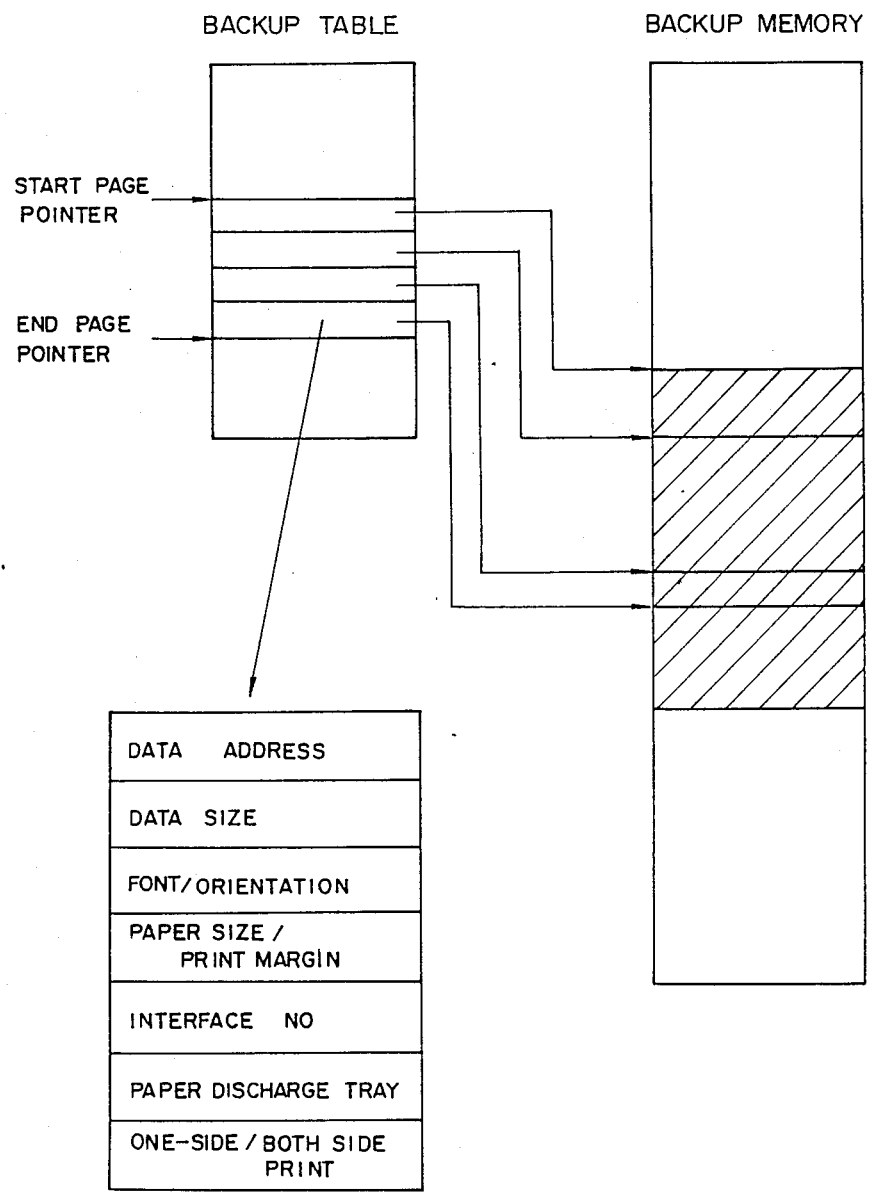
FIG. 36 is a view for explaining a backup memory structure and its management table in the case of FIG. 35.

The management of the backup buffers 191 provided so as to correspond to the input buffers #1 through #4 is carried out by using a backup table as shown in FIG. 36 for each of the input buffers #1 through #4. The backup table is divided into small table units corresponding to one page, each of which stores information on the data address, data size, font, page orientation, paper size, print margin, interface No (#1 through #4), discharge tray, and one-side/both side print. Therefore, even when information on paper size, font, page orientation, print margin and so on is changed in the each of the host interfaces 134, the backup buffers 191 can follow this change, because the host interfaces independently have the information.

At the time when data stored in the input buffers 190 is sequentially processed, if transmission of data is accidentally stopped in the intermediate stage of one page being processed or if data is stopped in the one-side print mode, the print process is forcedly terminated when a predetermined time elapses after the occurrence of the erroneous stop of the data. That is, when the data is ceased in the intermediate stage of one page, only data which has already been received is printed. If only transmission of data corresponding to one surface of one sheet of paper has been received and data of the other surface thereof is accidentally stopped, no data is printed on the other surface, so that it remains blank.

In the present embodiment, although four host interfaces 134 are provided, in addition thereto, more host interfaces in conformity with RS-232 interface, Centronics or the like may be physically provided in the system. In place of being provided with the interfaces, in the case where software interfaces such as SCSI, LAN and so on may be employed. In this case, a printer address identifying information (ID) corresponding to each of the interfaces needs to be used, to thereby discriminate each host system by the corresponding printer address ID even when only one interface is provided. Inputs supplied to the input buffers from the respective host systems are separately processed by the time division process. Printer address identifying information corresponding to the used input buffers may be inputted into the system by the control panel 11.

SUMMARY OF COMMUNICATION BETWEEN PRINTER CONTROLLER AND PRINTER ENGINE UNIT

There are two types of communication means between the printer controller 130 and the printer engine unit 90. One of them is a communication means in which a command is sent from the printer controller 130 to the printer engine unit 90 and its response from the printer engine unit 90 is sent back to the printer controller 130. The other is a communication means in which the event report is sent from the printer engine unit 90 to the printer controller 130 and its acknowledgement from the printer controller 130 is sent back to the printer engine unit 90.

A description is first given of a communication protocol which defines the communication between the printer controller 130 and the printer engine unit 90.

When the printer controller 130 receives a response corresponding to the immediately previous command from the printer engine unit 90, it must send a next command to the printer engine unit 90. The printer engine unit 90 always sends a response in return for the command supplied from the printer controller 130. When the printer controller 130 receives the response from the printer engine unit 90, if a communication error occurs or a response having an unclear meaning is received, the printer controller 130 sends the identical command to the printer engine unit 90 again. However, if a communication error occurs again or a response having an unclear meaning is received again, the printer controller 130 stops the communication or sends an initialization command to the printer engine unit 90. The printer controller 130 must send an acknowledgement (hereafter simply referred to as ACK) or a negative acknowledgement (hereafter simply referred to as NAK) after it receives the event report from the printer engine unit 90. The ACK is sent to the printer engine unit 90 if the received event report is correct, and alternatively the NAK is sent to the printer engine unit 90 if the received event code is a code having an unclear meaning or if the communication error occurs. When the printer engine unit 90 receives the NAK it must send the same event report to the printer controller 130. In this case if the same error occurs, the printer controller 130 stops the communication or sends the initialization command to the printer engine unit 90. The printer engine unit 90 is thereby inhibited from sending the next event report prior to receiving the ACK or NAK with respect to the previous event report from the printer controller unit 130. When the print controller 130 receives the event report from the printer engine unit 90 and then know detailed status of the printer engine unit 90, the printer controller 130 is permitted to send a status command in advance of sending the ACK. At this time, the printer engine unit 90 must send the response to the command. If one or more events occur before the printer engine unit 90 receives the ACK, the response to the command is changed to the last event of the printer engine unit 90. The printer controller 130 must receive the event report prior to receiving the corresponding response to the command, and is forced to wait for the response to the command after receiving the event report. The printer engine unit 90 must send the response with respect to the command within one second, except for the case where it is caused to be initialized by the initialization command. If the printer engine unit 90 does not send the response within one second, the printer controller 130 may start a communication error processing such as a time-out processing. In this case, the printer controller 130 sends the identical command to the printer engine unit 90 again.

The printer controller 130 must send the ACK or NAK for the event report within one second. If the ACK or NAK is not sent within one second, the printer engine unit 90 sends the same event to the printer controller 130. Then if the time-out error occurs again, the printer engine unit 90 starts the communication error processing, and is forced to wait until the printer controller 130 detects the communication error. After the printer engine unit 90 starts the communication error processing, it sends no event report to the printer controller 130 and waits until it receives the initialization command from the printer controller 130.

In the case where the command exceeds one byte, each byte data must be sent at an interval equal to or shorter than 100 ms. If the interval between each byte data exceeds 100 ms, this is a communication error, and the printer engine unit 90 sends 80 hexa codes to the printer controller 130 as in the transmission of an anormal command. In the case where the response exceeds one byte, each byte data must be sent at an interval equal to or shorter than 100 ms. If the interval between the adjacent byte data exceeds 100 ms, this is a communication error, and the printer controller 130 starts the communication error processing.

The command and event report are inhibited from being sent within two seconds after the power of the system is turned on by the printer engine unit 90 or the printer controller 130. If a time more than two seconds is necessary for the initialization, a control signal CTS or DTR must be turned off within two seconds. That is, the control signal is allowed to be turned on after completion of the initialization. The control signals CTS and DTR must be kept in ON state, except for the initialization setting. When the printer controller 130 needs the initialization after turning the power on, the printer controller 130 may turn the control signal CTS off. In this case, the printer controller 130 must receive at least one event report within 10 ms after turning the control signal STS off, and must send the ACK for the event report prior to the initialization by the printer controller 130.

When the printer engine unit 90 is initialized by the initialization command, it turns the control signal DTR off and rejects all the command from the printer controller 130. After the initialization, the printer engine unit 90 sends the response for the initialization command to the printer controller 130.

Now the command and its response is described. There are two types of commands derived from the printer controller 130; one of which is an execution command, and the other is a status request command. The response from the printer engine unit 90 is limited to those commands.

The execution command comprises the following:
(1) initialization for print start command;
(2) initialization for print request signal;
(3) test print mode;
(4) cue buffer clear;
(5) print start;
(6) change of paper feed cassette selection/paper feed cassette;
(7) change of paper discharge tray selection/paper discharge tray; and
(8) both side print mode selection.

The above execution commands are stacked into a cue buffer of the printer engine unit 90, which executes those in sequence. When the printer engine unit 90 receives the initialization command and when paper jamming or an fault in the printer engine unit 90 occurs, the cue buffer is cleared.

The status required command comprises the following:
(1) paper feed cassette in use (including LCIT);
(2) paper discharge tray in use;
(3) paper length in use;
(4) paper width in use;
(5) paper size;

(6) structure of optional unit;
(7) current status of engine;
(8) version of engine unit firmware;
(9) version of LCIT/DPX unit firmware;
(10) version of MB unit firmware;
(11) position of jammed paper in engine;
(12) position of jammed paper in optional unit;
(13) jammed paper ID (identification code); and
(14) print mode in use (both side print mode/one side print mode).

These status request commands are not stacked in the cue buffer of the printer engine unit 90. The response from the engine for the command has a most significant bit MSB of a value of "0", and the response from the engine for the event report has a most significant bit MSB of a value of "1". Therefore, the printer controller 130 can discriminate the responses for the command and the event report. The printer engine unit 90 has a cue buffer for the event report, and successively sends the event report to the printer controller 130. This event report is always formed with one byte.

After turning power ON or initialization, the printer engine unit 90 does not sent the event report to the printer controller 130 even if the printer engine unit 90 has information to be reported to the printer controller 130. Therefore, the printer controller 130 is required to know the current status of the printer engine unit 90 after turning the power ON or initialization.

The event report contains the following:
(1) faults in the printer engine unit;
(2) faults in LCIT unit;
(3) faults in DPX unit;
(4) faults in MB unit;
(5) faults in hardware;
(6) paper jamming occurrence/position;
(7) presence/absence of an unit which cannot be used for the printer engine unit;
(8) open/closed state of a front cover of the printer engine board;
(9) open/closed state of a top cover of the printer engine board;
(10) open/closed state of a side cover of the printer engine board;
(11) open/closed state of a cover of LCIT;
(12) open/closed state of a cover of DPX:
(13) open/closed state of a cover of MB;
(14) insertion/detachment state of the upper paper feed cassette;
(15) insertion/detachment state of the lower paper discharge cassette;
(16) presence/absence of paper in the upper paper feed cassette;
(17) presence/absence of paper in the lower paper feed cassette;
(18) presence/absence of paper in LCIT;
(19) presence/absence of paper in the lower stage paper discharge tray of LCOT;
(20) presence/absence of paper in the upper stage paper discharge tray of LCOT:
(21) presence/absence of MB;
(22) open/closed state of the rear paper discharge tray;
(23) necessity/completion of maintenance;
(24) acceptance of anormal command;
(25) completion of printing;
(26) full of data in the command cue buffer; and
(27) full of data in the status report cue buffer.

DIAGNOSIS AND SERVICE FUNCTIONS

The printer controller 130 in the present embodiment also support a diagnosis function and service functions as listed below:
(1) diagnosis at the time of power ON;
(2) loop-back test;
(3) self-test/optional unit test;
(4) printing of summary sheet and field service report;
(5) hexa-dump print; and
(6) programmed print.

[Diagnosis at the time of turning power ON]

The printer controller 130 checks the built-in hardware when the power is turned on. If there is an error in the printer controller 130, the LED 112 mounted on the control panel 11 shown in FIG.10 is turned on. Then the content of the error is displayed on the character display unit 110 by a message or a corresponding error number. Additionally, the content of the error is also indicated by a binary code number (corresponding to the error number), which is represented by four LEDs (not shown) mounted on a controller board of the interface controller 52.

(a) firmware ROM CRC error (error number 0)

The printer controller 130 tests the firmware ROM which is a program built-in ROMs such as the ROM 132 by using CRC-16 test. When a CRC error occurs, the printer controller 130 stops and causes all the LEDs mounted on the control board to be turned on. If the printer controller 130 can continue to operate and the firmware has an error, an error number "0" is indicated by the four LEDs mounted on the control board.

(b) RAM driver circuit error (error number 1)

If the printer controller 130 cannot access the RAM 132, it is decided that this is due to a RAM driver circuit error. Then an error number "1" is displayed on the LEDs on the controller board and also the character display unit 110.

(c) RAM error through bus buffer (error number 2)

If errors are detected in a read/write test of all the RAM devices constituting the RAM 133, in which the test is performed through the CPU bus buffer, an error number "2" is displayed on the LEDs on the controller board and the character display unit 110. In the test, the CPU 131 checks all the RAM devices by using test data pattern of $5555_{hex}$ and $AAAA_{hex}$.

(d) RAM address error (error number 3)

When it is detected that a RAM device has a block error by the read/write test, this is decided to be a RAM address error. Then an error number "2" is displayed on the LEDs by the controller board and the character display unit 110. In the test, the CPU 131 writes mutually related data into each of the RAM devices, and then reads out those therefrom, and compares the read-out data with each other.

(e) timer/interruption error (error number 4)

When the printer controller 130 does not receive a response within the preset interval through a timer and interruption circuit, it is decided that this is due to be a timer/interruption error. Then an error number "4" is displayed on the LEDs mounted on the controller board and the character display unit 110.

(f) font ROM CRC error (error number 5)

In the case where the system has therein a plurality of types of fonts and each of them is stored in the font files 195, each of font files is tested by using the CRC—16 test. A reference CRC value is stored in a specific position in each of the font files 195. When errors are detected in all the font files 195, an error number "5" is displayed on the LEDs mounted on the controller board and the character display unit 110.

(g) non-volatile RAM error (error number 6)

When the access to a non-volatile RAM which is a part of the RAM 133 cannot be obtained, an error number "6" is displayed on the LEDs on the circuit board and the character display unit 110.

(h) host interface LSI error (error number 7)

When the access to a host interface LSI which is an LSI constituting the host interface 135 cannot be obtained, an error number "7" is displayed on the LEDs and the character display unit 110.

(i) engine interface LSI error (error number 8)

When the access to an engine interface LSI which is an LSI constituting the engine interface 138 cannot be obtained, an error number "8" is displayed on the LEDs and the character display unit 110.

(j) control panel interface LSI error (error number 9)

When the access to a control panel interface LSI which is an LSI constituting the control panel interface 136 cannot be obtained, an error number "9" is displayed on the LEDs and the character display unit 110.

(k) optional RAM error (error number 10)

When the access to an optional RAM area which may form a storage region of the RAM 133 cannot obtained, or when there is a fault therein, an error number "10" is displayed on the LEDs and the character display unit 110.

(l) font ROM CRC error (error number 11)

When the printer controller 130 checks the font files which are stored in the ROM 150 shown in FIG. 13 by using CRC—16 and finds an error therein, an error number "11" is displayed on the LEDs and the character display unit 110.

(m) no response from engine

When the printer controller 130 does not receive any response from the printer engine unit 90 through the engine interface 138, a corresponding message is displayed on the character display unit 110.

(n) control panel lamp test

At the commencement of the test, the printer controller 130 sends an instruction to the control panel 11. In response to this instruction, the control panel 11 is driven so that all the LEDs mounted on the control panel 11 are turned on and the character display unit 110 is kept in the character display state for approximately one minute.

(o) bus controller/gate array error (error number 12)

When the printer controller 130 cannot access the bus controller gate array chip, an error number "12" is displayed on the LEDs on the controller board and the character display unit 110. At this time, the printer controller 130 must carry out the following tests:
 (i) controller register read/write test;
 (ii) data expansion/compression logic test;
 (iii) shifter logic test;
 (iv) arithmetic logic test; and
 (v) memory clear logic test.

(p) dynamic controller/gate array error (error number 13)

The the printer controller 130 cannot access a timing controller gate array chip, an error number "13" is displayed on the LEDs and the character display unit 110.

[LOOP-BACK TEST]

When the loop-back connectors are mounted on the host interfaces 134, the loop-back test is activated. Then the printer controller 130 checks interface connector circuits. If there is a short-circuit or disconnection in the circuit, the printer controller 130 drives the character display unit 110 so that a corresponding message is displayed thereon. There are three types of loop-back connectors which are parallel/Centronics, serial/RS-232C and serial/RS-422 connector. The loop-back test is started when the test switch 119 is depressed during the power ON diagnosis, which is indicated on the character display unit 110.

[SELF-TEST/OPTIONAL UNIT TEST]

In this mode, paper is fed from a selected paper feed cassette, a predetermined test pattern is printed on the fed paper, and the printed paper is discharged to a selected paper discharge tray. In this mode, the one-side print mode and the both side print mode can be selected.

For example, there may be prepared four test patterns as shown in FIG. 37A through 37D. A data file for generating such test patterns and font data of patterns which are used therefor are formed in the form of a macrofile in the ROM 132. Alternatively, such a macrofile may be formed in the font cartridge 12, 13, which can be accessed by the control panel 11. The number of sheets of paper to be printed with the test pattern thereon can be set by switches mounted on the control panel 11.

Figure 37A:
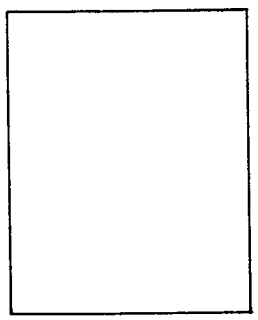
FIGS. 37A through 37D are views showing test patterns.
Figure 37C:
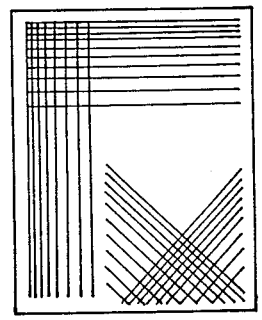
Figure 37B:
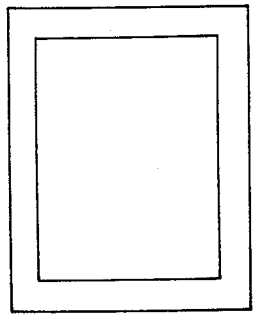
Figure 37D:
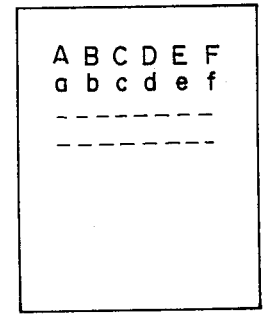

The test pattern of FIG. 37A is a test pattern of a blank sheet of paper for testing the presence of spots on background thereof. The test pattern of FIG. 37B is a test pattern of a rectangular frame for the skew test. The test pattern of FIG. 37C is a pattern in which horizontal lines, vertical lines and oblique lines ar drawn with their densities varied. The test pattern of FIG. 37D is a character pattern for the character test. Test patterns are not limited to the above four patterns, and various test patterns may be used.

The self-test/optional unit test is started when the test print mode is selected and then the test switch 119 is depressed by the control panel 11.

The test print has the following three modes:

(1) TEST PRINT 1

A designated number of sheets of paper are fed from a selected paper feed cassette and a designated test pattern is printed on the paper. Then printed sheets of paper are discharged to a selected paper discharge tray. In the present embodiment, the above four test patterns are used, and a desired number of sheets of papers in a range from 0 to 4095 may be designated. In the case where the mail box 9 is provided with the printer system as a paper discharge tray, paper is selectively discharged to the bins thereof in the sequence. The test pattern is sequentially selected from among the test patterns #1 through #4.

(2) TEST PRINT 2

A paper feed cassette and paper discharge tray are sequentially selected among from the usable paper feed cassettes and paper discharge trays, and a designated test pattern is printed on a designated number of sheets of paper. In the case where a plurality of paper feed cassettes are switched in sequence so that one paper feed cassette is selected, if a size of the test pattern does not match with a size of the paper, data of the test pattern is automatically expanded or compressed so that the test pattern may be positioned within the selected paper.

(3) TEST PRINT 3

A designated number of sheets of paper are fed from a designated paper feed cassette, and a designated test pattern is printed on the fed paper in a designated both side print mode, and the printed paper is discharged to a designated paper discharge tray.

[SUMMARY SHEET AND FIELD SHEET PRINTING]

The printer controller 130 carries out the summary sheet printing and field sheet printing which are designated by the control panel 11. This printing is started by depression of the test switch 119. A paper feed cassette and a paper discharge tray which are used in this printing may be selected by the control panel 11. On the summary sheet, the following information may be printed:

(1) firmware version level;
(2) software of system and its version level;
(3) content of mode selection;
(4) RAM in the system;
(5) memory presented for user;
(6) status of paper feed cassettes (including LCIT);
(7) status of paper discharge trays;
(8) status of the both side processing unit;
(9) fonts provided in the system; and
(10) history of controller error.

The following information are printed on the field service report:
(1) version level of firmware
   (i) a version level of the controller firmware;
   (ii) a version level of the engine firmware;
   (iii) a version level of the LCIT/DPX unit firmware; and
   (iv) a version level of the MB unit.
(2) version level of font
   (i) Courier 10;
   (ii) Letter Gothic 16.7; and
   (iii) others.
(3) printer system serial number
(4) number of times of power ON
(5) number of sheets of paper to be fed
   (i) a number of sheets of paper fed from the upper paper feed cassette 2;
   (ii) a number of sheets of paper fed from the lower paper feed cassette 3; and
   (iii) a number of sheets of paper fed from LCIT 7.
(6) number of sheets of paper to be discharged
   (i) a number of sheets of paper discharged to the upper stage paper discharge tray 8A;
   (ii) a number of sheets of paper discharged to the lower stage paper discharge tray 8B;
   (iii) a number of sheets of paper discharged in the sort mode; and
   (iv) a number of sheets of paper discharged in the stack mode.
(7) number of sheets of paper subjected to both side printing
(8) faults in engine
   (i) uncontrollable;
   (ii) developing motor;
   (iii) drive motor;
   (iv) laser diode;
   (v) polygon mirror motor;
   (vi) photodetector;
   (vii) high temperature in the fixing unit;
   (viii) low temperature in the fixing unit;
   (ix) thermistor in the fixing unit;
   (x) power supply unit;
   (xi) interlock switch;
   (xii) communication;
   (xiii) motor for elevationally driving the upper paper feed cassette;
   (xiv) motor for elevationally driving the lower paper fed cassette;
   (xv) job motor for the lower stage of LCOT;
   (xvi) job motor for the upper stage of LCOT;
   (xvii) MB job motor; and
   (xviii) SCOT job motor.
(9) paper jamming
   (i) upper paper feeding portion;
   (ii) lower paper feeding portion;
   (iii) paper transportation path;
   (iv) image fixing portion;
   (v) paper discharging portion;
   (vi) paper discharge path;
   (vii) rear paper discharge tray;
   (viii) LCIT paper feeding portion;
   (ix) DPX exit;
   (x) DPX entrance;
   (xi) DPX paper exit;
   (xii) upper stage paper discharge of LCOT;
   (xiii) lower stage paper discharge of LCOT; and
   (xiv) MB unit.

(10) check list of ROMs in printer controller

(11) addresses of poor RAM devices (including RAMs not mounted)

(12) addresses of poor ROM devices (including ROMs not mounted)

The contents of the above (3) through (9) are not cleared even with the power OFF, because they are stored in non-volatile RAM devices. When the printer controller 130 is in the initialization mode, they may be cleared by the control panel 11.

[HEXA-DUMP PRINT]

When the shift switch 112 and the test switch 119 mounted on the control panel 11 are simultaneously depressed, the printer controller 130 performs the hexa-dump print. Formats of the hexa-dump print are as follows:

(1) Four characters from the left-hand side of the printed character line is a serial number of data byte positioned in a range of 16 bytes.

(2) Data of one byte is represented by three characters including a space character, and one line is printed with 16 bytes.

(3) A symbol consisting of 16 characters is printed in the right-hand side of the line. If there is no symbol to be printed, specific characters are printed instead.

(4) The printing can automatically print the next line, and can automatically print next page. For example, each line is printed including a total number of 70 of characters with 10 cpi by using Courier 10. One page is printed with 61 cpi including a total number of 60 of lines.

(5) Limited functions of any control code or escape sequence are neglected, and are replaced with symbols.

[PROGRAM PRINT]

The printer controller 130 also handles the program print in which data stored as the data file and print software file in the cartridge is printed. When the text switch 119 mounted on the control panel 11 during the power ON diagnosis, if there is stored the data file for the program print in the cartridge, the controller 130 causes the program print started after completing the loop-back test.

The present invention is not limited to the above embodiments, but various variations and modifications may be made without departing from the scope of the present invention. The present invention includes digital copiers, facsimiles and so on.

What is claimed is:

1. An image forming system for forming an image on both surface sides of a sheet of paper, comprising:

random access memory means for storing video data to be printed on a sheet of paper;

printing means reading out the video data stored in the random access memory means and printing an image formed by the video data on the sheet in either one of a plurality of predetermined both side print modes, said printing means comprising:

transporting means for transporting the sheet of paper along a predetermined transportation path including a loop path section;

inverting means located in said loop path section for turning the paper over to face the opposite direction;

feeding means for feeding the sheet into said transportation path; and image printing means disposed at said loop path section for printing the image formed by the video data on the sheet which is being transported along said transportation path;

the both side print modes defining different sequences of reading out the video data corresponding to one page from the video data and different sequences of printing on two surfaces of sheets, one of the both side print modes being selected depending on the currently available memory capacity of the random access memory means;

the both side print modes including first, second and third both side print modes, the first both side print mode being selected when the random access memory means has a large amount of currently available memory capacity, the second both side print mode being selected when the random access memory means has a medium amount of currently available memory capacity, the third both side print mode being selected when the random access memory means has a small amount of currently available memory capacity;

the first both side print mode being a mode (MODE 3) in which the printing means alternately prints images on a front surface of a sheet of paper and a rear surface of a sheet of paper which precedes the former sheet by two sheets of paper;

the second both side print mode being a mode (MODE 3) in which the printing means alternately prints images on a rear surface of a sheet of paper which has a front surface on which an image has been printed and on a front surface of a sheet of paper which follows the former sheet by two sheets of paper; and the third both side print mode being a mode (MODE 1) in which the printing means alternatively prints images on a front surface of a sheet of paper and a rear surface of said sheet of paper.

2. An image forming system for forming an image on both surface sides of a sheet of paper, comprising:

memory means comprising page memory means for storing data per one page of a sheet of paper to be printed on a sheet of paper; and video memory means for storing video data corresponding to the data stored in the page memory means;

controlling means for securing a memory region for the video memory means from an entire memory region of the memory region and for forming the video data in the video memory means from the data stored in the page memory means;

detecting means for detecting a currently available memory capacity of the memory means which can be presented for the video memory means and a size of the sheet of paper to be used; and printing means for printing an image formed by the video data on the sheet in either one of a plurality of predetermined both side print modes which is selected depending on a detected result by the detecting means, the both side print modes defining different sequences of reading out the video data corresponding to one page from the video data and different sequences of printing on surfaces of sheets.

3. An image forming system as claimed in claim 2, wherein the controlling means secures, from the entire memory region, a memory region of the video memory means corresponding to at least one page of the sheet to be printed, when the detecting means detects that a currently available memory capacity of the memory means exceeds a memory capacity corresponding to one page of the sheet to be printed.

4. An image forming system as claimed in claim 2, wherein the controlling means secures, from the entire memory region, a part of a memory region corresponding to one page of the sheet to be printed, when the detecting means detects that a currently available memory capacity of the memory means is less than a memory capacity corresponding to one page of the sheet to be printed.

5. An image forming system as claimed in claim 4, wherein the controlling mean divides the secured part of the memory region of the video memory means to two page blocks and forms video data corresponding to a part of one page of the sheet in one page block, while outputting preceding video data which corresponds to the part of one page and has been formed in the other page block of the secured part of the memory region of the video memory means.

6. An image forming system as claimed in claim 4, wherein the controlling means divides the secured part of the memory region of the video memory means to a plurality of page blocks and forms video data corresponding to a part of one page of the sheet in page blocks except for one page block, while outputting preceding video data which corresponds to a part of one page and has been formed in the previous data forming process.

7. An image forming system as claimed in claim 2, wherein the controlling means further comprises a direct memory access transfer means for transferring the data stored in the page memory means to the video memory to form the video data in the video memory means.

8. An image forming system as claimed in claim 7, wherein the direct memory access transfer means further comprises means for subjecting the data read out from the page memory to either one of data expansion and data compression, so that one of the expanded data and compressed data is transferred to the video memory means.

9. An image forming system as claimed in claim 2, further comprising a host system for generating data to be printed, storage means for storing data derived from the host system, data read out from the storage means being supplied to the page memory.

10. An image forming system as claimed in claim 2, wherein the printing means further comprises transporting means for transporting the sheet of paper along a predetermined transportation path including a loop path section; inverting means located in said loop path section for turning the paper over to face the opposite direction; feeding means for feeding the sheet into said transportation path; and image printing means disposed at said loop path section for printing the image formed by the video data on the sheet which is being transported along said transportation path.

11. An image forming system as claimed in claim 2, further comprising backup data storing memory means for storing backup data, and backup data generating means for generating the backup data from the data to be printed.

12. An image forming system as claimed in claim 8, wherein the backup data generating means generates the backup data by compressing the data to be printed.

13. An image forming system as claimed in claim 2, wherein when the detecting means detects a currently available memory capacity of the memory means corresponding to a memory capacity exceeding 5 pages of a sheet having a size identical to that of sheet to be used, the printing means carrys out printing in accordance with a first both side print mode (MODE 3) in which the printing means alternately prints images on a front surface of a sheet of paper and a rear surface of a sheet of paper which precedes the former sheet by two sheets of paper.

14. An image forming system as claimed in claim 2, wherein when the detecting means detects a currently available memory capacity of the memory means corresponding to a memory capacity in a range of 3 to 5 pages of a sheet having a size identical to that of sheet to be used, the printing means carrys out printing in accordance with a second both side print mode (MODE 2) in which the printing means alternately prints images on a rear surface of a sheet of paper which has a front surface on which an image has been printed and on a front surface of a sheet of paper which follows the former sheet by two sheets of paper.

15. An image forming system as claimed in claim 2, wherein when the detecting means detects a currently available memory capacity of the memory means corresponding to a memory capacity less than 3 pages of a sheet having a size identical to that of sheet to be used, the printing means carrys out printing in accordance with a third both side print mode (MODE 1) in which the printing means alternately prints images on a front surface of a sheet of paper and a rear surface of said sheet of paper.

* * * * *